(12) United States Patent
Lolling et al.

(10) Patent No.: US 11,124,430 B2
(45) Date of Patent: Sep. 21, 2021

(54) EVAPORATION APPARATUS FOR TREATING WASTE WATER

(71) Applicant: AbTech Industries, Inc., Scottsdale, AZ (US)

(72) Inventors: Shawn M Lolling, Gilbert, AZ (US); Jonathan C Warner, Fort Worth, TX (US)

(73) Assignee: AbTech Industries, Inc., Scottsdale, AZ (US)

(*) Notice: Subject to any disclaimer, the term of this patent is extended or adjusted under 35 U.S.C. 154(b) by 145 days.

(21) Appl. No.: 16/517,432

(22) Filed: Jul. 19, 2019

(65) Prior Publication Data

US 2021/0017044 A1    Jan. 21, 2021

(51) Int. Cl.
| | | |
|---|---|---|
| C02F 1/04 | (2006.01) | |
| C02F 1/68 | (2006.01) | |
| C02F 1/00 | (2006.01) | |
| B04C 3/06 | (2006.01) | |

(52) U.S. Cl.
CPC ............... *C02F 1/048* (2013.01); *B04C 3/06* (2013.01); *C02F 1/004* (2013.01); *C02F 1/68* (2013.01); *C02F 2201/002* (2013.01)

(58) Field of Classification Search
None
See application file for complete search history.

(56) References Cited

U.S. PATENT DOCUMENTS

| | | |
|---|---|---|
| 4,895,136 A | 1/1990 | Poppe |
| 5,305,735 A | 4/1994 | Welden |
| 5,368,474 A | 11/1994 | Welden |
| 5,437,249 A | 8/1995 | Adams et al. |
| 5,479,913 A | 1/1996 | Adams |
| 5,597,892 A | 1/1997 | Hanson |
| 6,238,206 B1 * | 5/2001 | Cummings, III ....... F23D 14/24 431/10 |
| 7,513,972 B2 | 4/2009 | Hart et al. |
| 8,158,097 B2 | 4/2012 | DiTommaso et al. |
| 8,273,320 B2 | 9/2012 | DiTommaso et al. |
| 8,501,034 B2 | 8/2013 | Hook et al. |
| 8,529,155 B2 | 9/2013 | DiTommaso et al. |
| 8,535,538 B1 | 9/2013 | Keeling et al. |
| 9,533,238 B2 | 1/2017 | Batty et al. |

(Continued)

FOREIGN PATENT DOCUMENTS

| | | |
|---|---|---|
| CN | 103420532 A | 12/2013 |
| GB | 1537468 A | 12/1978 |

OTHER PUBLICATIONS

Evaporator Handbook; SPX Corporation; 2008.

(Continued)

*Primary Examiner* — Derek N Mueller
(74) *Attorney, Agent, or Firm* — Louis J. Hoffman; Diane L. Gardner

(57) ABSTRACT

A thin film, direct convection, evaporative apparatus, such as for treating waste water on-site at a production area or waste water processing area, relies on direct exposure of fluid to an open flame in a substantially enclosed burner unit having a burn chamber fed by an air-fuel mixing chamber and a fluid chamber, which apparatus also has gas and air trains and a metered fluid train permitting controlled fluid flow rate.

18 Claims, 55 Drawing Sheets

(56) References Cited

U.S. PATENT DOCUMENTS

| | | | |
|---|---|---|---|
| 2003/0175642 A1* | 9/2003 | Stephens | F23C 9/00 431/9 |
| 2004/0177611 A1 | 9/2004 | Langenfeld et al. | |
| 2007/0023355 A1 | 2/2007 | Park | |
| 2008/0179228 A1 | 7/2008 | VanKouwenberg | |
| 2011/0303368 A1 | 12/2011 | Panz et al. | |
| 2013/0153401 A1 | 6/2013 | Gilbeau et al. | |
| 2014/0014492 A1 | 1/2014 | Younes et al. | |
| 2014/0318773 A1 | 10/2014 | Kennel et al. | |
| 2015/0232348 A1 | 8/2015 | Jepson | |

OTHER PUBLICATIONS

What's the difference between natural gas, liquid natural gas, shale gas, shale oil and methane? an oil and gas glossary; at https://www.carbonbrief.org/whats-the-difference-between-natural-gas-liquid-natural-gas-shale-gas-shale-oil-and-methane-an-oil-and-gas-glossary; Aug. 23, 2013.

Burnett, David; Brine Management: Produced Water and Frac Flowback Brine; Journal of Petroleum Technology, vol. 63, Issue 10, pp. 46-48; Oct. 2011.

Heinz, William F.; Is a Paradigm Shift in Produced Water Treatment Technology Occurring at SAGD Facilities?; GE Power & Water, Water & Process Technologies technical paper; 2011.

Navaladian, S. et al.; On the possible treatment procedures for organic contaminants; Photo/Electrochemistry & Photobiology in the Environment, Energy and Fuel; 2007.

Hayward, Leslie; Produced Water: An Expensive Problem for a Thirsty Fracking Industry; at http://energyfuse.org/oil-and-water; Apr. 3, 2015.

Arthur, J. Daniel et al.; Technical Summary of Oil & Gas Produced Water Treatment Technologies; All Consulting, LLC; Mar. 2005.

Johnson, Larry; Water Management, Meters Key to Evaporator Technology; The American Oil & Gas Reporter; Feb. 14, 2018.

Submerged Combustion—Introduction to SubCom®; Inproheat Industries Ltd.; at http://inproheat.com/product/category/subcom; 2012.

Patton, Mark; HydroFlare by Hydrozonix is Here!; Hydrozonix LLC; Feb. 1, 2017.

Bhasker, C.; Flow simulation in industrial cyclone separator; Advances in Engineering Software, vol. 41, Issue 2, pp. 220-228; Feb. 2010.

Chu, K.W. et al.; CFD-DEM simulation of the gas—solid flow in a cyclone separator; Chemical Engineering Science, vol. 66, Issue 5, pp. 834-847; Mar. 2011.

Deng, Qing-Fang and Shen, Al-Ling; Flow-field Numerical Simulation of Gas-Solid Cyclone Separator based on FLUENT; 2010 International Conference on Digital Manufacturing & Automation; pp. 740-743; Dec. 18-20, 2010.

Dong, Lian-Ping et al.; Separation performance of a cyclone column separator with complicated positive and negative cones; International Journal of Mineral Processing, vol. 122, pp. 43-46; Jul. 2013.

Elsayed, Khairy and Lacor, Chris; Optimization of the cyclone separator geometry for minimum pressure drop using mathematical models and CFD simulations; Chemical Engineering Science, vol. 65, Issue 22, pp. 6048-6058; Nov. 2010.

Elsayed, Khairy; Optimization of the cyclone separator geometry for minimum pressure drop using Co-Kriging; Powder Technology, vol. 269, pp. 409-424; Jan. 2015.

Huang, Yan et al.; Numerical Simulation of the Gas Phase of Cyclone—separator Sand Trap Based on ICEM CFD and FLUENT; Advanced Materials Research, vols. 774-776, pp. 321-325; 2013.

Ontko, J.S.; Cyclone separator scaling revisited; Powder Technology, vol. 87, pp. 93-104; 1996.

Karagoz, Ifran et al.; Design and performance evaluation of a new cyclone separator; Journal of Aerosol Science, vol. 59, pp. 57-64; May 2013.

Elsayed, Khairy and Lacor, Chris; Modeling and Pareto optimization of gas cyclone separator performance using RBF type artificial neural networks and genetic algorithms; Powder Technology, vol. 217, pp. 84-99; Feb. 2012.

Zhou, L.X. and Soo, S.L.; Gas-solid flow and collection of solids in a cyclone separator; Powder Technology, vol. 63, pp. 45-53; 1990.

Li, Qiang et al.; Performance evaluation of a new cyclone separator—Part I experimental results; Separation and Purification Technology, vol. 141, pp. 53-58; Feb. 12, 2015.

Liu, Chengwen et al.; Experimental Study and Analysis on Drag Reduction Mechanisms of Reducing Pressure Drop Stick in a Cyclone Separator; Chemical & Engineering Technology, vol. 29, No. 4; pp. 495-503; Mar. 2006.

Lv, Tai et al.; The Computer Emulation-Design and Application for the Double-Stage Separating Cyclone Separator; 2009 International Conference on Energy and Environment Technology, pp. 619-622; 2009.

Matsuzaki, Kozuyoshi et al.; Numerical Study on Particle Motions in Swirling Flows in a Cyclone Separator; Journal of Thermal Science, vol. 15, No. 2, pp. 181-185; Sep. 24, 2005.

Miller, Timothy F.; A high-pressure, continuous-operation cyclone separator using a water-generated flow restriction; Powder Technology, vol. 122, pp. 61-68; 2002.

Nieuwstadt, Frans T.M. and Dirkzwager, Maarten; A Fluid Mechanics Model for an Axial Cyclone Separator; Ind. Eng. Chem. Res., vol. 34, No. 10, pp. 3399-3404; 1995.

Rao, T.C. et al.; Studies on a Vorsyl separator as an alternate for a dense medium cyclone; International Journal of Mineral Processing, vol. 53, pp. 49-57; 1998.

Rosa, E.S. et al.; The cyclone gas—liquid separator: operation and mechanistic modeling; Journal of Petroleum Science and Engineering, vol. 32, pp. 87-101; 2001.

Shoham, Ovadia and Kouba, Gene E.; State of the Art of Gas/Liquid Cylindrical-cyclone Compact-separator Technology; Journal of the Society of Petroleum Engineers, pp. 58-65; Jul. 1998.

Smith, Jr., J.L.; An Experimental Study of the Vortex in the Cyclone Separator; Journal of Basic Engineering—Transactions of the ASME, pp. 602-608; Dec. 1962.

Swamee, Prabhata et al.; Optimum Design of Cyclone Separator; American Institute of Chemical Engineers Journal, vol. 55, No. 9, pp. 2279-2283; Sep. 2009.

Xiaodong, Li et al.; Numerical simulation of the effects of turbulence intensity and boundary layer on separation efficiency in a cyclone separator; Chemical Engineering Journal, vol. 95, pp. 235-240; 2003.

Xiong, Zhiyi et al.; Development of a cyclone separator with high efficiency and low pressure drop in axial inlet cyclones; Powder Technology, vol. 253, pp. 644-649; Feb. 2014.

Xuezhi, Wu et al.; Modeling and Experimental Validation on Pressure Drop in a Reverse-flow Cyclone Separator at High Inlet Solid Loading; Journal of Thermal Science, vol. 20, No. 4, pp. 343-348; 2011.

Zhiping, Zhu et al.; Pressure Drop in Cyclone Separator at High Pressure; Journal of Thermal Science, vol. 17, No. 3, pp. 275-280; 2008.

Ji, Zhongli et al.; Experimental investigations on a cyclone separator performance at an extremely low particle concentration; Powder Technology, vol. 191, No. 3, pp. 254-259; Apr. 24, 2009.

Banerjee, P.K. et al.; A plant comparison of the vorsyl separator and dense medium cyclone in the treatment of Indian coals (abstract only); International Journal of Mineral Processing, vol. 69, Nos. 1-4, Mar. 2003.

\* cited by examiner

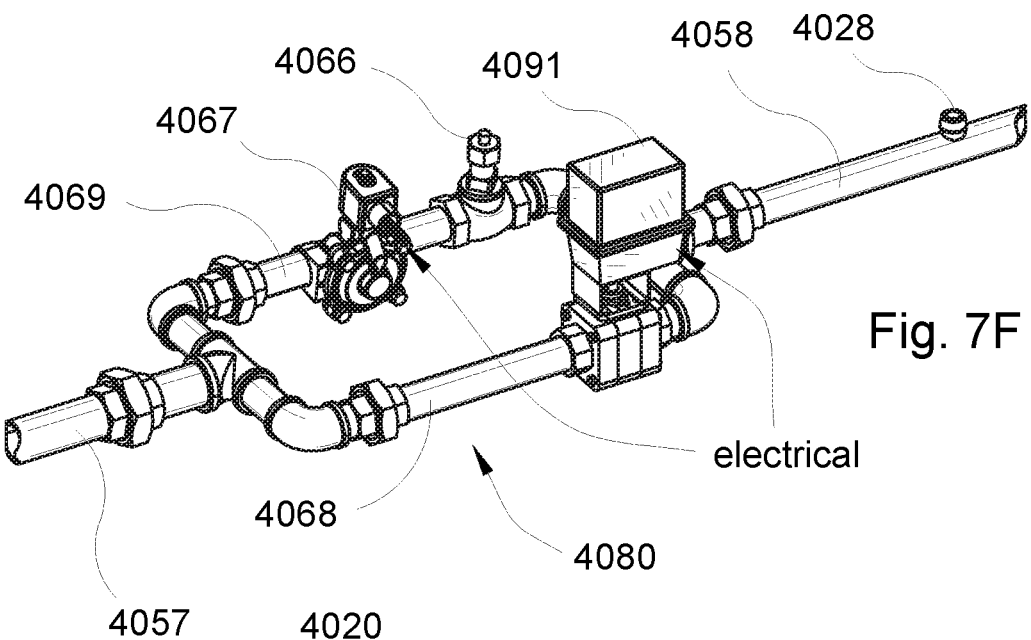
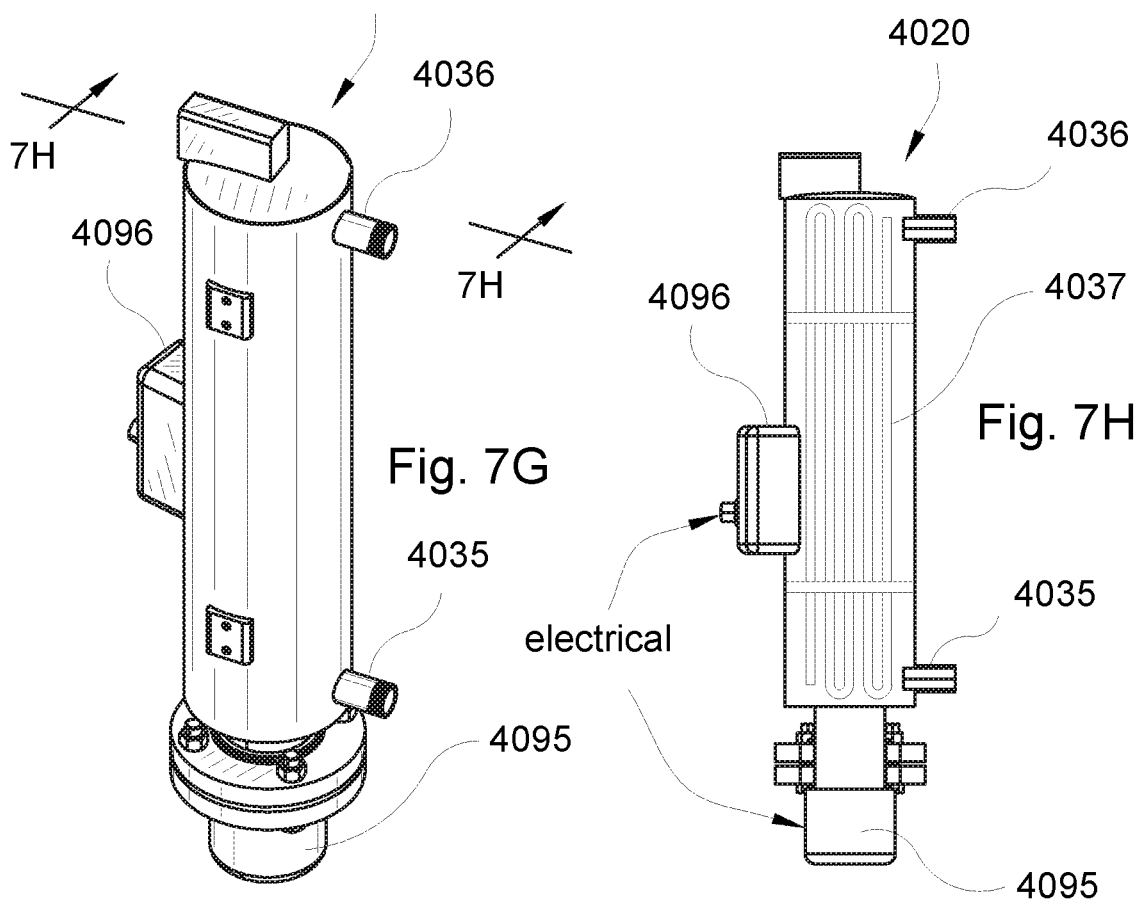

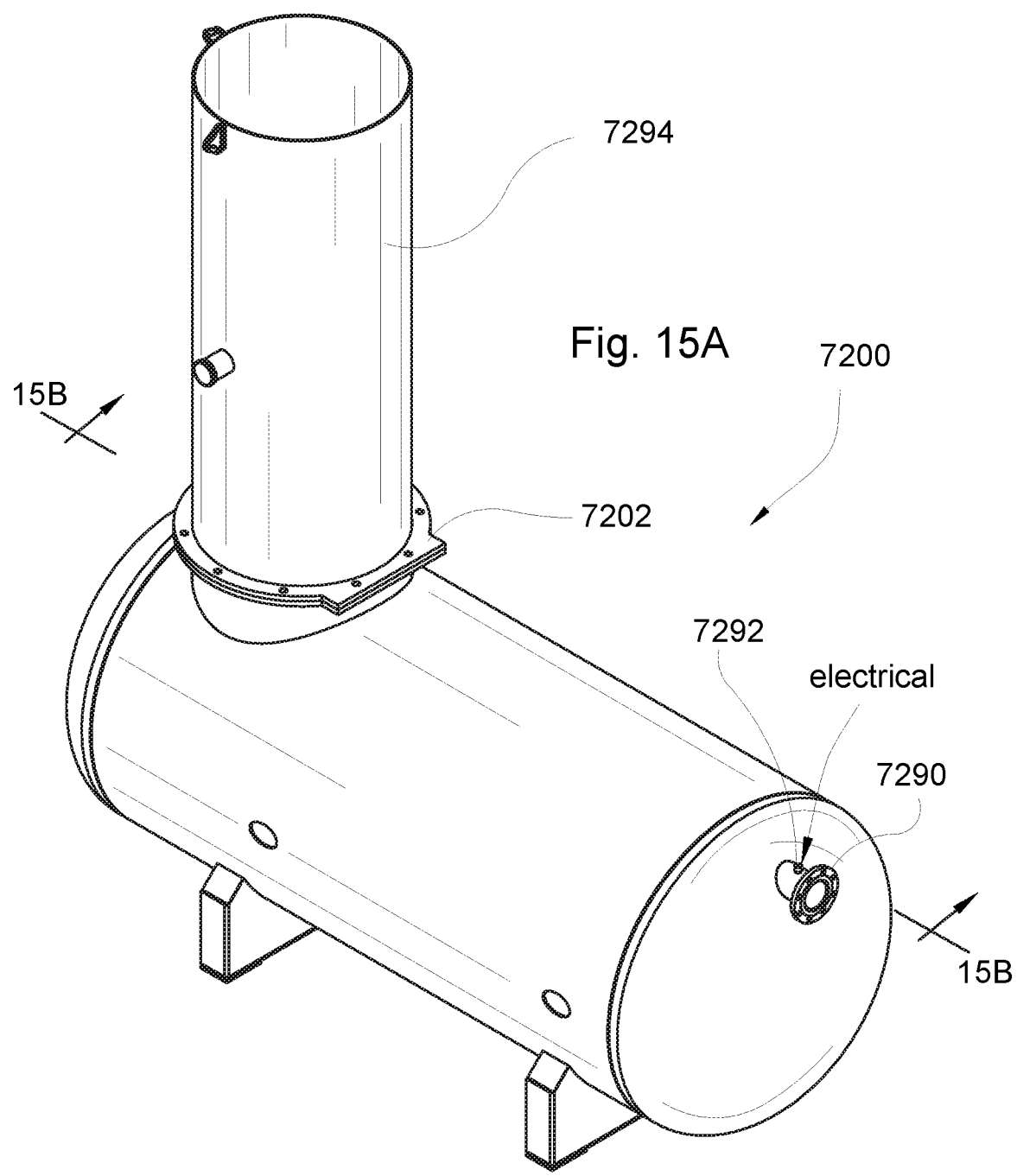

EVAPORATION APPARATUS FOR TREATING WASTE WATER

BACKGROUND

The field of the invention relates to methods and apparatuses for treating waste water. Examples of waste water that may be treated with the methods and apparatuses described include landfill leachate, chemical facility waste water, and high organic strength waste water. In particular, the methods and apparatuses are particularly suitable for use in the oil and gas industry where large amounts of waste water are produced.

"Produced water" is waste water that is delivered to the surface of the ground during oil and gas production, and it includes water that was trapped previously in the natural ground formation, as well as flowback fluids that are injected during the process. In particular, hydraulic fracturing processes require a significant amount of injected water, a large portion of which flows back as produced water. It is estimated that U.S. oil production results in seven to ten barrels of produced water for each barrel of oil produced.

Produced water contains soluble and insoluble organic compounds, dissolved solids, production chemicals, and undissolved solids, such as metals. The quality of the produced water may range from brackish (5,000-35,000 ppm total dissolved solids) to saline (35,000-50,000 ppm total dissolved solids) to brine (50,000+ ppm total dissolved solids). The presence of those impurities make produced water an environmental concern that generally requires treatment prior to reuse or disposal.

Current treatment methods of treatment and disposal of produced water include reinjection of treated or untreated produced water into the same ground formation or another suitable ground formation. This method usually involves expensive transportation of produced water from the production site to the injection site. Ultimately, the waste water is disposed underground.

Other treatment methods result in treated waste water that meets regulatory requirements for onshore or offshore discharge, or for industrial applications.

With significant treatment, produced water may meet quality standards for beneficial reuse, such as for irrigation, rangeland restoration, cattle and animal consumption, and drinking water for private use or in public water systems.

The general objectives for treating produced water include: 1) removal of free and dispersed oil and grease present in produced water; 2) removal of dissolved organics; 3) removal of bacteria, microorganisms, algae, etc.; 4) removal of suspended particles, sand, turbidity, etc.; 5) removal of light hydrocarbon gases, carbon dioxide, hydrogen sulfide, etc.; 6) removal of dissolved salts, sulfates, nitrates, contaminants, scaling agents, etc.; 7) removal of excess water hardness; 8) Sodium Adsorption Ratio (SAR) adjustment, e.g., addition of calcium or magnesium ions into the produced water to adjust salinity levels prior to irrigation; and 9) naturally occurring radioactive materials (NORM) removal.

Depending on the water disposal method desired, produced water may be required to meet certain quality standards. These standards may be related to levels of specific constituents, such as ammonia or barium, or they may be more broadly based, such as relative to total dissolved solids (TDS) or SAR.

De-oiling methods for treating produced water result in recovery of oil and disposal of the remaining volume of waste water. Desalinization methods result in water available for beneficial reuse. However, those methods often rely on sacrificial electrodes that are costly. Moreover, any change in the constitution of the produced water, which is typical in the oil and gas industry, requires re-calibration of the apparatus. Membrane treatment methods also result in reusable water, but are expensive and require significant maintenance. None of the foregoing methods are believed to address issues related to transport of the treated water.

Several evaporation methods exist for treatment of produced water, some of which eliminate the need for transport of the treated water. For example, rapid spray evaporation (RSE) employs heat to separate contaminants from produced water. Contaminated water is ejected at high velocities through an injector-nozzle into waste heat. The unit uses a heating element for a heat source across which air is blown into the evaporation chamber. As the heated air moves along the evaporation chamber, nebulized waste water is injected into the evaporation chamber. The moving vapor and brine droplets pass through a mechanical filter that traps the brine droplets. The pure vapor phase passes to a condenser. The brine droplets are periodically flushed from the filter with the water being treated. Because the water vaporizes within milliseconds of ejection, the solids in the solution flash or separate out. The water vapor is condensed and collected, and the precipitated solids form isolated crystalline particles that are collected through a vacuum process. Heat transfer to the produced water using this method is less efficient than introducing the produced water directly to the heat source, and the apparatus requires significant maintenance.

In another example of an evaporation process, freeze thaw evaporation (FTE) requires that produced water be first stored in a holding pond until air temperatures drop below 0° C. (32° F.). The water is then removed from the pond using pumps and sprayed onto a separate freezing extraction, which consists of an elevated pipe grid with strategically placed sprinklers. The sprinklers can be raised as the ice builds on the pipe grid. The unfrozen brine water drains from the ice grid and is separated using valves, typically conductivity-controlled. The concentrated brine water should be transported to separate storage ponds for either secondary treatment or disposal. Other shortcomings include environmental dependence and failure to separate all of the contaminants.

The impurities in produced water prove challenging for treatment processes, as they are prone to cause clogging and corrosion of expensive, high-maintenance machinery, or the methods of achieving quality standards are complicated, difficult, or impossible to achieve. Although beneficial reuse of produced water is desirable, the bulk of produced water currently is injected underground because it is far less costly than employing expensive or complicated reuse processes. Nevertheless, transporting and disposing of produced water results in significant expense.

It is desirable to employ methods of produced water treatment that significantly decrease the volume of waste requiring disposal while generating a product that is safe to return to the environment. For that reason, there is a need for evaporation techniques for producing steam pure enough to be released into the atmosphere while generating solid waste having significantly reduced volume and issues relating to transport and disposal. Additionally, it is desirable to employ these methods "on site," i.e., where the waste water is generated, so as to minimize the need for transport. Such methods preferably should be cost-effective, efficacious, and easy to perform. Additionally, it is desirable that processes and apparatuses be safe, efficient, and require relatively little maintenance.

SUMMARY OF THE INVENTION

Disclosed are thin film, direct convection, evaporative processes and apparatuses for treating waste water on-site at a production area or waste water processing area. More specifically, improved processes and apparatuses relate to direct exposure of waste water to an open flame in an evaporation chamber, despite the waste water containing volatile substances. The processes and apparatuses can result in reduction of total volume of waste water, from at least 85% up to about 99%, often resulting in steam capable of being introduced safely to the environment according to strict regulatory standards for quality. The processes and apparatuses are cost-effective, safe, efficient, and require relatively little maintenance. Various embodiments may include some, none, or all of the foregoing advantages and different combinations of features.

Objectives and advantages pertaining to processes and apparatuses for thin film, direct convection, evaporative technologies may become apparent by referring to the example embodiments disclosed in the following written description or appended claims. This summary is provided to introduce certain concepts in a simplified form, which are further described below. This summary is not intended to identify key features or essential features of the claimed subject matter, nor is it intended to be used as to define the scope of the claimed subject matter. Other technical advantages may become readily apparent to one of ordinary skill in the art after review of the following figures and description.

BRIEF DESCRIPTION OF THE DRAWINGS

FIG. 7F is a perspective view of an example two-step high/low assembly of FIG. 7A.

FIG. 7G is a perspective view of a heat exchanger of FIG. 7A.

FIG. 7H is a sectional view of a heat exchanger of FIG. 7A.

FIG. 15A is a perspective view of a vortex separator of FIG. 2C.

DETAILED DESCRIPTION

Figure 1:
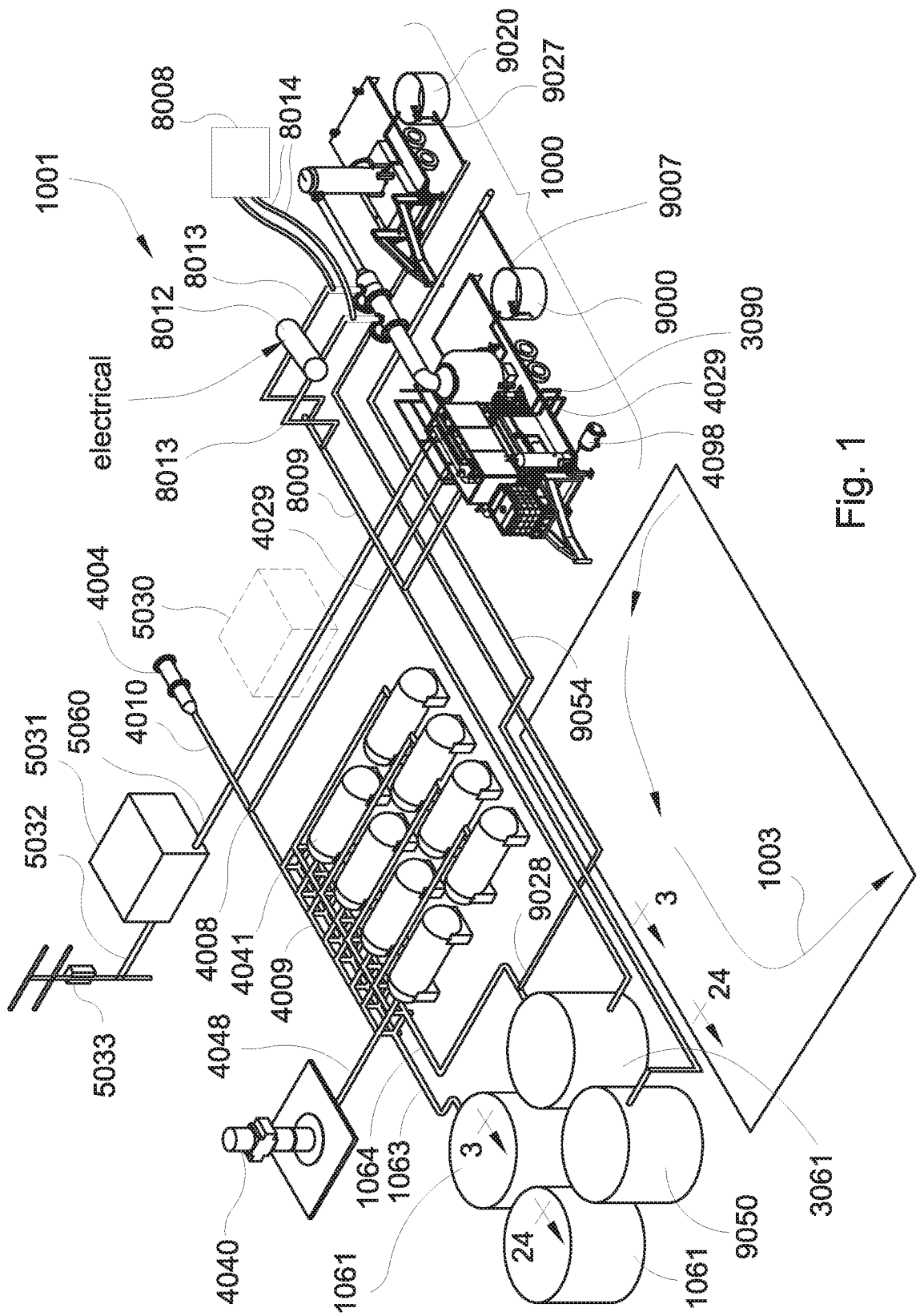
FIG. 1 is a perspective view of an overall system FIG. 2A at an extraction site location.

The terms "a" and "an" and variations thereof represent the phrase "at least one." In all cases, the terms "comprising," "comprises," "including," "includes," "contains," "having," and any variations thereof or terms of like meaning should not be interpreted as limited to the elements listed thereafter but rather as open-ended terms, as though the phrase "at least" or "but not limited to" were appended thereafter.

The conjunction "or" is to be construed inclusively (i.e., one, another, or both), unless it is explicitly stated otherwise (e.g., by use of "either . . . or," "only one of," or similar language) or two or more of listed alternatives are mutually exclusive within the particular context, in which case "or" would encompass only those combinations involving non-mutually exclusive alternatives.

The term "substantially," as modifying a parameter having a stated limit, is to be construed as meaning something that effectively possesses the same property or achieves the same function as that of the stated limit, and includes exactly the stated limit as well as insignificant deviations therefrom.

The term "approximately" is to be construed as meaning something having very nearly the stated value, and includes exactly the stated value as well as insignificant variations therefrom.

Unless otherwise specified, all words used herein carry their common meaning as understood by a person having ordinary skill in the art.

Although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described herein. In cases where examples are listed, it is to be understood that combinations of any of the alternative examples are also envisioned. The scope of the invention is not to be limited to the particular embodiments disclosed herein, which serve merely as examples representative of the limitations recited in the issued claims resulting from this application, and the equivalents of those limitations.

Various features may be grouped together in example embodiments for the purpose of streamlining the disclosure, but this method of disclosure should not be interpreted as reflecting an intention that any claimed embodiment requires more features than are expressly recited in a corresponding claim. Rather, inventive subject matter may lie in less than all features of a single disclosed example embodiment or may combine features from different figures or different embodiments. Thus, the appended claims are hereby incorporated into the detailed description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein or disclosed in a single figure or embodiment. Conversely, the scope of the appended claims does not necessarily encompass the whole of the subject matter disclosed herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

If the word "means" or the phrase "step for" does not appear in a claim, applicant does not intend to invoke the provisions of law relating to "means/function" or "step/function" claiming.

The terms "may" and "may be" conveys optionality and all optional combinations are deemed to be disclosed. Terms like "may" and "optional" are included in some instances as to some specific features to emphasize their optional nature with respect to a particular embodiment or part thereof; no negative implication is intended or should be made that features lacking such express labeling are non-optional or required features. The word "should" means "preferably should" be done, not "must be done."

The abstract is provided as an aid to those searching for specific subject matter within the patent literature. However, the abstract is not intended to imply that any elements, features, or limitations recited therein are necessarily encompassed by any particular claim. The scope of subject matter encompassed by each claim shall be determined by the recitation of only that claim.

Figures are not necessarily drawn to scale.

For the purpose of this disclosure, the term "fluid" refers to any matter capable of flowing freely or with the aid of force, and may include water or waste product. Except as may be clearly apparent by context, the term "water" refers to fresh water substantially free of contaminants and specifically excludes waste water. The terms "waste water" and "waste product" refer to contaminated water that may include dissolved or undissolved solids or semi-solids, in all of its phases, mixed or separated, while subjected to the processes disclosed herein, including fluid, concentrated fluid (concentrate), vapor, particulate, and micronized particulate. In particular, the term "waste water" includes "produced water."

The terms "line," "inlet," "input," "outlet," "output," and "tube," refer generally to conduits, and such terms may include their terminal ends, fittings, and connections. Such conduits are generally used for the purpose of containing matter moving therein and typically include, for example, hoses, ducts, and pipes. It should be understood that conduits are constructed of material appropriate for coming into contact with the matter contained therein, their respective physical and chemical properties, and taking into consideration any applicable safety and regulatory requirements. Persons having ordinary skill within the relevant art would be able to identify suitable materials.

Apparatus

Positive displacement burner systems typically are designed to burn clean gas and to produce steam from clean water via evaporation. The apparatuses disclosed herein are significantly different, comprising burners that can be fueled by well head quality gas (or clean gas) and that vaporize waste water containing volatiles and other dangerous contaminants in the presence of a closed-system open flame. Many modifications to typical evaporative burner systems create factors affecting the function of the system in one or more aspects, resulting in further modifications to both the apparatus and the methods associated with using it to process waste water.

The composition of well head gas may vary from site to site and even during run time at a single site, so the flexibility of the apparatus and method disclosed below has benefits. Similarly, the composition of produced waste water varies from site to site and may vary even during run time at a single site. The differing compositions of produced waste water results in produced waste water having a wide range of viscosities. One of the goals of the process is to obtain fluid concentrate as viscous as possible while still maintaining its general ability to flow out of the system. Reduction in total volume of untreated waste water may be up to or nearly 100%, and preferably higher than 50%. The percent achieved depends, at least in part, on the composition of the produced waste water. For example, if the composition of produced waste water is 90% water, an output of processed fluid concentrate as close as possible to 10% is desirable but it cannot reach 10% exactly because it would not flow out of the system.

Figure 2A:
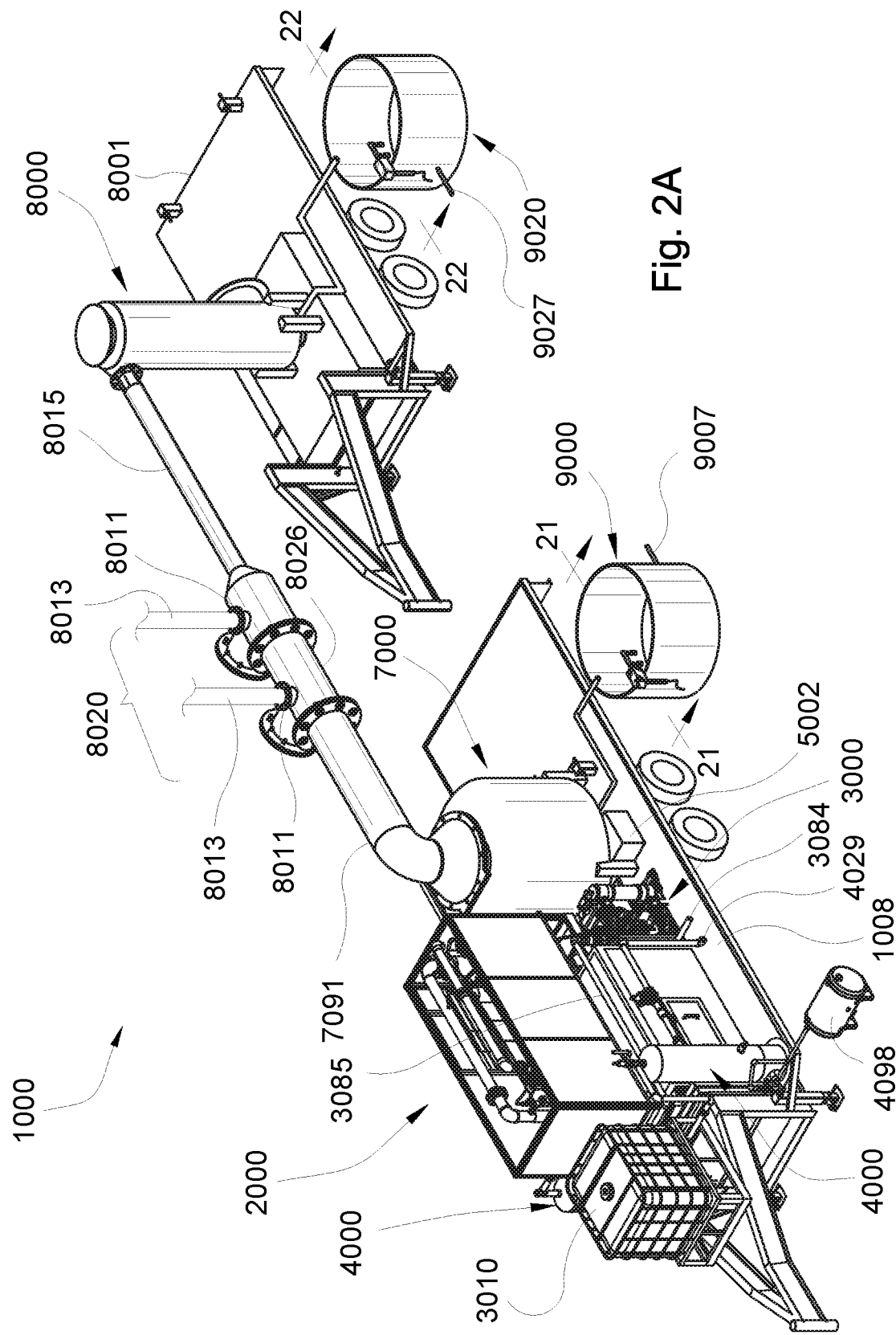
FIG. 2A is a perspective view of an embodiment of the overall system with cyclone separator (FIG. 13A), PM wash chamber, and PM scrubber (FIGS. 16 through 20).
Figure 2B:
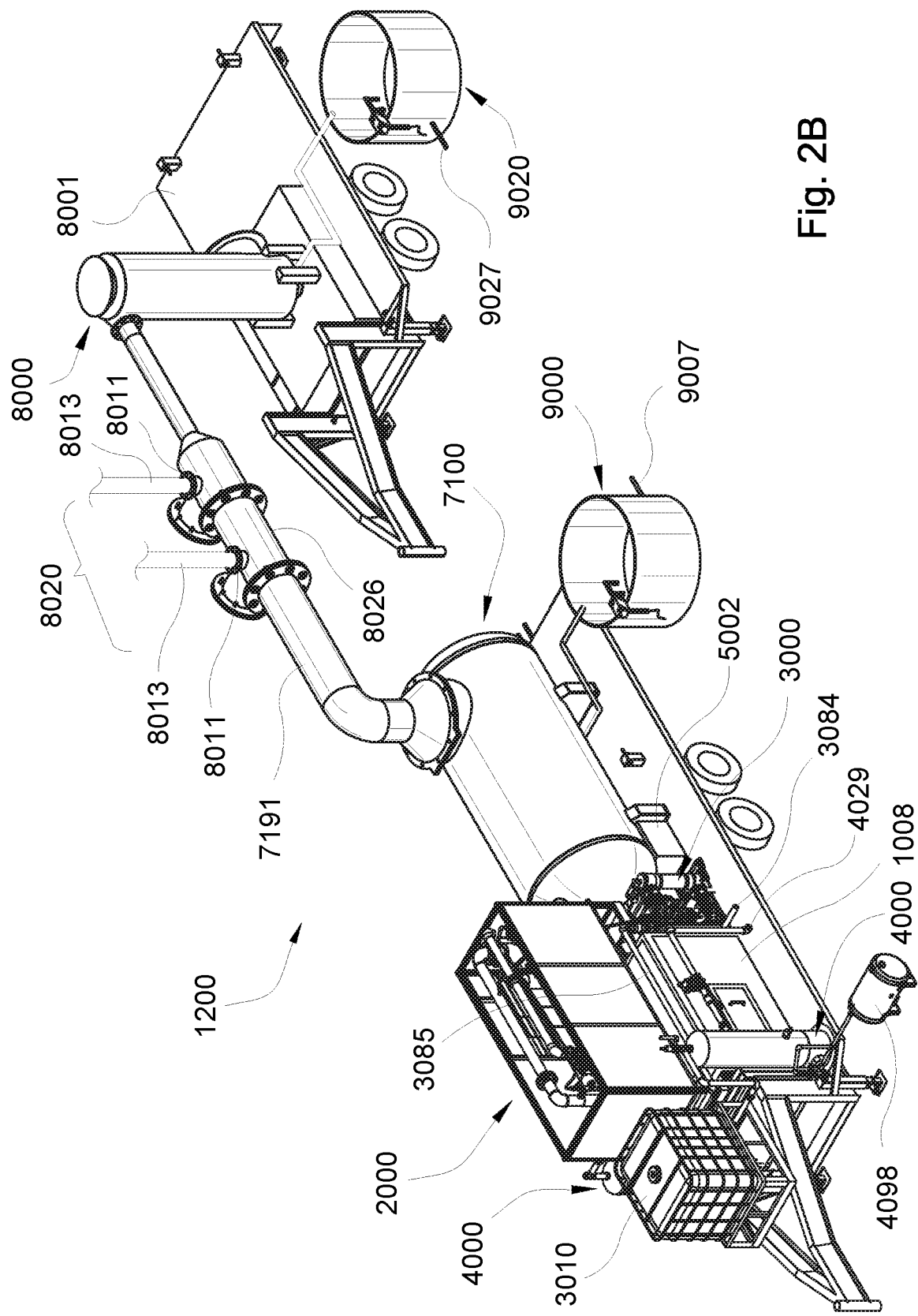
FIG. 2B is a perspective view of an alternate embodiment of FIG. 2A with vortex separator (FIG. 14A), PM wash chamber, and PM scrubber (FIGS. 16 through 20).
Figure 2C:
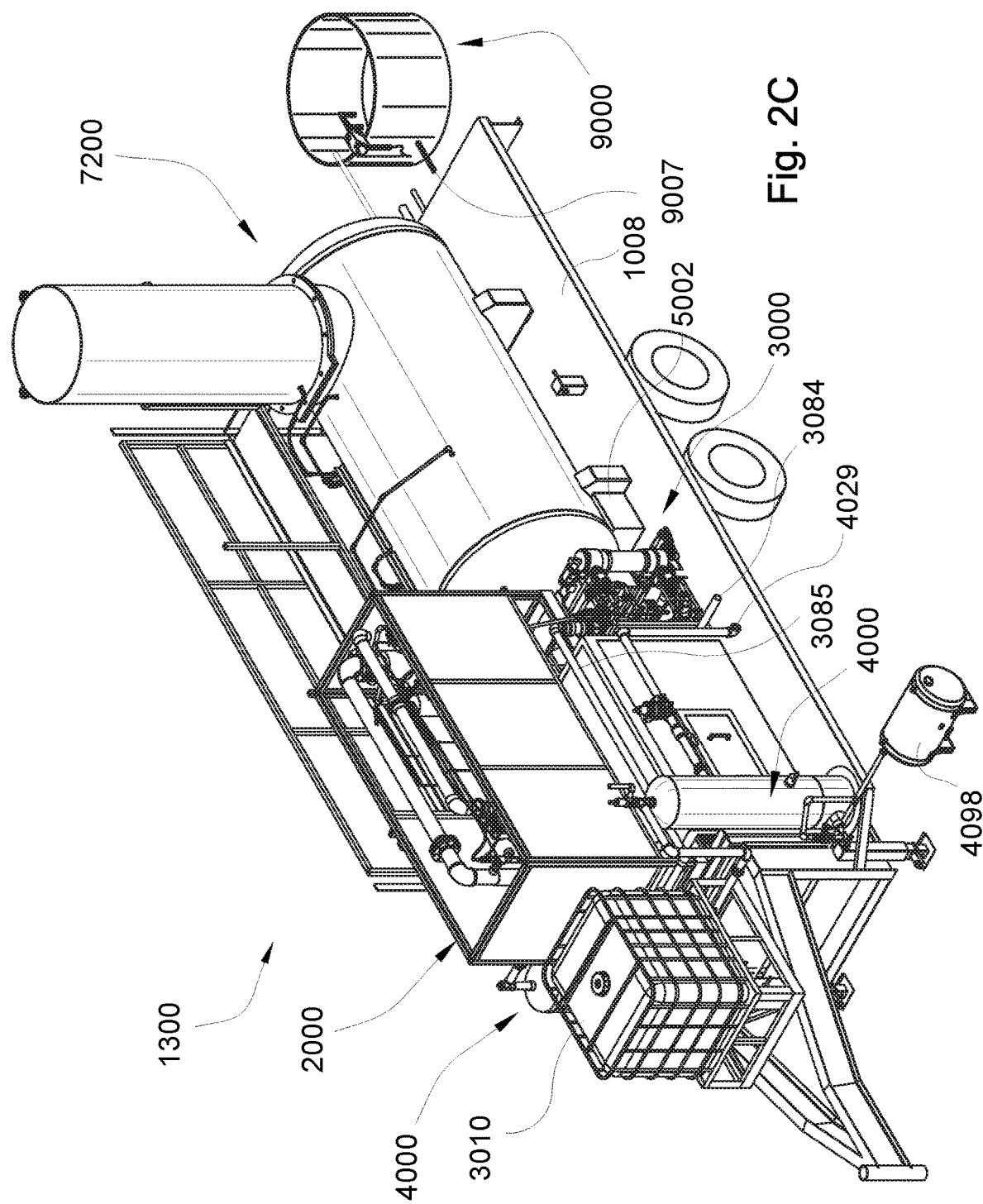
FIG. 2C is a perspective view of an alternate embodiment of FIG. 2A with vortex separator having a vertical stack (FIGS. 15A and 15B).

FIG. 1 shows an example of an overall system 1000 setup for use at an extraction site 1001, it being understood that incorporation of overall system 1000 may result in many different configurations depending on each particular site. Certain elements useful with overall system 1000 already may be present at extraction site 1001. FIGS. 2A, 2B, and 2C show various embodiments of overall system 1000 in greater detail.

For example, electric line 5032 connected to shore power supply 5033 and running to power supply station 5031 may be available at extraction site 1001. Alternatively, generator 5030 may be employed to supply power to overall system 1000. Power may be delivered to overall system 1000 via switch power line 5060 running from at least one of shore power supply 5033 and generator 5030 to electrical disconnect switch 5002 (FIG. 5A), which may have electrical box line 5061 running to manual adjustment box 5501 (FIGS. 5A and 5B) housing relays 5276. Preferably the power supplied is 3-phase, 480 V AC, 50 Amp, with a running consumption of about 25 KW. Preferably, a momentary 200 Amp surge may start up electric motor 2027 for running blower 2005, but a 75 KW generator may be capable of starting and running electric motor 2027. Preferably, switch power line 5060 is rated a minimum 4-wire, 600 V AC, 100 Amp insulated line.

When using generator 5030, there may be inadequate power to start electric motor 2027 in air train 2000 because of generator ramp up. To address this problem, it may be desirable to use a smaller electric motor 2027, or for electric motor 2027 to ramp up to full power. A blower motor soft start 5272 (see FIG. 5B) may be employed for decreasing the in-rush current. Alternatively, a variable frequency device (VFD) may be employed. In such embodiments, there may be at least three possible start methods for electric motor 2027, a soft start, a hard start, and a start controlled by a VFD (not shown).

Figure 5A:
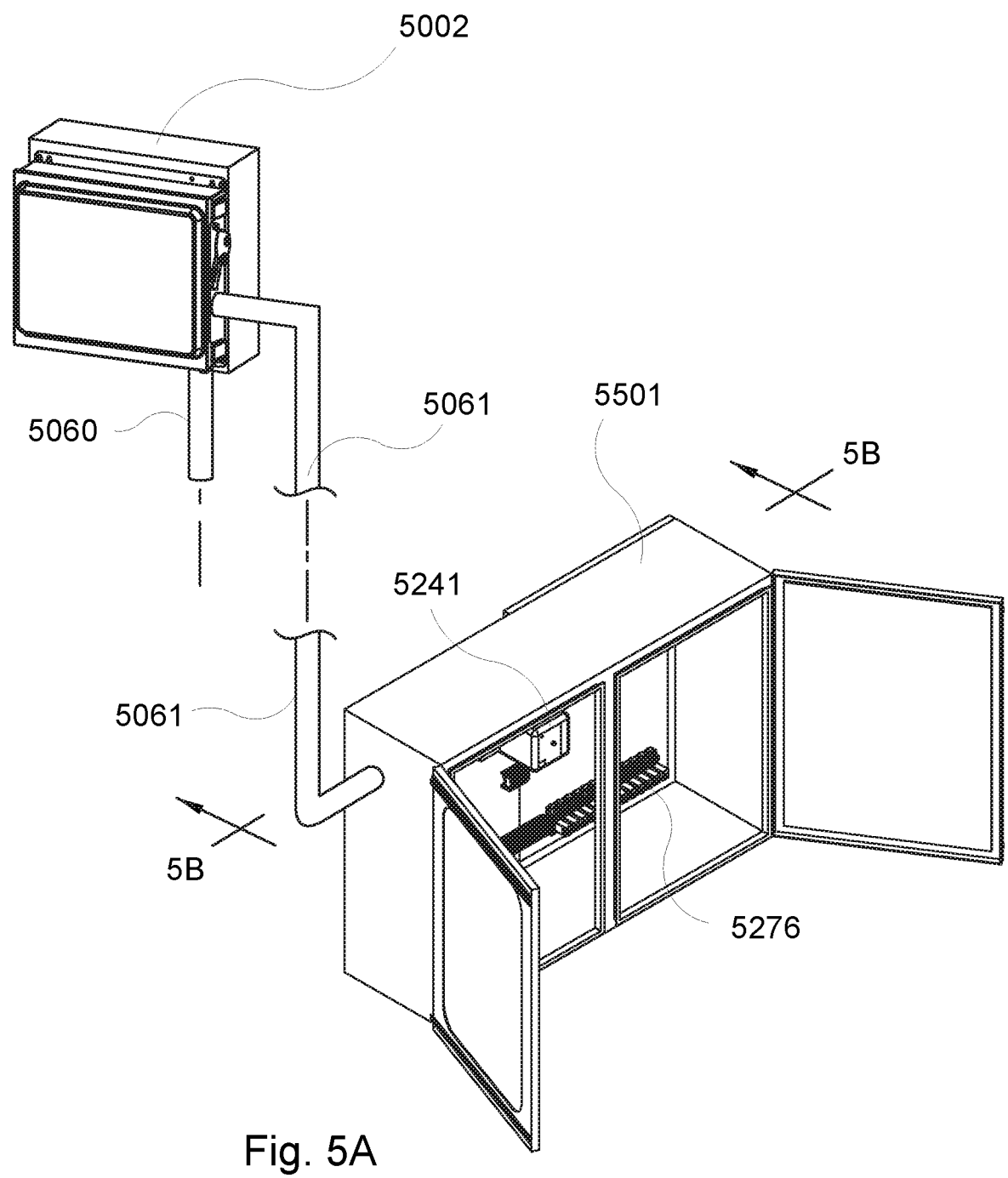
FIG. 5A is a perspective view of an electrical disconnect switch to manual adjustment box connection.
Figure 5B:
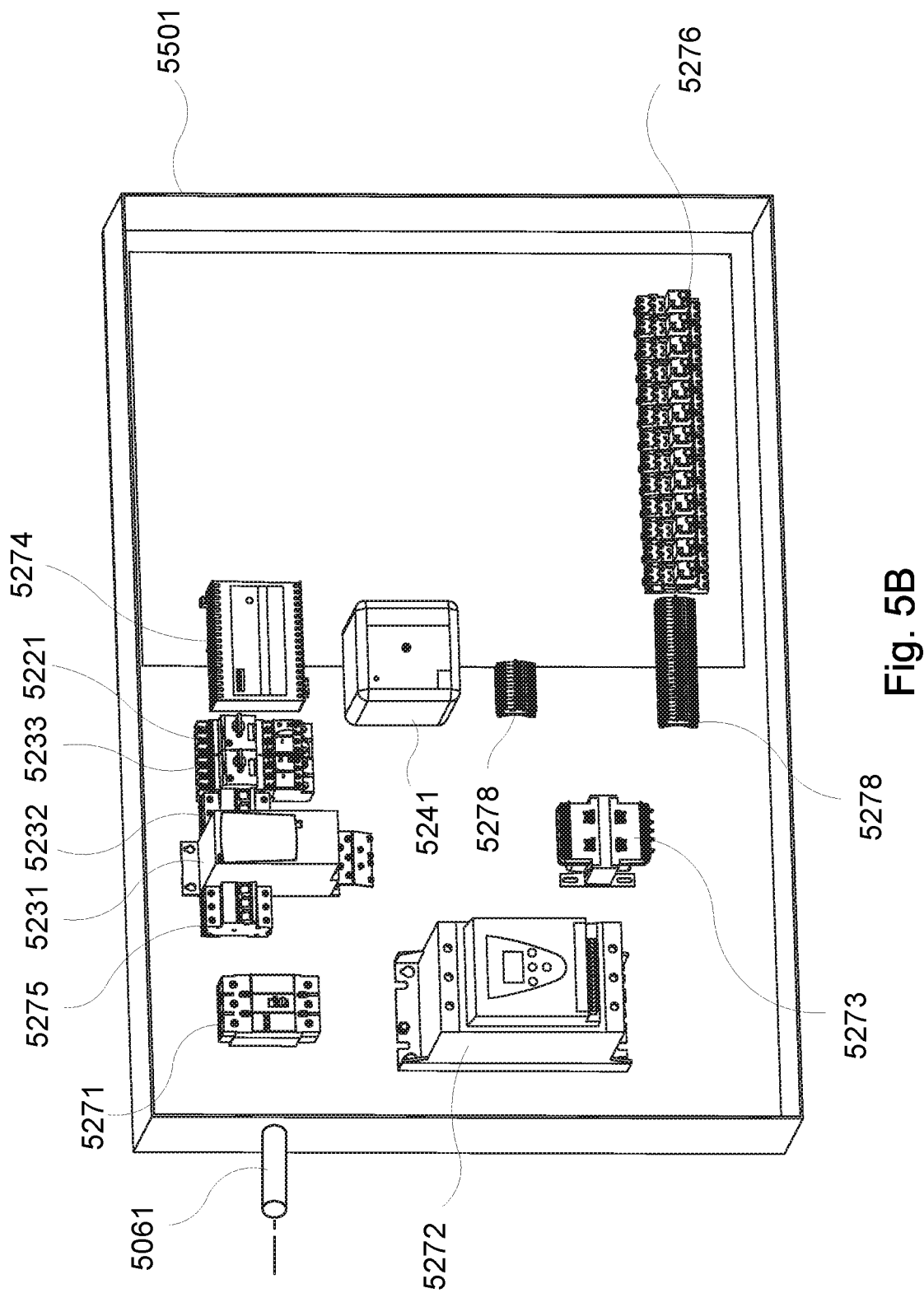
FIG. 5B is a perspective view of a manual adjustment box.

FIG. 5B exemplifies manual adjustment box 5501 for manual adjustments, housing main breaker 5271, breaker 120 V AC transformer 5275, fluid pump VFD 5231, fluid pump breaker 5232, fine filter motor breaker/contactor 5233, heat exchanger breaker/contactor 5221, AC/DC transformer 5274, burner control management device 5241, optional pass-throughs 5278, transformer 120 V AC 5273, and blower motor soft start 5272. In an alternative embodiment, blower motor soft start 5272, used to reduce the amount of surge upon starting the blower motor, could be replaced with a VFD.

Manual adjustment box 5501 should be constructed of materials that are capable of withstanding exposure to environmental elements such as dust, and should be water tight. Preferably, the cabinets should comply with National Electrical Manufacturers Association (NEMA) Type 4X guidelines. Suitable materials include epoxy coated carbon steel and poly(methyl methacrylate), e.g., Plexiglas®, Acrylite®, and Lucite®. Preferably, the face of manual adjustment box 5501 is clear to allow for visual inspection without requiring opening.

In the example extraction site shown in FIG. 1, gas well 4040 may supply product to a 2-, 3-, or 4-phase gas well separator 4041 via gas well line 4048 having a constant incoming pressure. Preferably, the incoming pressure is constant, greater than about 20 psig (pounds per square inch gauge) (138 kPa) and less than about 250 psig (1724 kPa), and the gas line has a capacity of about 120 MMCF/day to about 150 MMCF/day (3.4-4.25 Gl/day) with a 1″ or 2″ (2.5-5.1 cm) connection. Higher pressures may benefit from pressure reducers (not shown) being installed after separator 4041 along gas manifold to gas train line 4029, with enough distance from one another so as not to cause a temperature drop (during the pressure drop due to the pressure from the well), which could cause gas well line 4048 to freeze.

Products from gas well separator 4041 may exit to gas line manifold 4009 for directing the separated products to different destinations. Gas may continue to gas pipeline 4004 for commercial use, e.g., via gas line 4010. Gas line 4010 may comprise gas line split 4008, where fuel gas may be supplied to overall system 1000, e.g., via gas manifold to gas train line 4029 (shown in detail in FIGS. 7A, 7B, and 7C) connected to gas train 4000 (shown in detail in FIG. 7A). Oil may continue from gas well separator 4041 to one or more oil tanks 1061, e.g., via oil pipe line 1063.

Figure 3:
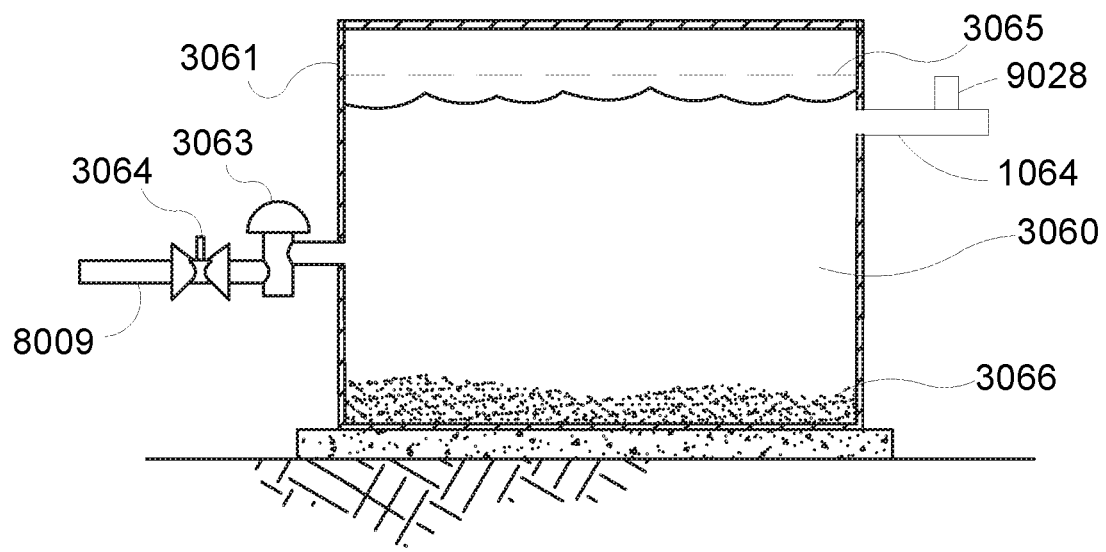
FIG. 3 is a sectional view of a fluid tank.

The remainder of the product leaving gas well separator 4041 is waste water in the form of a fluid that may contain dissolved and undissolved solids and semi-solids. This fluid is directed to one or more fluid tanks 3061, e.g., through fluid tank line 1064. FIG. 3 exemplifies fluid tank 3061. Liquid waste from PM dump tank 9020 may be directed to fluid tank 3061, e.g., via particulate matter (PM) dump tank line 9027 connected to PM dump tank to fluid tank line 9028 (FIG. 1) connecting to fluid tank line 1064, or alternatively, connecting directly to fluid tank 3061.

FIG. 3 exemplifies fluid tank 3061 comprising fluid line outlet 8009 (see FIG. 1) located at a level on fluid tank 3061 so as to be capable of drawing off a middle layer of fluid 3060 without drawing from top layer of liquid hydrocarbons 3065 or bottom layer of sediment 3066 that develop as the fluid separates. Preferably, fluid line outlet 8009 may be located at least 9″ (23 cm) above the bottom of the tank and may have a connection of about 2″ (5.1 cm). Fluid line outlet 8009 may be fitted with fluid tank regulating valve 3063 operated by a sensor (not shown) for determining the fluid level or the nearness of the top hydrocarbon layer inside fluid tank 3061 and for regulating fluid flow rate or closing the valve in the event that the fluid level becomes too low and is likely to allow air or hydrocarbons into fluid line outlet 8009. Fluid line outlet 8009 may be fitted with manual fluid tank shut-off valve 3064 for regulating fluid flow rate and for maintaining fluid in fluid tank 3061, the operation of which may cause overall system 1000 to be shut down by manual adjustment box 5501 closing main gas valve 4002 (see FIG. 7A) due to failure of the system to meet a requisite fluid pressure.

Figure 16:
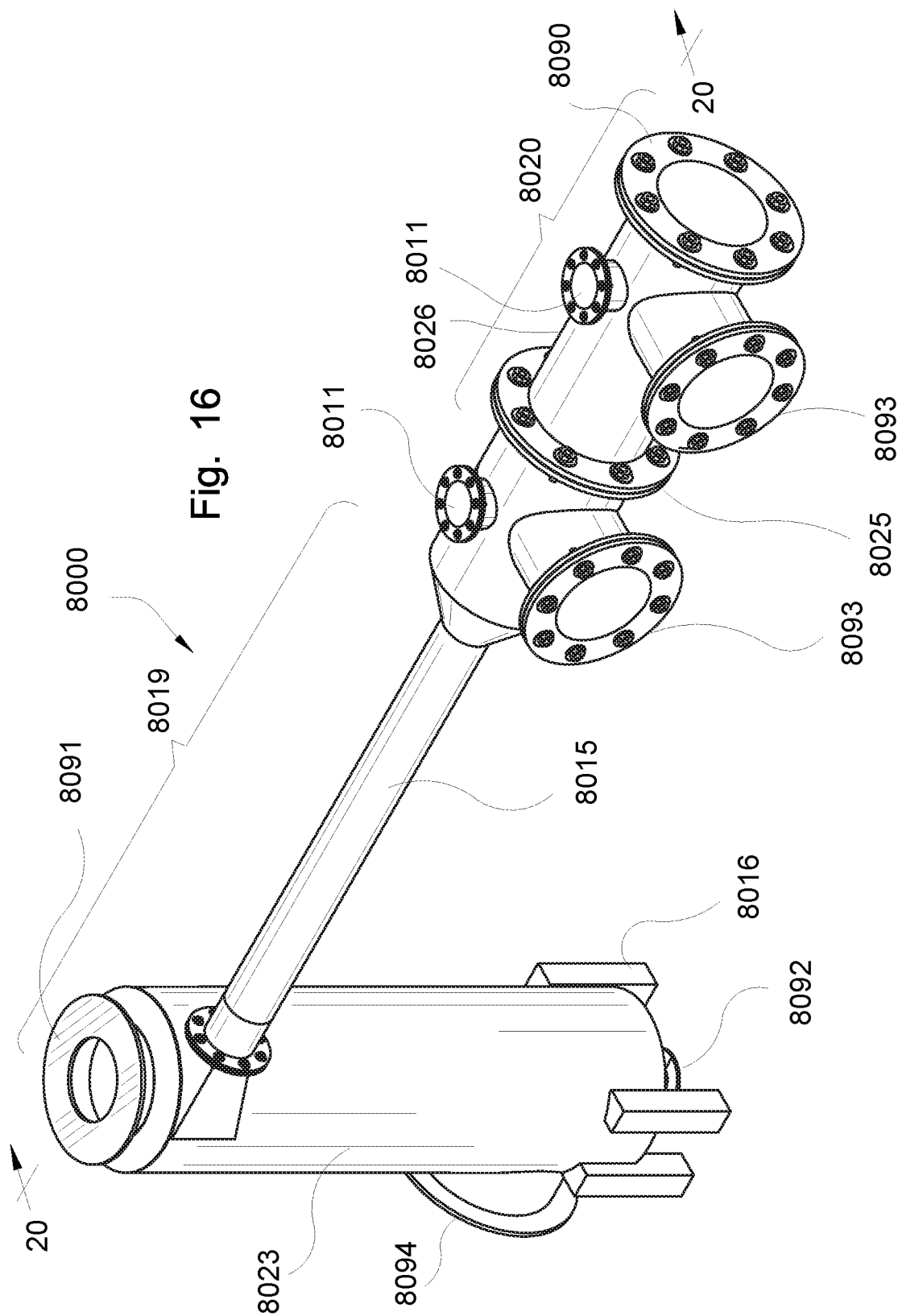
FIG. 16 is a perspective view of a PM scrubber of FIGS. 2A and 2B.
Figure 17:
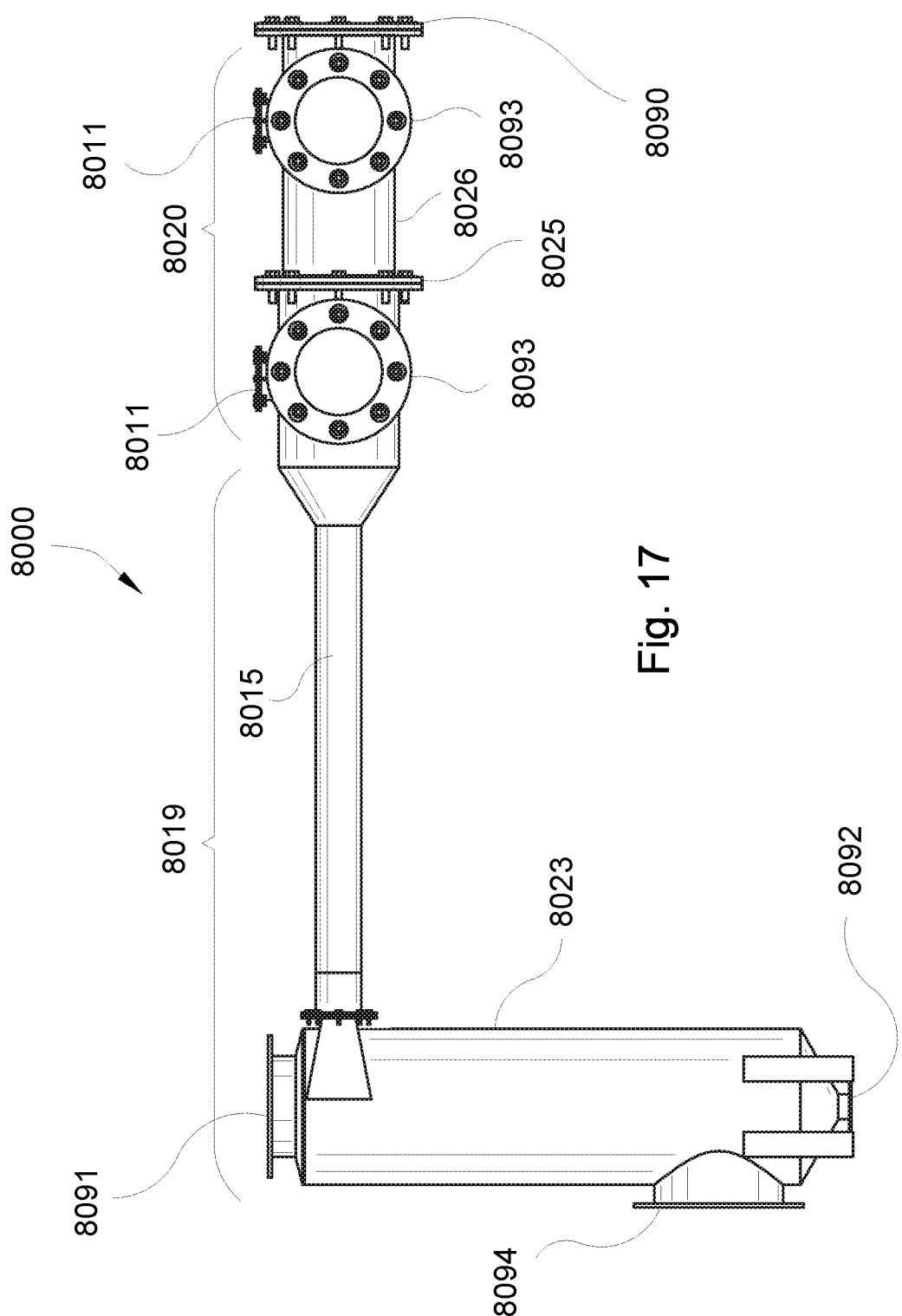
FIG. 17 is an elevation view of a PM scrubber (FIG. 16).
Figure 18:
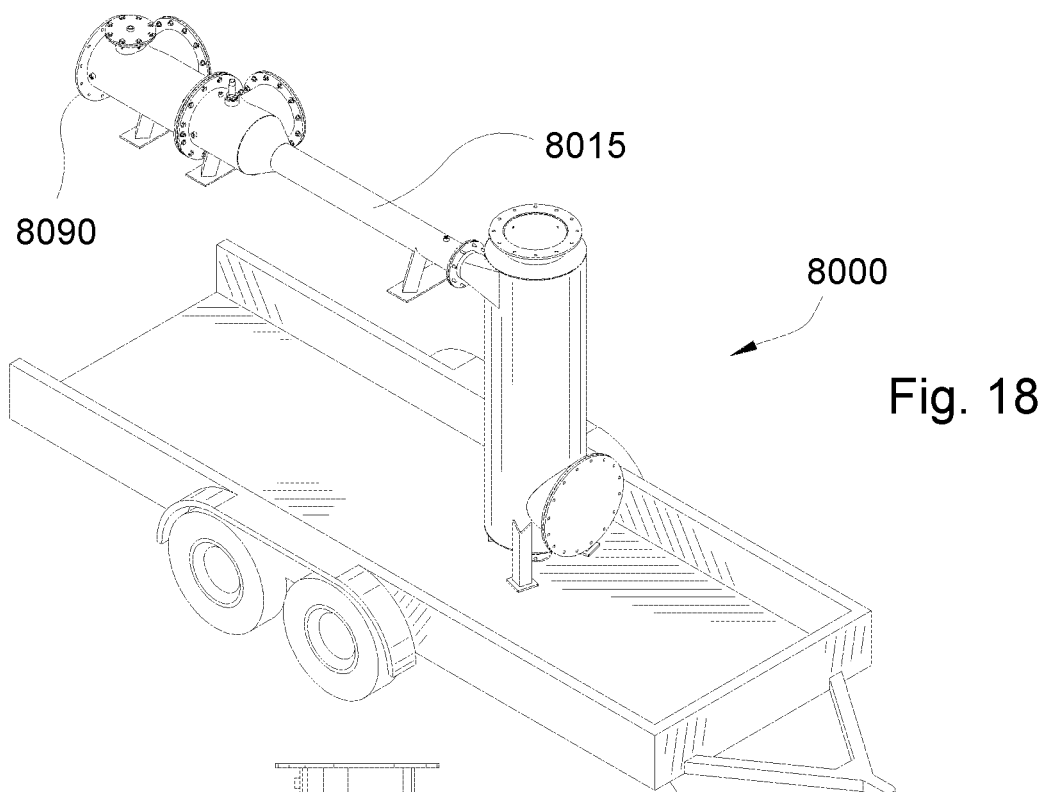
FIG. 18 is a perspective view of a PM scrubber (FIG. 16) on a trailer.

In a preferred embodiment, the fluid flow rate may be about 25 U.S. gallons per minute (GPM) (95 L/m), and in other preferred embodiments, the fluid flow rate may be in a range from 20-30 GPM (76-114 L/m). The fluid level of fluid tank 3061 preferably may be about the same height of fluid pump 3067 (see FIGS. 8A and 8B) or higher. Sediment from the bottom of fluid tank 3061 should be sucked off before installation of overall system 1000 and maintained throughout system run time. Fluid line outlet 8009 may deliver fluid to overall system 1000, e.g., via coarse filter line 3090 (shown in detail in FIGS. 8A through 8H). Fluid line outlet 8009 optionally may have at least one terminal end connected to a corresponding number of spray nozzle inputs 8013 connected to PM wash chamber 8020 (shown in detail in FIGS. 16, 17, and 20) at a corresponding number of spray nozzle inlets 8011 (shown in detail in FIGS. 16, 17, and 20) and delivered via spray nozzle fluid pump 8012 (see FIG. 1).

If not already located on site, concentrate tank 9050 may be established for receiving waste in the form of concentrated waste water from separator dump tank 9000, e.g., via concentrate tank line 9054 connected to separator dump tank line 9007. In the case where the site has multiple fluid tanks 3061, one may be converted to concentrate tank 9050. The overall system 1000 should be set in place so as not to interfere with the flow of site traffic 1003 to operate and service the well and to minimize the length of the lines to and from the other elements at extraction site 1001, e.g., near the gas supply, fluid tank 3061, concentrate tank 9050, and the electrical power source.

FIG. 2A exemplifies the major components of one embodiment of overall system 1000, including air train 2000 (shown in detail in FIG. 6A) for supplying air to a burner 6000, fluid train 3000 (shown in detail in FIGS. 8A and 8B) with fresh water tank 3010 for supplying fresh water or waste water to burner 6000, gas train 4000 (shown in detail in FIG. 7A) for supplying fuel to burner 6000, burner 6000 (shown in detail in FIGS. 9A, 10A, and 10B) for evaporating fresh water or waste water, cyclone separator 7000 (shown in detail in FIGS. 13A and 13B) for separating resultant phases of waste product after they exit burner 6000, particulate matter (PM) wash chamber 8020 (shown in detail in FIGS. 16, 17, and 20) for capturing micronized particles present in the resultant vapor phase, PM scrubber 8000 (shown in detail in FIGS. 16, 17, 18, 19, and 20) for removing liquid droplets containing micronized particles from a vapor phase, liquid pressure vessel 4098 for collecting liquid hydrocarbons from gas train 4000, separator dump tank 9000 for collecting liquid concentrate from separator 7000 (for delivery to concentrate tank 9050), PM dump tank 9020 for collecting liquid droplets containing micronized particles from PM scrubber 8000 (for delivery to fluid tank 3061), trailer 1008 for transport and setup of air train 2000, fluid train 3000, gas train 4000, and burner 6000, and optional PM trailer 8001 for transport and setup of PM separator 8019, as further described herein.

FIG. 2B exemplifies the major components of another embodiment 1200 of the overall system in which vortex separator with PM adapter 7100 (shown in detail in FIGS. 14A and 14B) is employed rather than cyclone separator 7000. FIG. 2C exemplifies the major components of another embodiment 1300 of the overall system in which vortex separator 7200 (shown in detail in FIGS. 15A and 15B) is employed and in which there is no PM scrubber 8000.

Figure 4:
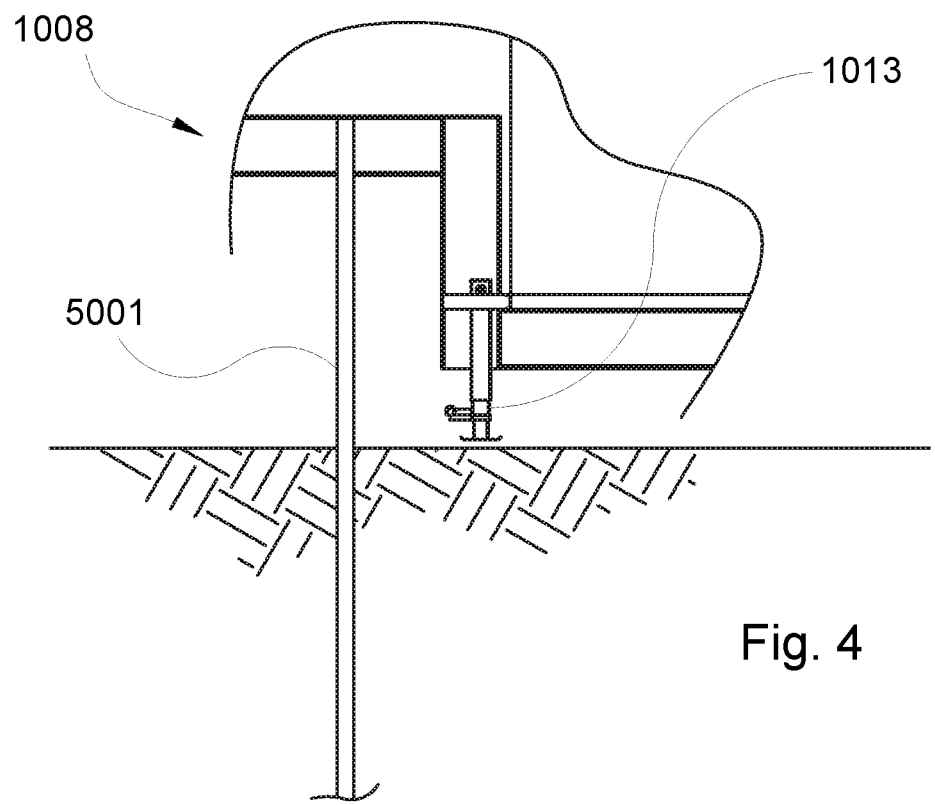
FIG. 4 is a sectional view of a trailer with an electric ground attached to it.

Trailers 1008, 8001 for transporting and temporarily securing heavy machinery in a fixed location are commonly known to persons having ordinary skill in the relevant art. Trailers should conform to the requirements set forth by the U.S. Department of Transportation (USDOT) including specifications relating to the frame, dimensions, weight, number of wheels, hook-up, safety, lights, etc. that would be readily apparent to persons having ordinary skill within the relevant art. FIG. 4 exemplifies a portion of trailer 1008 having jack 1013 and attached electrical ground 5001.

Air Train

Figure 9A:
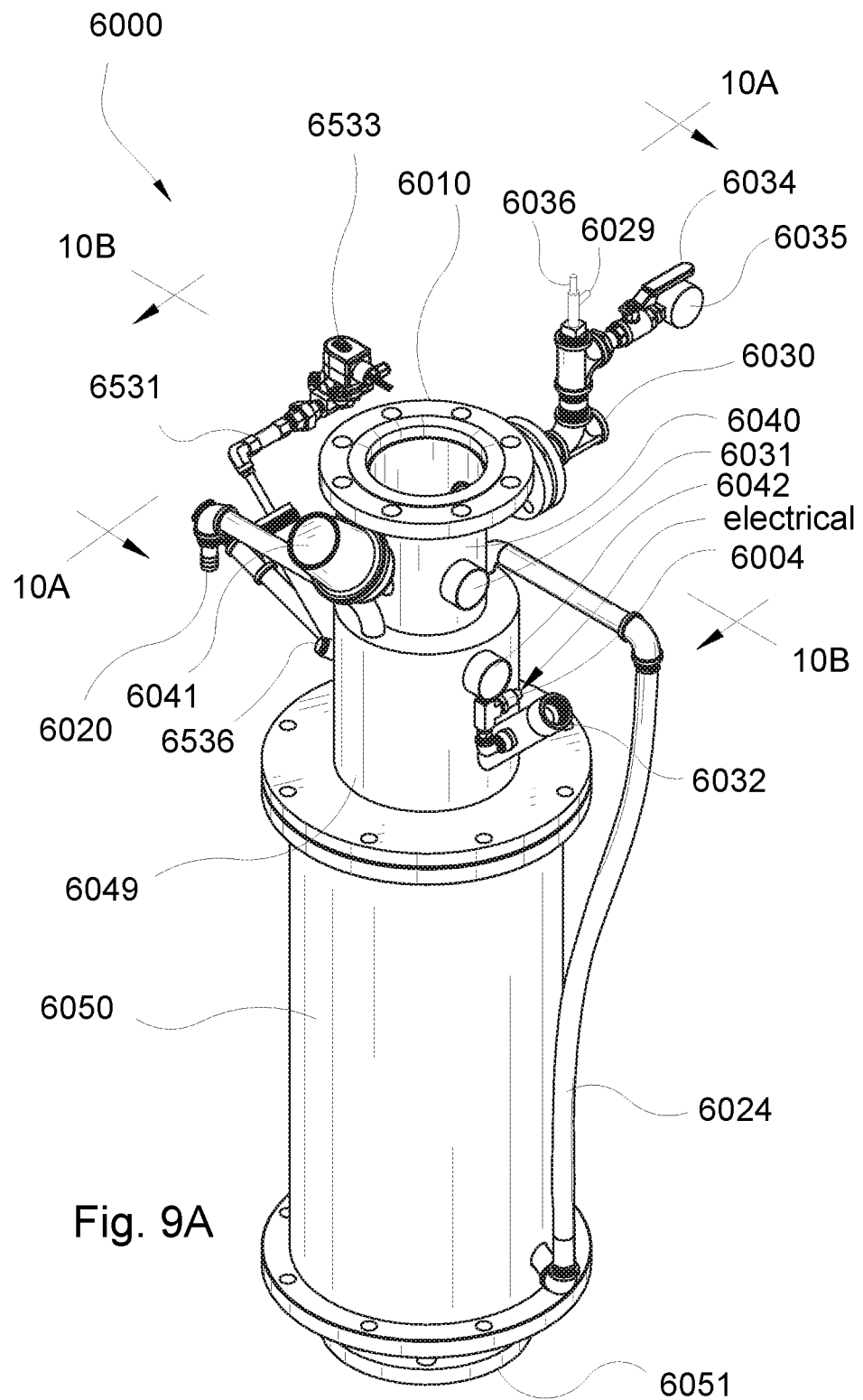
FIG. 9A is a perspective view of a burner of FIG. 2A.
Figure 9B:
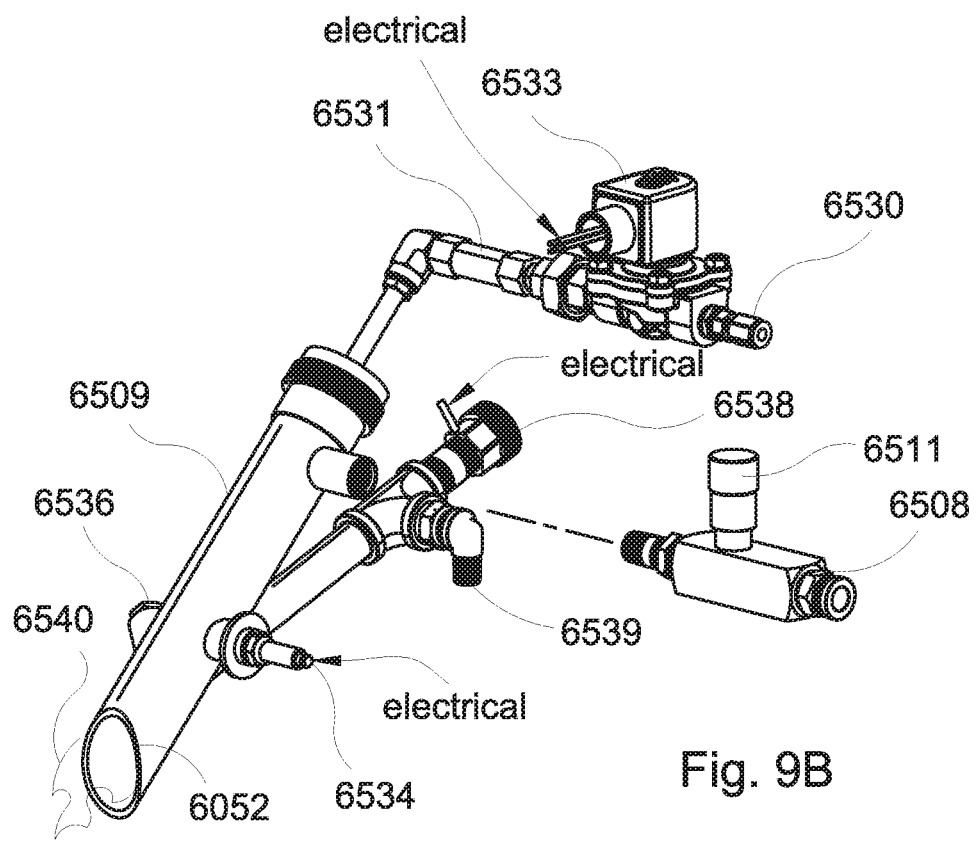
FIG. 9B is a detailed perspective view of a pilot assembly and pilot solenoid of FIG. 9A.

Air train 2000 delivers air to burner 6000 for mixing with fuel gas, for delivering air to air pilot line 6508 (shown in detail in FIG. 9B), and for delivering air to flame sensor cooling input 6539 (shown in detail in FIG. 9B). Materials employed in construction of air train 2000 should be capable of handling pressure up to 15 psig (103 kPa) and capable of withstanding exposure to environmental elements, including ultraviolet radiation, moisture, and dust. Suitable materials include rubber, polyvinyl chloride (PVC), and carbon steel.

Figure 6A:
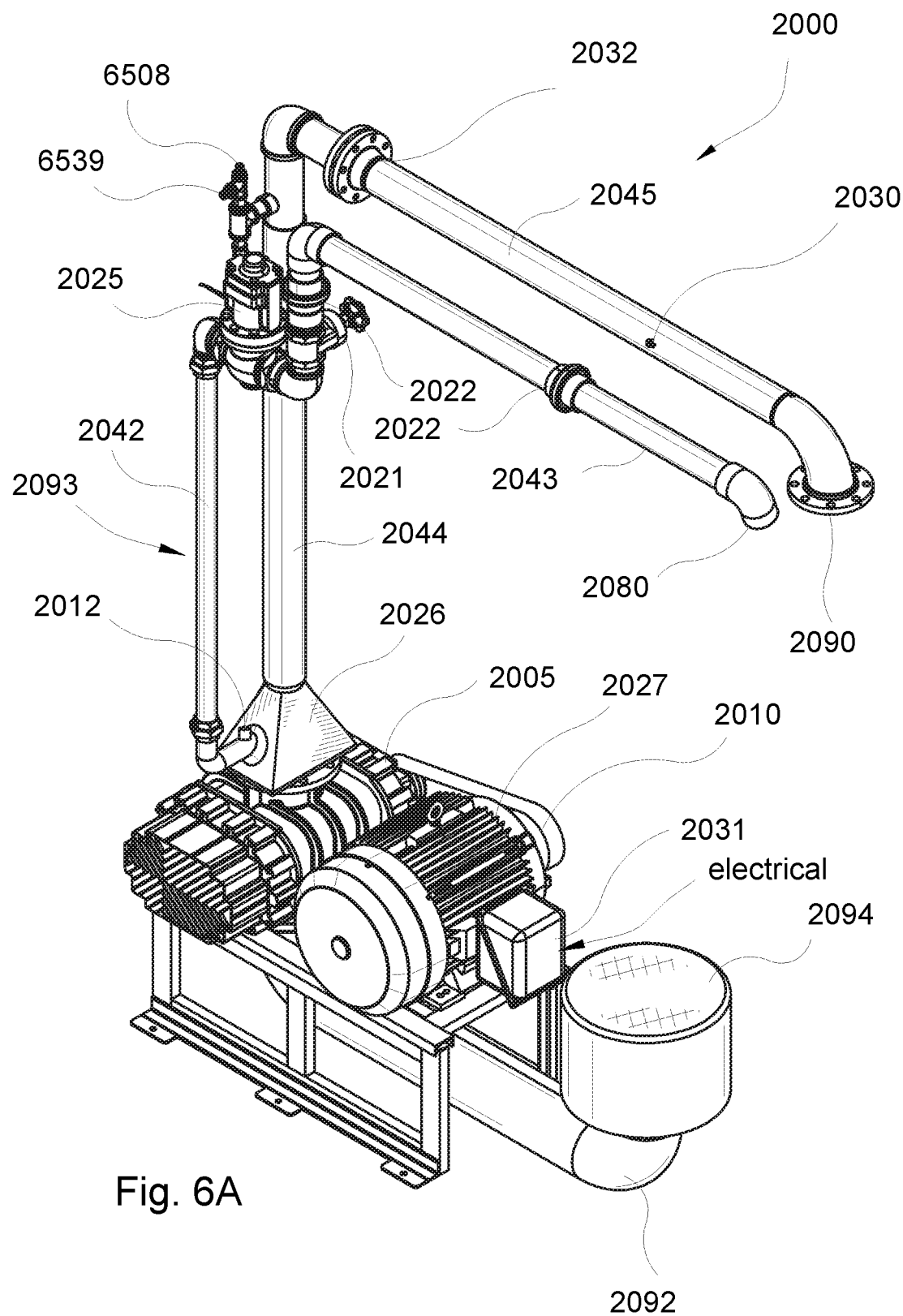
FIG. 6A is a perspective view of an air train of FIGS. 2A, 2B, and 2C.

FIG. 6A exemplifies air train 2000. An air train may be driven by a motor or from a source of pressurized air, such as electric motor 2027 having air train electrical connection 2031. Electric motor 2027 may drive blower 2005, e.g., by use of connected pulley 2010. Air from the atmosphere may be drawn into air inlet 2092 through air inlet filter 2094, through blower 2005, and into air manifold 2026, which may connect to blower to air orifice line 2044 and air bypass 2093 used for adjusting pressure. Blower to air orifice line 2044 may lead to air train flange 2032 housing air orifice 2020 (shown in detail in FIG. 6B) for producing a determined amount of air at a given pressure. Alternatively, a valve or nozzle may control air flow. Air orifice 2020 may open to air orifice to burner line 2045 that connects to burner 6000 at air inlet 6010 (see FIG. 9A). Air orifice to burner line 2045 may be fitted with air pitot tube 2030 or another measurement device suitable for measuring flow rate. Optionally, an oxygen content gauge (not shown) may be located between air orifice 2020 and mixing chamber 6040 of burner 6000.

Blower to air orifice line 2044 may be fitted with air train transducer 2033 and air train pressure gauge 2034 that provides pressure information used in conjunction with the blower 2005 manufacturer's tables to determine C (rate of ambient air from blower) for calculating setup conditions for overall system 1000 (see CONFIGURATION section below). Blower to air orifice line 2044 may connect air pilot line 6508 (see FIG. 10A) to flame sensor cooling input 6539 (see FIG. 9B) to allow air to pass between flame 6053 (see FIG. 10A) and flame sensor 6538 (see FIG. 9B).

Air bypass 2093 may have air pressure safety valve 2012 located near air manifold 2026. Air bypass 2093 may have a blower to quick open/shut solenoid valve line 2042 connecting to quick open/shut solenoid valve 2025 (shown in detail in FIG. 6C), which is in turn connected to quick open/shut solenoid valve to atmosphere line 2043, which may be fitted with air gate valve 2021 and air union joints 2022 (see FIG. 6C). Quick open/shut solenoid valve 2025 may be controlled by a human machine-interface (HMI). Examples of quick open/shut solenoid valves include Magnatrol® 3" (7.6 cm) solenoid valve 44G29 or 44L29. Quick open/shut solenoid valve to atmosphere line 2043 terminates at air bypass output 2080. Quick open/shut solenoid valve 2025 may be controlled by an HMI. When quick open/shut solenoid valve 2025 is closed, air travels only through blower to air orifice line 2044 (which can be used for a "system high" setting, discussed below). When quick open/shut solenoid valve 2025 is open, air travels through quick open/shut solenoid valve to atmosphere line 2043 also, thereby decreasing the flow rate of air being delivered (which can be used for a "system low" setting, discussed below) and thereby affecting the pressure accordingly.

Incorporation of PM scrubber 8000 into overall system 1000 raises the pressure of burn chamber 6050 from about 2 psig (14 kPa) to about 2.5 psig (17 kPa), however it does not have a similar effect on mixing chamber 6040, which has a pressure of about ⅓ psig (2.3 kPa) whether or not PM scrubber 8000 is incorporated. Interestingly, a relatively low-pressure mixing chamber 6040 feeds a much higher-pressure burn chamber 6050, which is different from typical burner systems.

Many configurations of an air train are possible. The purpose of the air train is to supply air to pilot 6500 and (if used) system low/system high air flows to mixing chamber 6040 of burner 6000 and flame sensor 6538 (as a coolant). Based on the foregoing examples, persons having ordinary skill within the relevant art should be capable of constructing an appropriate air train.

Gas Train

Gas train 4000 delivers fuel to burner 6000 and feeds pilot 6500 and flame 6053. Materials used in gas train 4000 should be corrosion resistant, capable of handling a minimum of 100 psig (687 kPa) pressure, and capable of withstanding exposure to environmental elements, including ultraviolet radiation, moisture, and dust. Preferably, piping should comply with American Petroleum Institute (API) or American Society of Mechanical Engineers (ASME) B31.1 guidelines. Suitable materials include carbon steel and polypropylene. Preferably, dials, controls, and main gas valve 4002 (see FIG. 7A) specifications should comply with National Fire Protection Association (NFPA), International Society of Automation (ISA), and International Electrotechnical Commission (IEC) guidelines.

Figure 7A:
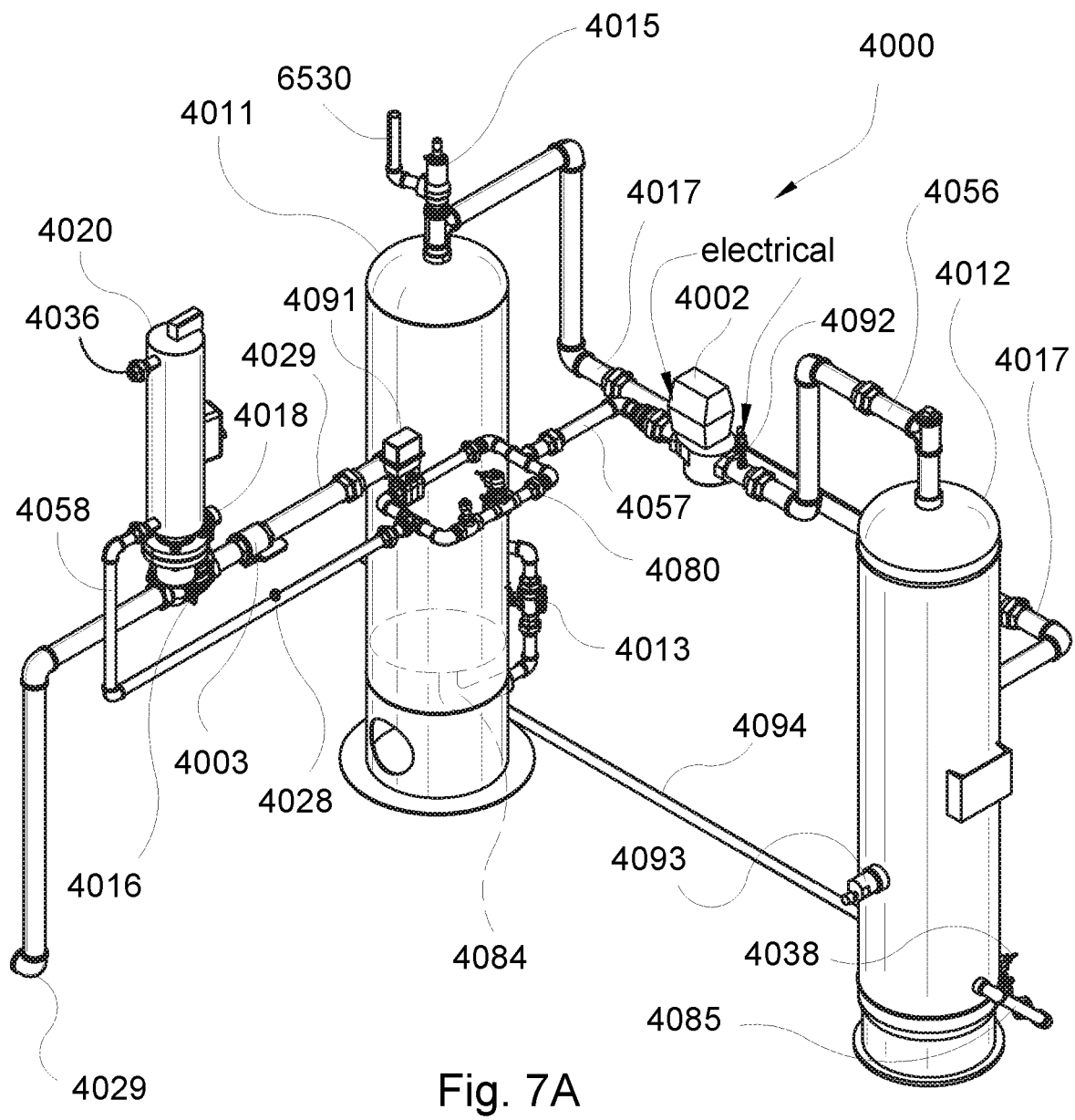
FIG. 7A is a perspective view of a gas train of FIGS. 2A, 2B, and 2C.
Figures 7B, 7C:
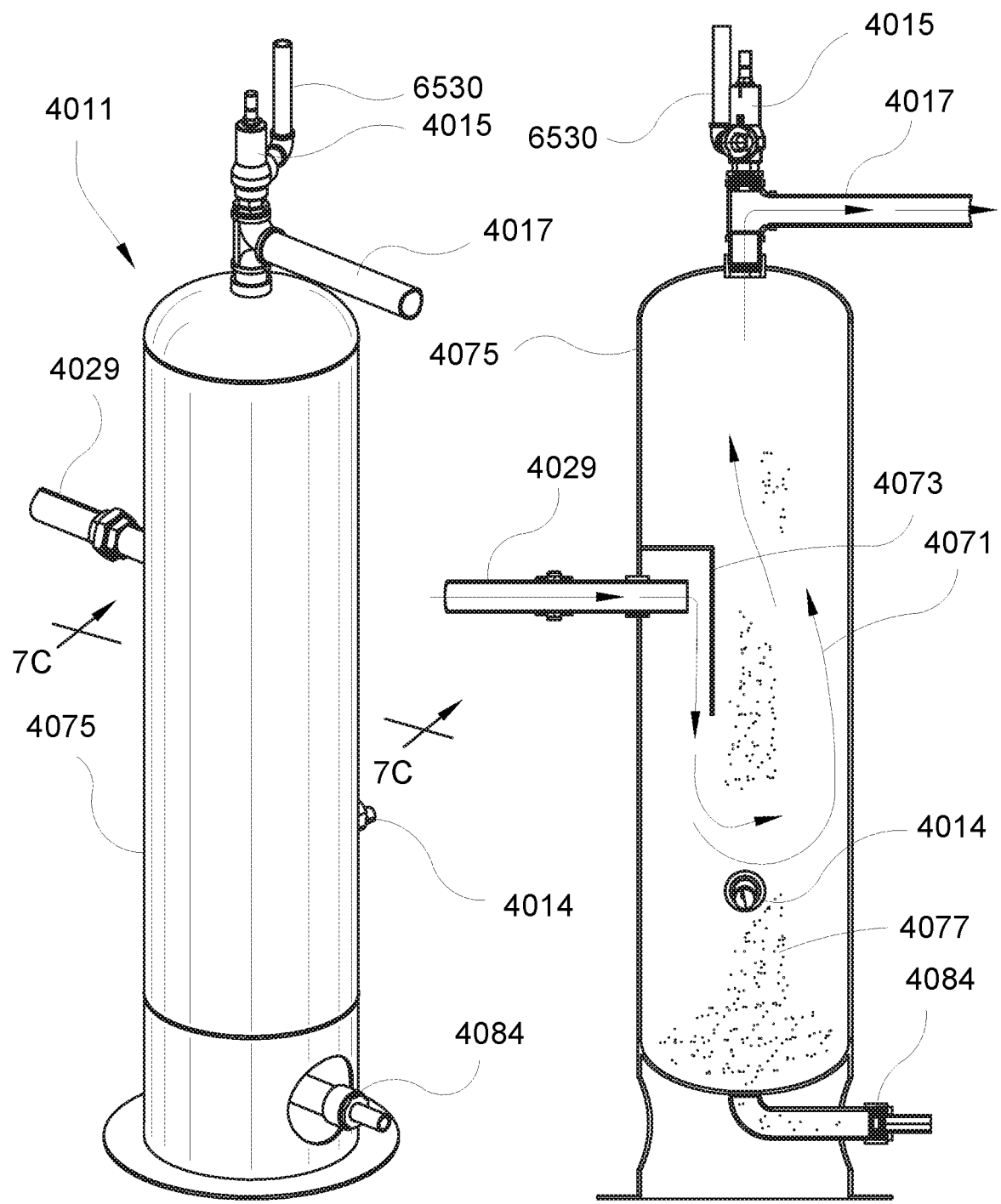
FIG. 7B is a perspective view of a hydrocarbon gravity diverter of FIG. 7A.
FIG. 7C is a sectional view of a hydrocarbon gravity diverter of FIG. 7A.

FIG. 7A exemplifies gas train 4000 for delivering fuel to burner 6000. Because well head gas is unrefined and may vary significantly from site to site, or even at a single site, and even during a single run, it may be useful to condition the fuel prior to use. Gas manifold to gas train line 4029 (shown in detail in FIGS. 7A and 7B) may feed liquid fuel gas to optional hydrocarbon (HC) gravity diverter filter 4011 (rated 125 psig (862 kPa) for example) by transecting the side of HC gravity diverter shell 4075. Gas manifold to gas train line 4029 may be fitted with a gas pressure regulator 4016, e.g., having a diaphragm, and a gas ball valve 4003. HC gravity diverter filter may be fitted with internal plate 4073 (see FIG. 7C) perpendicular to the angle of entry of the gas so as to create pattern of flow 4071 through which liquid hydrocarbon droplet particle waste 4077 settles out at the bottom and eventually may be released, e.g., through gravity diverter to dump line 4084 (see FIGS. 7B and 7C). Droplet particle waste 4077 may be delivered eventually to liquid pressure vessel 4098, e.g., via dump line to liquid HC dump line 4099 (see FIG. 7I), and then to dump to liquid pressure vessel line 4097.

The pattern of flow 4071 may result in liquid gas exiting a top portion of HC gravity diverter shell 4075 through gravity diverter to scrubber filter line 4017, which may be fitted further with pressure release valve 4015. For example, a spring valve may be set to open automatically when a maximum pressure is reached according to the equipment manufacturer's rating and to close automatically when pressure is corrected. A portion of the gas exiting gravity diverter filter 4011 may be directed to gas pilot line 6530 (see FIGS. 7A, 7B, 7C, and 9B) at burner 6000.

Line 4017 may deliver gas to optional hydrocarbon scrubber filter 4012 (shown in greater detail in FIGS. 7D and 7E), for example, by transecting a side of HC scrubber filter shell 4076 (rated 125 psig (862 kPa) for example). HC scrubber filter 4076 may be fitted with internal plate 4074 perpendicular to the angle of entry of the gas so as to create pattern of flow 4072 through which HC droplet particle waste 4078 settles out at the bottom and eventually may be released, e.g., through HC scrubber filter to dump line 4085 that may feed into liquid HC dump line 4094 and then into dump to liquid pressure vessel line 4097. HC scrubber filter 4012 may be fitted with HC scrubber filter mesh 4065 to entrap remaining particle waste 4078.

Figures 7D, 7E:
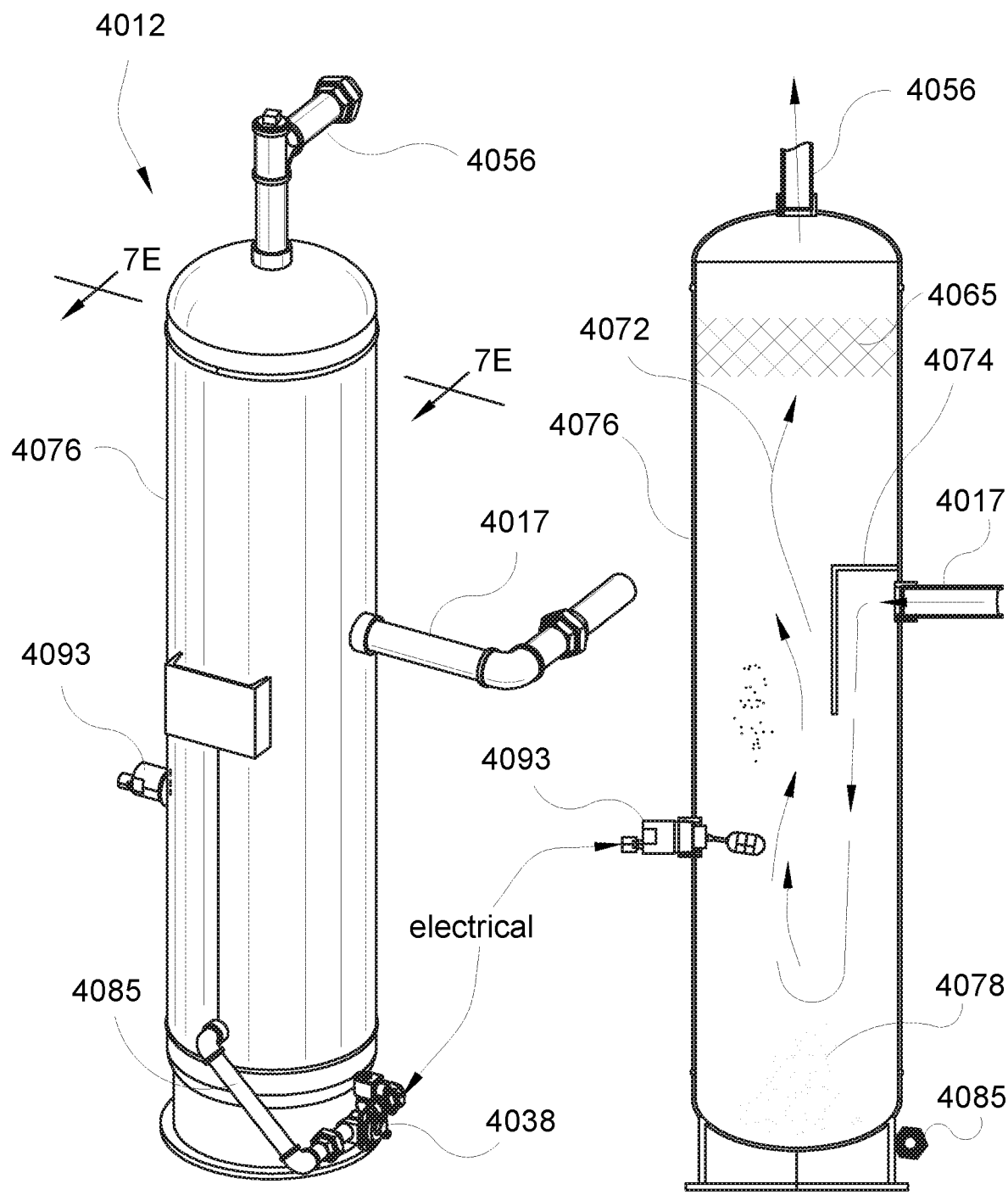
FIG. 7D is a perspective view of a hydrocarbon scrubber filter FIG. 7A.
FIG. 7E is a sectional view of a hydrocarbon scrubber filter of FIG. 7A.
Figure 7I:
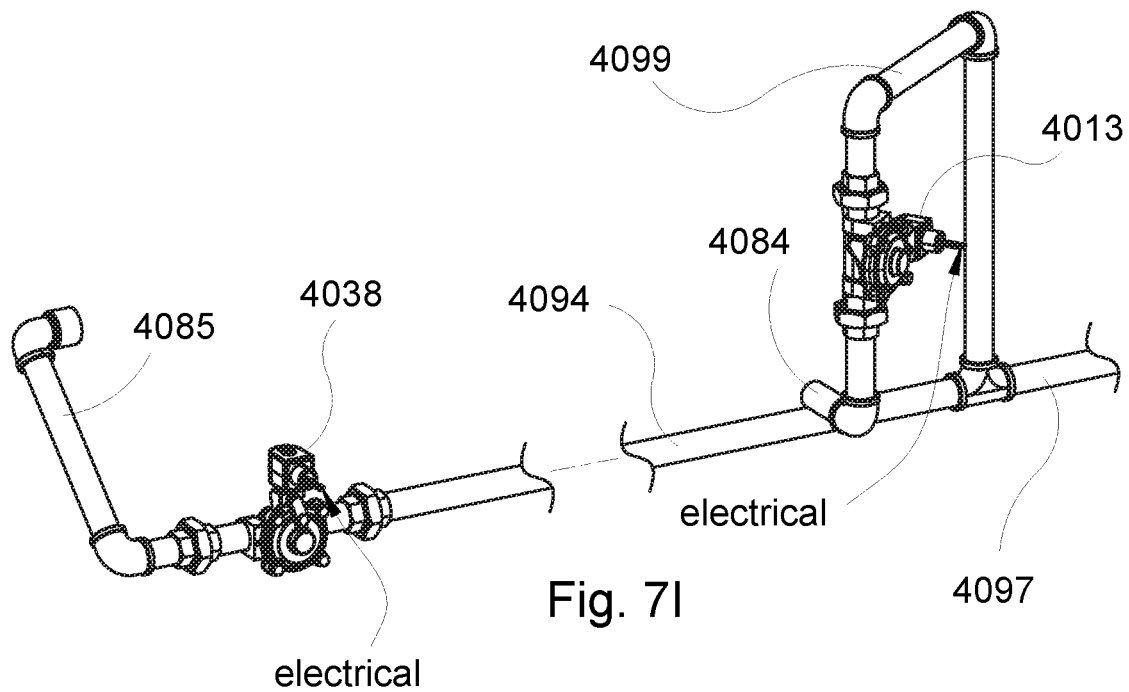
FIG. 7I is a perspective view of a gas train dump line of FIG. 7A.

HC gravity diverter filter 4011 may be fitted with liquid level controller 4014, and optional HC scrubber filter 4012 may be fitted with liquid level controller 4093 (see FIGS. 7B, 7C, 7D, and 7E), either of which indicate when the filter is ready for dumping, e.g., by signaling dump solenoid 4013, 4038 (see FIGS. 7A, 7D, and 7I) to open for draining. For example, FIG. 7E depicts a simple ball float used to detect a particular level of fluid, thus triggering liquid level controller 4093 to signal manual adjustment box 5501 to activate dump solenoid 4013, 4038. Alternatively, this function could be performed automatically if liquid level controller 4014, 4093 signals programmable logic controller (PLC) 5276, which then could signal dump solenoid 4013, 4038, or signals manual adjustment box 5501, which then could signal dump solenoid 4013, 4038 (see FIGS. 7D and 7E). Liquid level controller 4014, 4093 preferably can detect the level of liquid inside HC gravity diverter 4011 or HC scrubber filter 4012, respectively.

Conditioned fuel gas may exit HC scrubber filter 4012 through the top portion of HC scrubber filter shell 4076 for delivery to main gas valve 4002, e.g., through scrubber to main gas valve line 4056 fitted with main gas valve pressure transducer 4092 (see FIG. 7A).

Suitable examples of main gas valves include Honeywell® V5055D1032 (body) and V4055D1043 (actuator). Alternatively, gas that does not need conditioning may be delivered to main gas valve 4002 directly from gas manifold to gas train line 4029.

When the fuel gas is commercial grade or purified, e.g., propane or methane, HC gravity diverter 4011 or HC scrubber filter 4012 may not be necessary. However, HC gravity diverter 4011 or HC scrubber filter 4012 creates a buffer by increasing overall flow rate, therefore utilizing one or both may be beneficial for achieving desired pressure. In the event that only one of HC gravity diverter 4011 or HC scrubber filter 4012 is optionally incorporated into gas train 4000, preferably it is HC scrubber filter 4012.

Figure 7J:
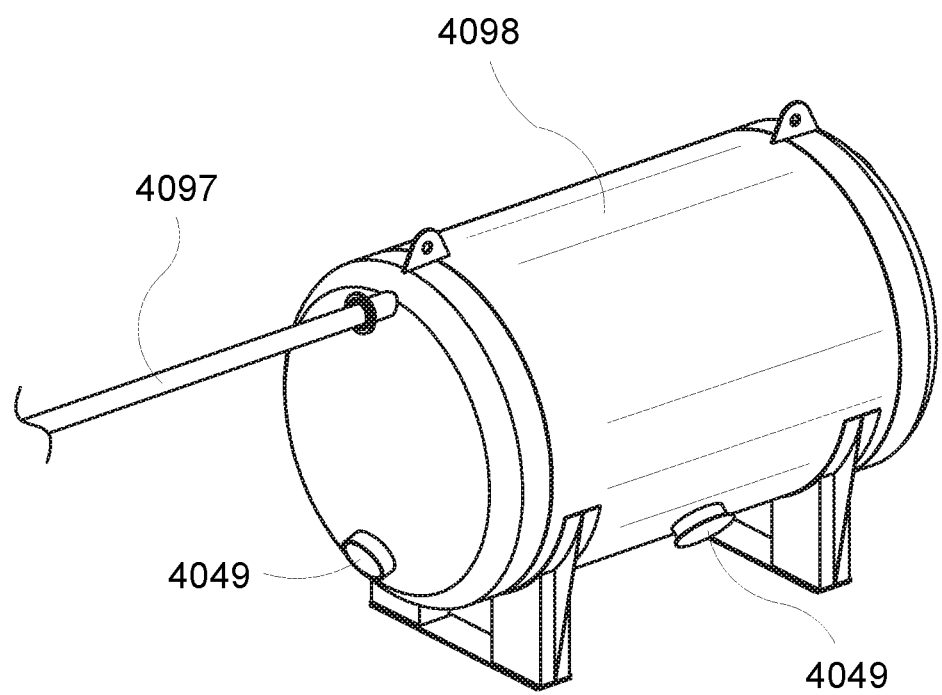
FIG. 7J is a perspective view of a liquid pressure vessel of FIGS. 2A, 2B, and 2C.

Dumped liquid from one or both of gravity diverter filter 4011 and HC scrubber filter 4012 may exit the system, e.g., through dump to liquid pressure vessel line 4097, and enter liquid pressure vessel 4098 for storage (see FIG. 7J), wherein the dumped liquid naturally sustains pressure high enough to maintain it in liquid form. The liquid pressure vessel may include at least one liquid pressure vessel outlet 4049 for emptying and maintaining the vessel.

Gas may be released by main gas valve 4002 to main gas valve to high/low line 4057, in a "system high/system low" configuration. FIG. 7F depicts a two-step high/low assembly 4080 for delivering fuel to heat exchanger 4020 (shown in detail in FIGS. 7G and 7H), in which gas may be delivered from main gas valve 4002, e.g., via main gas valve to high/low system line 4057, which may split into gas high/low stepper low line 4068 and gas high/low stepper high line 4069.

Two-step high/low assembly 4080 may be used to deliver a low flow rate of fuel nearly instantaneously at the time of ignition of flame 6053 in burner 6000, and then to deliver a high flow rate of fuel after the back pressure created by thermal expansion of gas and fluids has stabilized. The exact amount of gas to deliver to burner 6000 can be determined as described further below. Gas high/low stepper low line 4068 may be fitted with automated low gas valve 4091 that may be automatically set to low. Suitable automated gas valves include MarwinValve® electric actuator 115 V AC, 4-20" (10-51 cm), 10 sec cycle, 90°, Model ER-3-10-4. Gas high/low stepper high line 4069 may be fitted with a high gas solenoid 4067 and high gas valve 4066 that may be adjustable incrementally. Gas high/low stepper low line 4068 and gas high/low stepper high line 4069 may rejoin, e.g., at high/low system to heat exchange line 4058, which may be fitted with gas pitot tube 4028 for measuring upstream and downstream pressure and solving a differential to determine a flow rate of gas (Q) flowing through the line (see CONFIGURATION section below). Optionally, at least one spectrometer (not shown) and its electrical supply could be incorporated between HC scrubber filter 4012 and heat exchanger 4020 for analyzing the gas content and determining the BTU (B) value of the gas (see CONFIGURATION section below).

Gas may be directed, e.g., via high/low system to heat exchanger line 4058 leading to heat exchange inlet 4035 located near the bottom of heat exchanger 4020 (see FIGS. 7G and 7H), where gas may enter and flow across heat exchange coils 4037 and out of heat exchange outlet 4036 located near the top of heat exchanger 4020. Heat exchanger 4020 may be fitted further with heat exchanger electrical connection 4095 for heating the coils 4037 and heat exchanger temperature controller 4096 for acting as a thermostat and changing a frequency of the voltage to control the temperature of coils 4037. Heat exchanger 4020 may be fitted with main gas train pressure gauge 4018. One suitable heat exchanger is a Chromalox® heating element 480 V, 3-phase, 3 KW and vessel+temperature control AR-514 277 V AC, 30 Amp, 200-500° F. (93-260° C.). Gas vapor may exit heat exchanger 4020, e.g., through heat exchange outlet 4036, for delivery to gas inlet 6030 (see FIG. 9A) of burner 6000. An additional spectrometer (not shown) may be incorporated between heat exchanger 4020 and burner 6000 for double check Many configurations of a gas train are possible. The gas train facilitates delivery of gas to pilot assembly 6509. A high/low amount of fuel may be delivered to mixing chamber 6040 of burner 6000, and the fuel gas may be conditioned, if necessary. Based on the foregoing examples, persons having ordinary skill within the relevant art should be capable of constructing an appropriate gas train.

Fluid Train

The fluid train delivers fluid to the burner for evaporation processing. Piping use in the fluid train should be corrosion resistant and capable of handling at least 100 psig (689 kPa) pressure. Preferably, materials employed in the fluid train should comply with American Petroleum Institute (API) or American Society of Mechanical Engineers (ASME) B31.1 guidelines. Suitable materials include brass, high density polyethylene (HDPE), polypropylene, and stainless steel.

Figure 8A:
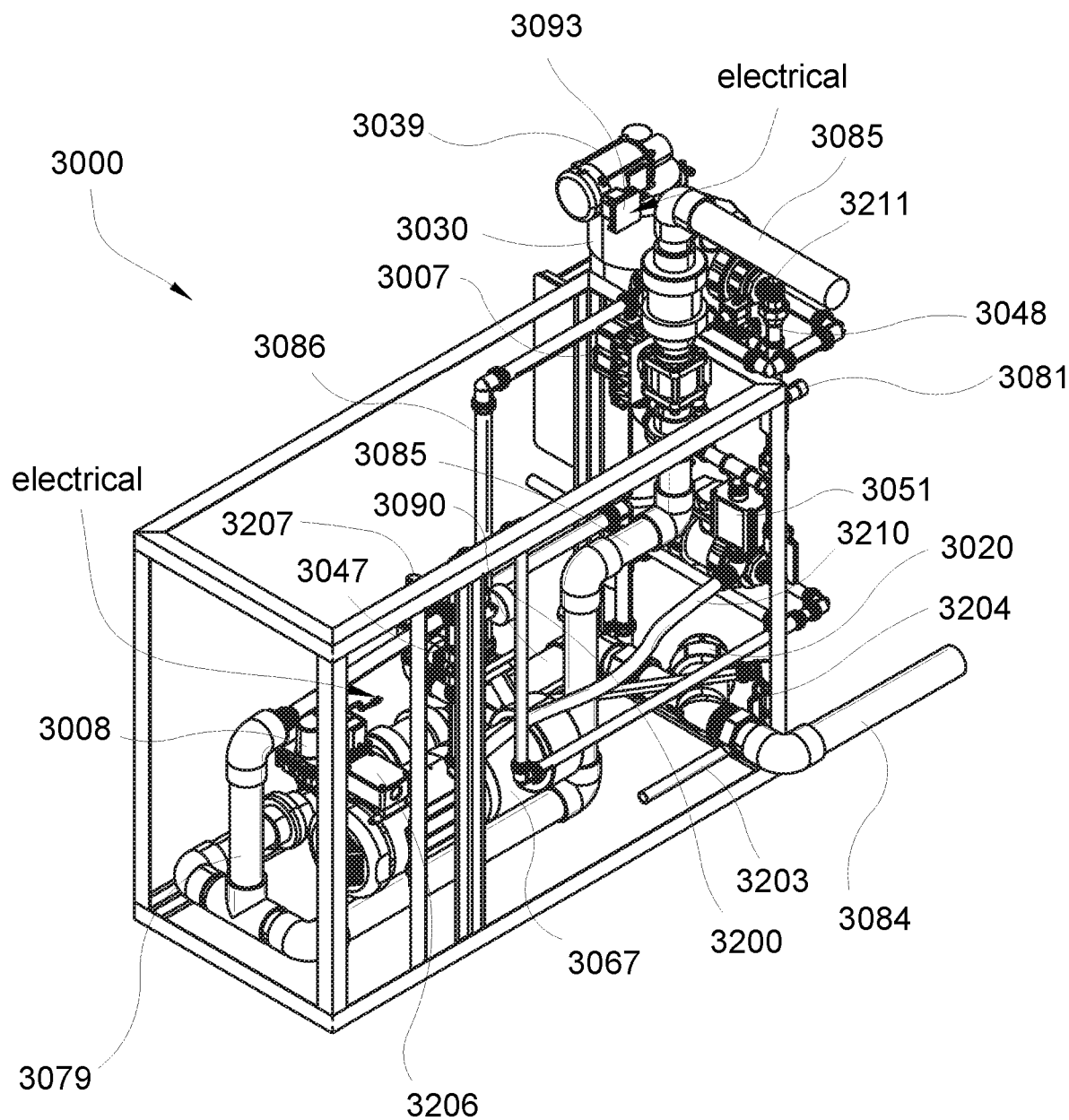
FIG. 8A is a perspective view of a fluid train of FIGS. 2A (View A), 2B, and 2C.
Figure 8B:
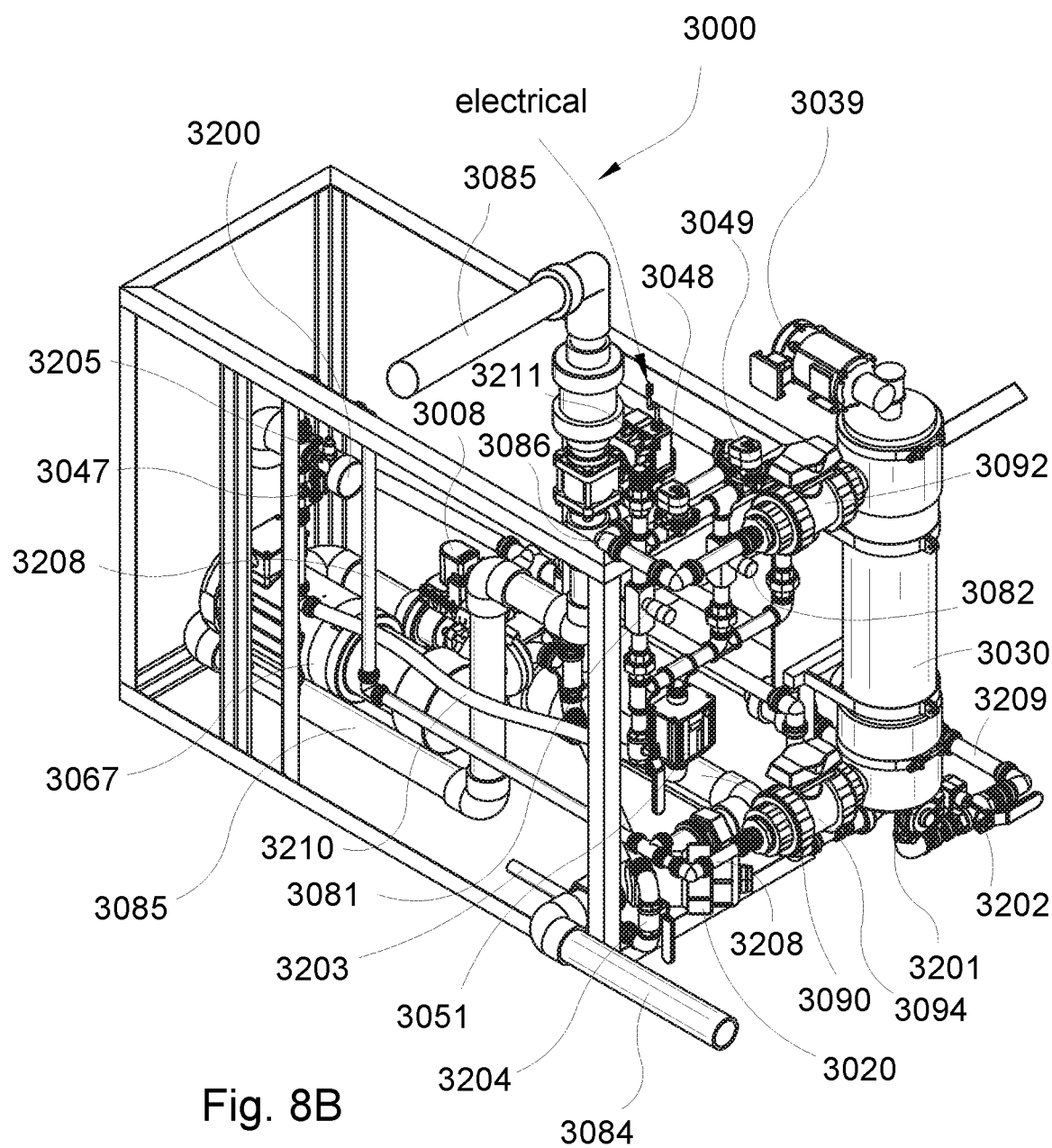
FIG. 8B is a perspective view of a fluid train of FIGS. 2A (View B), 2B, and 2C.
Figure 8C:
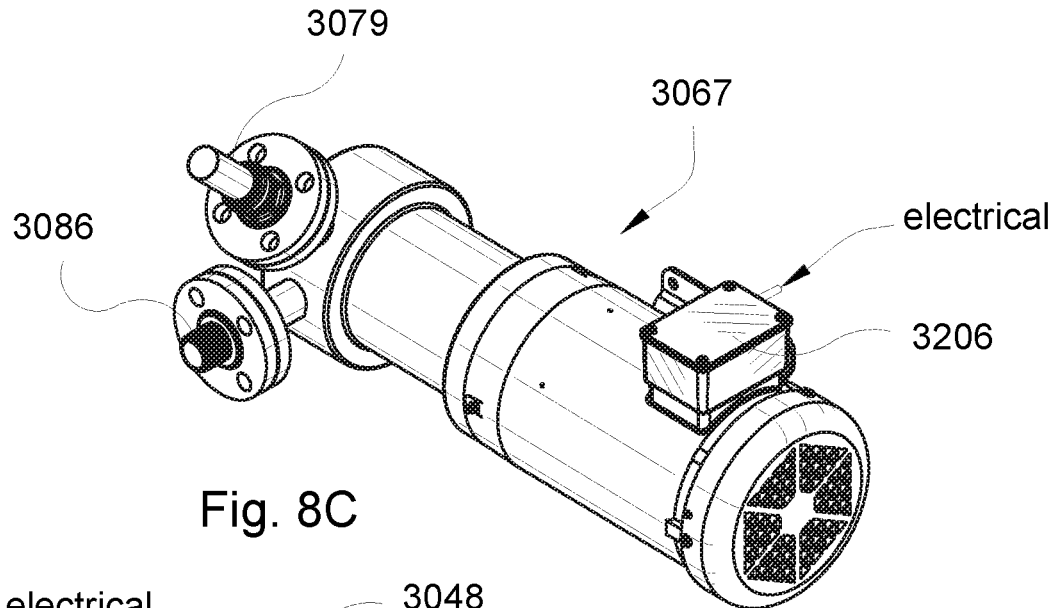
FIG. 8C is a perspective view of a fluid pump of FIGS. 8A and 8B.
Figure 8D:
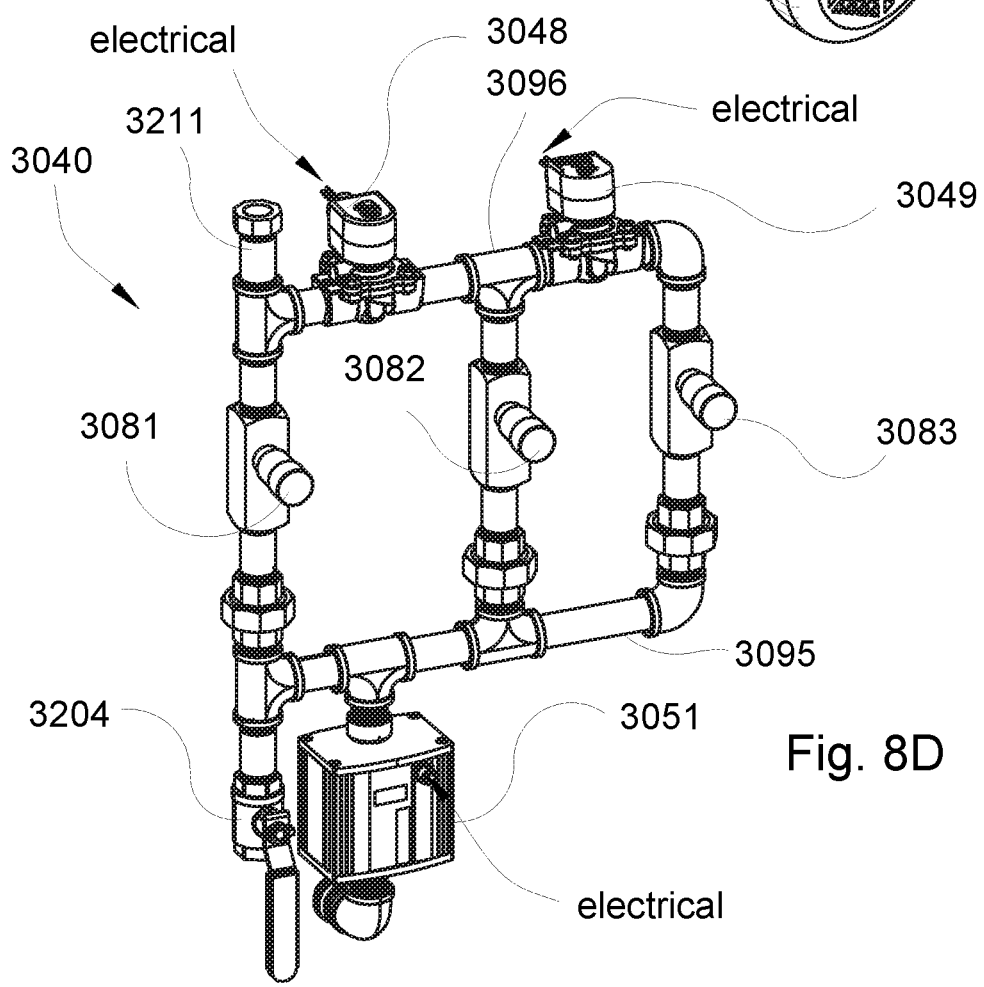
FIG. 8D is a perspective view of a step delivery system of FIGS. 8A and 8B.
Figures 8E, 8F:
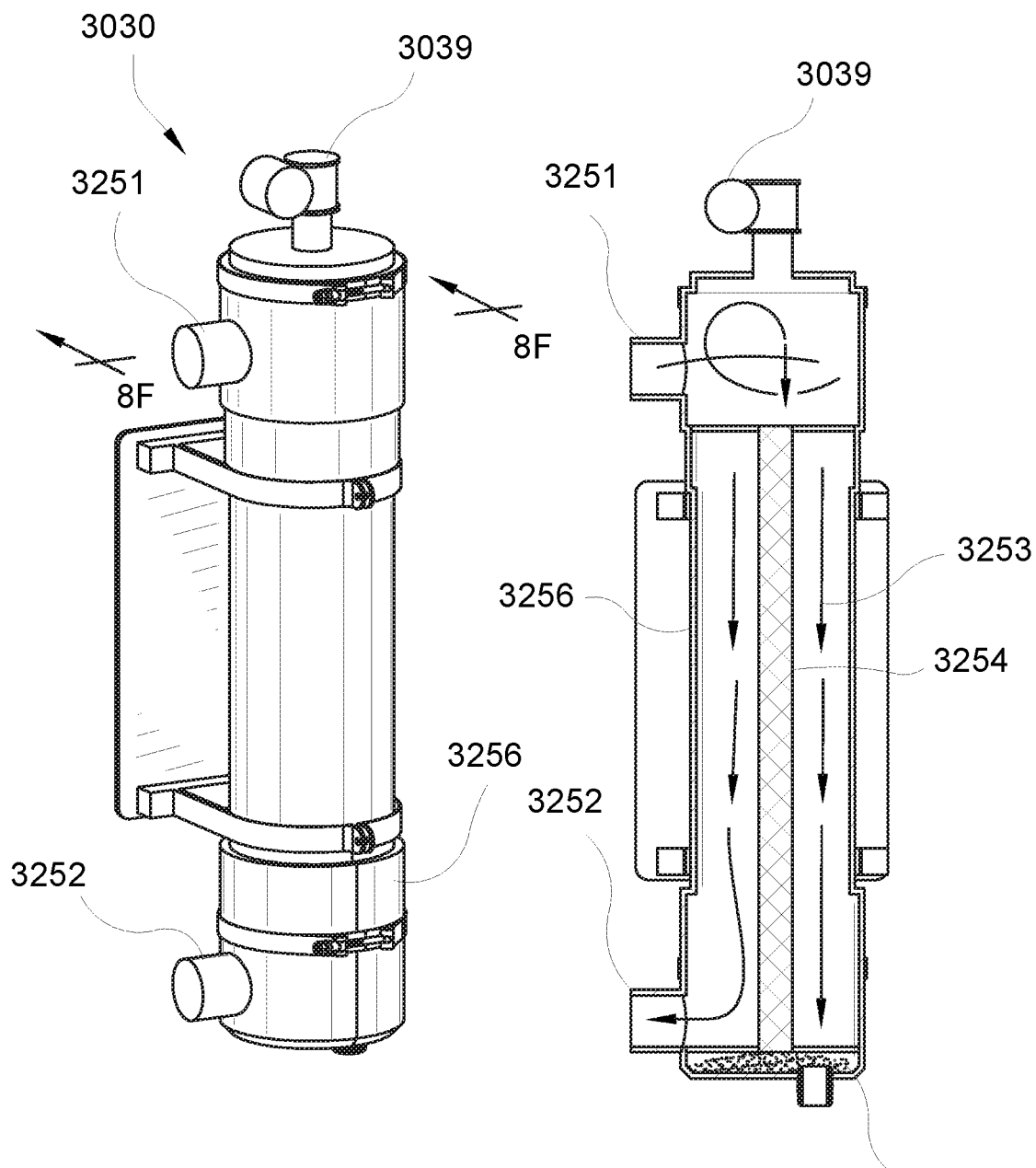
FIG. 8E is a perspective view of a fine filter of FIGS. 8A and 8B.
FIG. 8F is a sectional view of a fine filter of FIGS. 8A and 8B.

FIGS. 8A and 8B exemplify fluid train 3000 for delivering fluid to burner 6000. Fluid train 3000 may receive fluid from multiple sources. One source of fluid may be supplied by fresh water tank 3010 (shown in detail in FIG. 8I), which supplies fresh water to fluid train 3000 for flushing lines, purging air from lines, or for calibration. FIG. 8I exemplifies one setup. Fresh water tank 3010 may be located on fresh water tank support 3054 that may stabilize fresh water tank 3010, and also which may provide additional height to assist raising the pressure of the fresh water going to fluid pump 3067. Preferably, the pressure is great enough to purge fluid train 3000 of air. Fresh water tank 3010 may be fitted with a removable fresh water tank input cap 3052 for replenishing fresh water tank 3010 with fresh water, and fresh water tank valve 3053 for controlling the flow of fresh water. Fresh water tank 3010 may hold water back until fresh water tank valve 3053 is opened, e.g., to fresh water tank line 3055. Fluid train 3000 may be supplied with fresh water, e.g., via fresh water tank to fluid train line 3085 when an automated fresh water valve 3007 is opened (see FIG. 8A) creating pattern of fluid filter flow 3035 (see FIG. 8H) leading to coarse filter/fresh water tank to fluid pump line 3079 directed to fluid pump 3067 (shown in detail in FIG. 8C).

Fluid line outlet 8009 from fluid tank 3061 (see FIG. 3) may supply waste fluid 3060 to fluid coarse filter 3020 (shown in detail in FIGS. 8G and 8H), e.g., via fluid tank to coarse filter line 3084 (see FIGS. 8A, 8B, 8G, and 8H). Fluid may pass through fluid coarse filter 3020 and exit, e.g., via coarse filter line 3090 when an automated fluid valve 3008 (see FIGS. 8A and 8B) is opened, creating pattern of fluid filter flow 3035 (see FIG. 8H) leading to coarse filter/fresh water tank to fluid pump line 3079 directed to fluid pump 3067 (shown in detail in FIG. 8C). The waste fluid may then follow the same path as described above, i.e., forward to fluid pump 3067. Fluid may exit fluid pump 3067 and progress to fine filter 3030 (shown in detail in FIGS. 8E and 8F), e.g., via fluid pump to fine filter line 3086 (see FIGS. 8A, 8B, and 8C). While automated fresh water valve 3007 and automated fluid valve 3008 may both be closed at the same time, only one of them is open at any given time, ensuring that either fresh water or waste fluid for processing is delivered. Fluid train pressure release valve 3207 may be connected to fluid pump to fine filter line 3086 and may relieve excess pressure in fluid train 3000, e.g., by drawing off fluid and re-directing it to concentrate tank 9050, thus protecting fluid pump 3067 from burning out. Optionally, a spectrometer (not shown) and its electrical supply could be incorporated between fine filter 3030 and burner 6000 for analyzing a fluid stream to determine how much water to evaporate during the process (see CONFIGURATION section below).

Figure 8G:
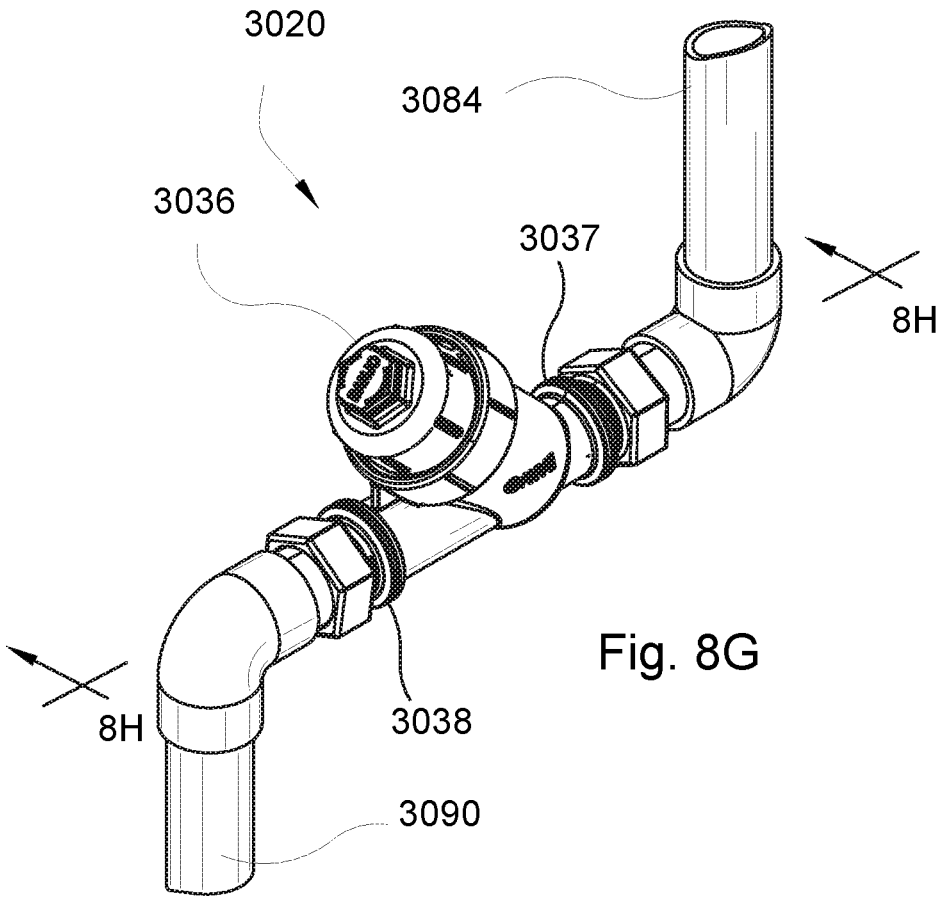
FIG. 8G is a perspective view of a fluid filter of FIGS. 8A and 8B.
Figure 8H:
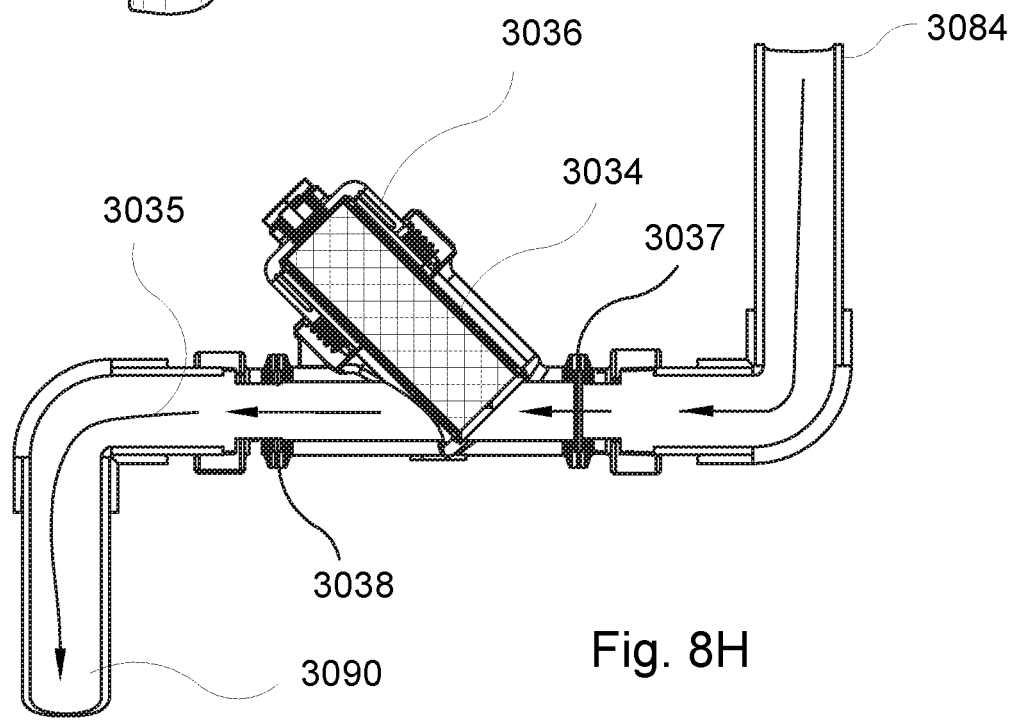
FIG. 8H is a sectional view of a fluid filter of FIGS. 8A and 8B.
Figure 8I:
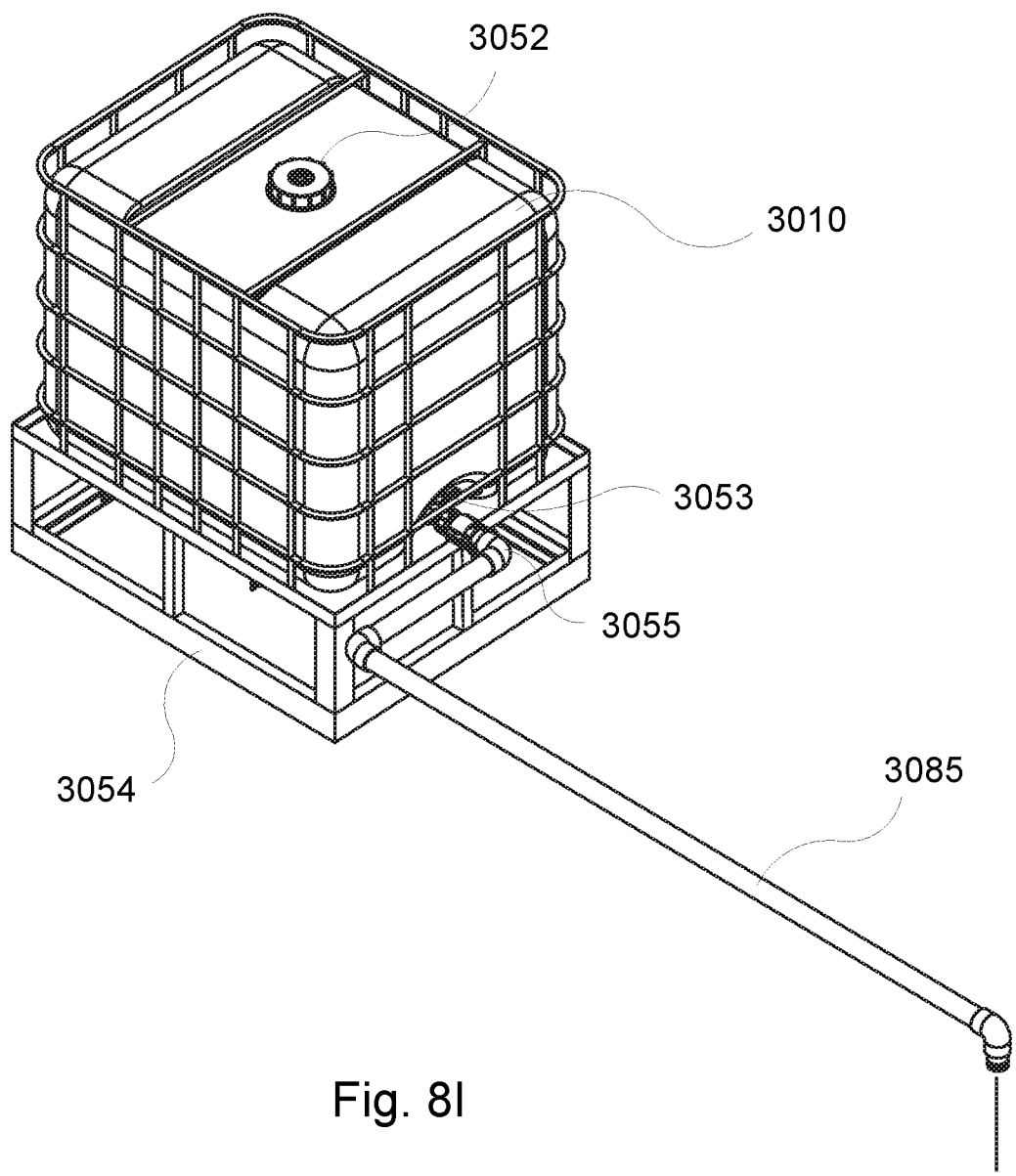
FIG. 8I is a perspective view of a fresh water tank of FIGS. 2A, 2B, and 2C.

FIGS. 8G and 8H exemplify coarse filter 3079 setup. Fluid tank to coarse filter line 3084 may lead to fluid coarse filter inlet 3037, where fluid may pass through fluid filter mesh 3034, and exit fluid coarse filter 3020, e.g., via fluid coarse filter outlet 3038 leading, e.g., to coarse filter line 3090. Coarse filter 3020 may be fitted with fluid filter cap access 3036. Coarse filter 3079 typically entrains particles in the size range of about 500 to about 1000 microns.

FIG. 8C exemplifies fluid pump 3067, having connection for coarse filter/fresh water tank to fluid pump line 3079 (in), connection for fluid pump to fine filter line 3086 (out), and fluid train electrical pump connection 3206.

Figure 8J:
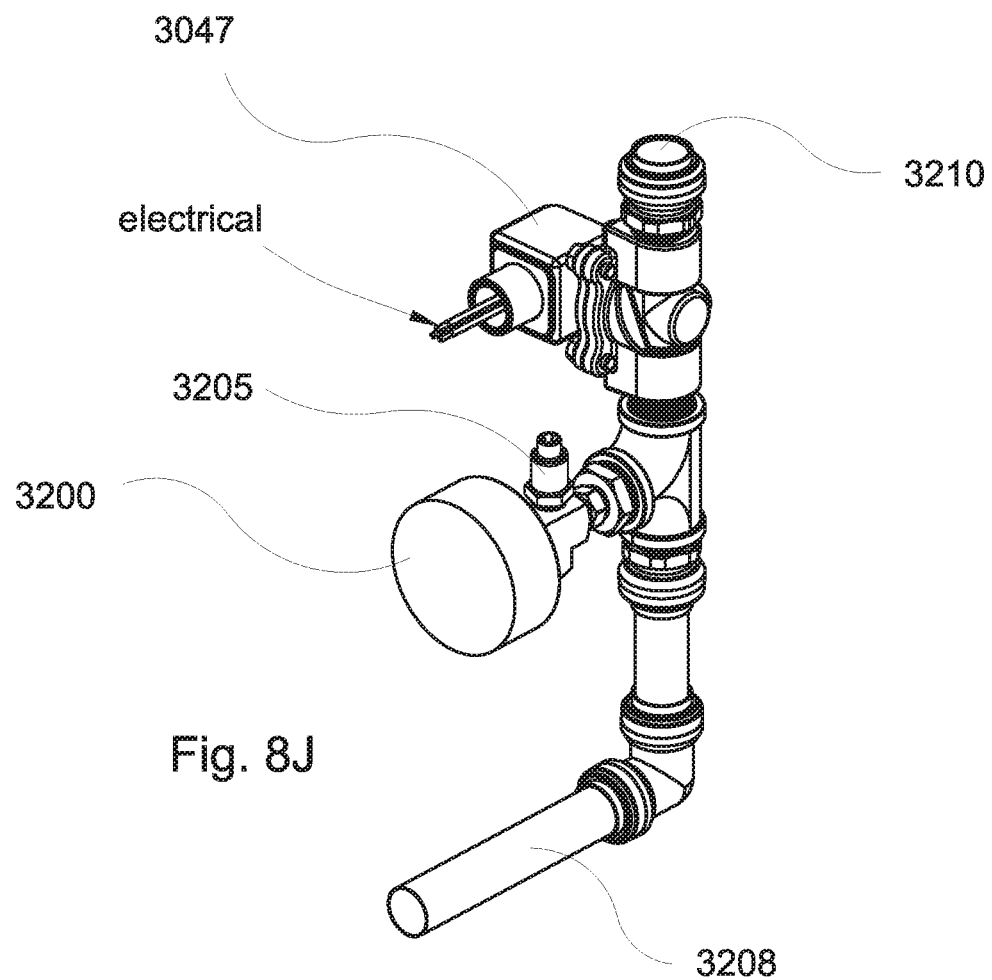
FIG. 8J is a detailed perspective view of a fluid pressure gauge and ramp up flow solenoid fluid valve of FIGS. 8A and 8B.
Figure 8K:
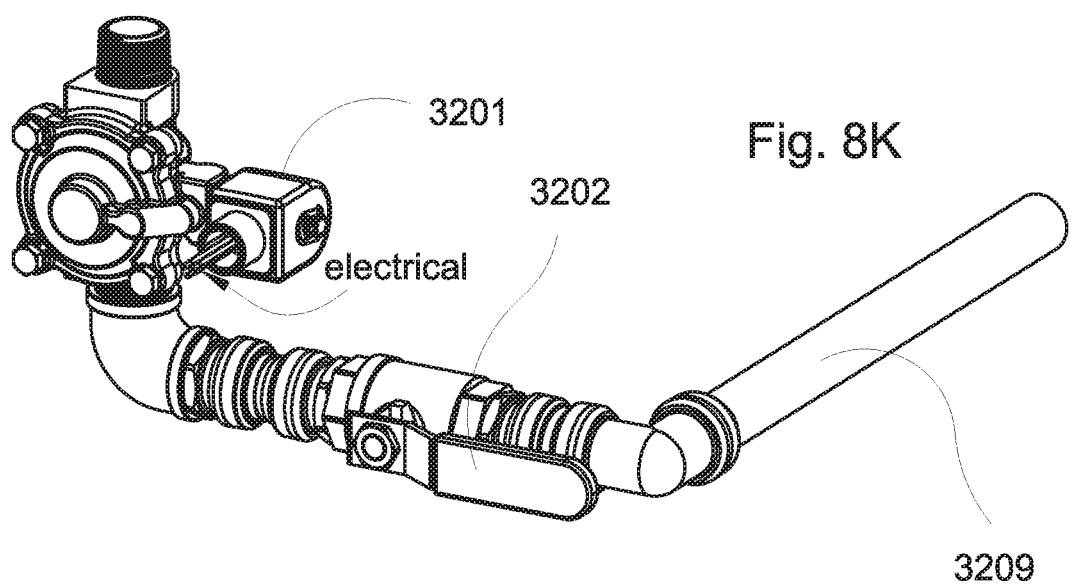
FIG. 8K is a detailed view of a fine filter solenoid.

Fluid may be delivered to fine filter 3030 (shown in detail in FIGS. 8E and 8F), e.g., via fluid pump to fine filter line 3086 connected to fine filter 3030 via valve 3092 (see FIG. 8B) leading to fine filter fluid in conduit 3251 transecting fine filter shell 3256 near the top of vertical fine filter 3030. Preferably, fine filter 3030 is self-cleaning. Fine filter 3030 may have fine filter engine 3039 with fine filter electrical connection 3093 (see FIG. 8A). Examples of motorized self-cleaning filters include Spiral Water® Model 810. Fine filter flow pattern 3253 is substantially downward through fine filter mesh 3254, owing to gravitational force. Fine filter particle waste 3255 may collect at the bottom of fine filter 3030. The bottom of fine filter 3030 may be fitted with fine filter solenoid 3201, fine filter valve 3202, and fine filter fluid dump line 3209 for purging (see FIG. 8K). This action may be set on a timer for automated self-cleaning. Fine filter 3030 typically entrains particles in the size range of about 50 to about 150 microns.

Fluid may exit fine filter 3030, e.g., through fine filter fluid out conduit 3252 transecting fine filter shell 3256 near the bottom of vertical fine filter 3030, but high enough to avoid liberation of fine filter particle waste 3255. Fine filter fluid out conduit 3252 may connect to fine filter out valve 3094 (see FIG. 8B) opening to fine filter to fluid pressure gauge line 3208 (see FIG. 8J), which may be fitted with fluid pressure gauge 3200, fluid pressure transducer 3205, ramp up solenoid 3047 (for ramp up flow line 3081), and fluid pressure gauge to low/high step system line 3210 (in a system high/system low configuration).

FIG. 8D exemplifies a setup for step fluid delivery 3040. Waste fluid is unlike fresh water with respect to reaction and pressure created in burner 6000, and it causes inconsistencies in pressure. Back pressure from the thermal expansion of waste fluid slows air flow and increases gas flow, causing instability in the system that can extinguish flame 6053. For example, thermal expansion of water to vapor may result in an approximately 1600× increase in volume. Step fluid delivery 3040 may increase stability, in one example, by delivering approximately one third of the total desired fluid flow sequentially, depending on the type of gas employed, using a calculation for the rate (such as in GPM) of waste fluid that is capable of being evaporated (see CONFIGURATION section below). Initially, low delivery may be used to start the expansion and resulting increase in pressure.

Fluid pressure gauge to low/high step system line 3210 (see FIGS. 8A and 8B) may connect to fluid flow meter 3051 for three parallel lines, each fitted with a valve. Ramp up flow line 3081 may open at the time of combustion to deliver approximately one third of the total flow rate of fluid (Tw) to be delivered (see CONFIGURATION section below). In one example, low flow line 3082 may open when the burner temperature reaches approximately 220° F. (104° C.) to deliver approximately two thirds of the total flow rate of fluid (Tw) delivered by ramp-up flow line 3081 alone. In other embodiments, low flow line 3082 may be configured to open when the burner temperature reaches a set point in a range from 210-230° F. (99-110° C.). High flow line 3083 may open when overall system 1000 is running stably, e.g., after about one minute, to deliver the full flow rate of fluid to be delivered (Tw) to burner 6000. The process may be run at system low or at system high, depending on the total amount of fluid to be evaporated. For example, if a fluid level in fluid tank 3061 is relatively low, it may be desirable to conduct the operation at system low level. Ramp up, low, and high flow lines 3081, 3082, and 3083 may be interconnected, each being joined at their bottoms to lower step system connecting line 3095 and at their tops to upper step system connecting line 3096. The ends of low flow line 3082 and high flow line 3083 open only to lower and upper step system connecting lines 3095, 3096. Ramp up flow line 3081 may be capable of opening at its lower end to fluid pump purge valve 3204 leading to fluid pump purge line 3203 (see FIGS. 8A and 8B), and at its upper end for delivery of fluid to burner 6000, e.g., via low/high step system to burner line 3211. Low flow solenoid 3048 may be situated on upper step system connecting line 3096 between the connection points of ramp up flow line 3081 and low flow line 3082. Similarly, high flow solenoid 3049 may be situated on upper step system connecting line 3096 between the connection points of low flow line 3082 and high flow line 3083. In an exemplary alternate embodiment, a single line may be used to deliver ramp up, low, and high flow rates of fluid using a solenoid/valve system capable of metering the staged delivery of fluid described herein. Alternate configurations for delivery of metered or stepwise fluid delivery would be readily apparent to persons having ordinary skill in the art.

Many configurations of fluid train 3000 are possible. The fluid train often has the ability to remove particles of up to about 100 microns in diameter from fluid. A purpose of the fluid train is to deliver fresh water and waste fluid step-wise to burner 6000. Based on the foregoing examples, persons having ordinary skill within the relevant art should be capable of constructing an appropriate fluid train.

Burner

Figure 10A:
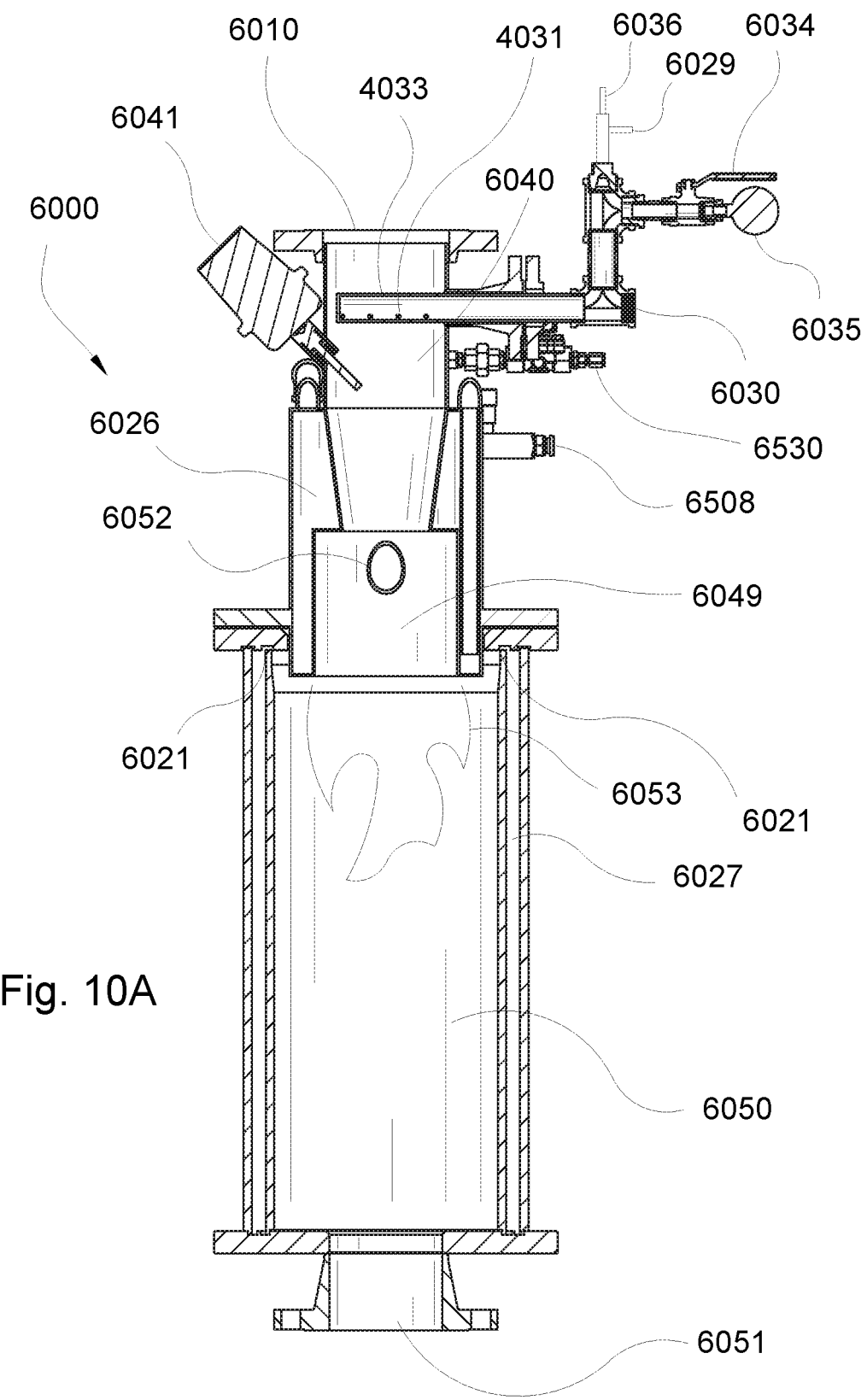
FIG. 10A is a sectional view of a burner of FIG. 9A.
Figure 10B:
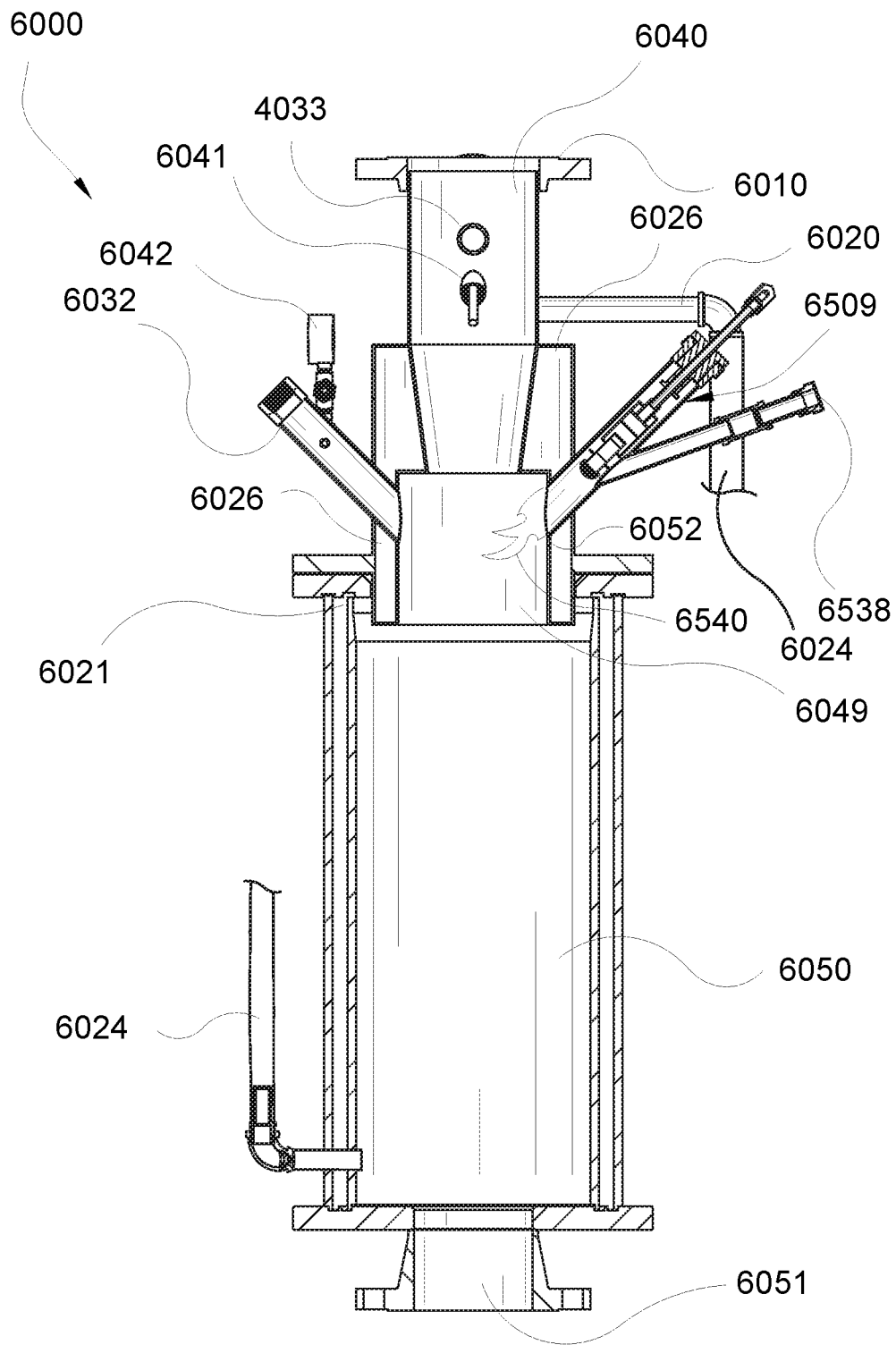
FIG. 10B is a sectional view of a burner of FIG. 9A.

The air train, gas train, and fluid train converge at burner 6000 (see FIGS. 10A and 10B). Burner 6000 provides the energy and closed environment for rapid, contained evaporation of fluid and conversion of some of the fluid to vapor by direct exposure to an open flame 6053.

Burner 6000 should be constructed of materials that are corrosion resistant, heat resistant, and capable of withstanding a minimum of 25 psig (172 kPa). Preferably, the burner should comply with American Society of Mechanical Engineers (ASME) Section VIII, Div. 1. Preferably, controls and fuel lines should comply with National Fire Protection Association (NFPA) 85, 86 and 87, International Society of Automation (ISA) 84 (as referenced by NFPA), and International Electrotechnical Commission (IEC) 61511 (as referenced by NFPA). Suitable burner materials include 316L stainless steel. Flame sensor 6538 (shown in detail in FIG. 9B) and burner control management device 5241 (see FIG. 5B) should be capable of verifying the presence of pilot flame 6540 (see FIGS. 9B and 10B), and implementing safety controls for shutting down the system when certain parameters relating to safety are out of specification. Flame sensor 6538 (see FIGS. 9B and 10B) and burner control management device 5241 should comply with U.S. Underwriters Laboratories (UL) guidelines. Suitable flame sensors include Honeywell® IR Flame Sensor w/Magnifying Lens Model C7915A1010. Suitable burner control management devices include Fireye® Modular M-Series II.

FIGS. 9A, 10A, and 10B exemplify burner 6000, which may have main internal components of mixing chamber 6040 for air and fuel located at the top of burner 6000, and which may extend downward into flame chamber 6049 for igniting flame 6053, which may extend downward into burn chamber 6050 at the bottom of burner 6000 for evaporation of fluid. Optionally, a bottom portion of mixing chamber 6040 may be narrower than a top portion to aid in directing flow to flame chamber 6049. For example, bottom portion of mixing chamber 6040 may be conically shaped, with the narrowest end extending to or into flame chamber 6049. Burner 6000 may have a plurality of inlets and outlets, but otherwise it is substantially closed. Air output 2090 (see FIG. 6A) from air train 2000 may connect to burner 6000 at air inlet 6010. Heat exchange outlet 4036 (see FIGS. 7G and 7H) from gas train 4000 may provide fuel gas to gas inlet 6030 leading to gas orifice pipe 4033 extending into burner 6000 (shown in detail in FIG. 11). Gas inlet 6030 may be fitted with gas pressure valve 6034, gas pressure gauge 6035, gas orifice thermocouple 6029, or gas orifice pressure transducer 6036. Low/high step system to burner line 3211 (see FIG. 8D) from fluid train 3000 may supply fluid to fluid inlet 6020.

Bottom portion of mixing chamber 6040 and upper portion of flame chamber 6049 into which it extends may be enclosed in fluid surround chamber 6026 on the internal perimeter of burner 6000. Fluid inlet 6020 may deliver fluid to fluid surround chamber 6026, which serves to cool the bottom of mixing chamber 6040 and the top of flame chamber 6049. Fluid surround chamber 6026 additionally serves to pre-heat fluid. Pre-heated fluid may exit fluid surround chamber 6026, e.g., via fluid transfer line 6024 for delivery to burn chamber 6050, e.g., via annulus 6027.

As an example, bottom portion of mixing chamber 6040 may have a conical section having a length of 5.5" (14 cm) and inner diameter and outer diameter (ID/OD) of 5.35"/5.56" (13.6/14.1 cm) narrowing to an ID/OD of 3.83"/4.05" (9.7/10.3 cm) where it meets flame chamber 6049. This section of mixing chamber 6040 may have a volume of 92 cubic inches (1.5 L) and a surface area of 80 square inches (516 cm$^2$). In some embodiments, a volume in the range of 85-99 cubic inches (1.4-1.6 L) is preferred. Flame chamber 6049 may have a length of 6.5" (16.5 cm) and an ID/OD of 6.375"/6.593" (16.2/16.75 cm) with a volume of 207 cubic inches (3.4 L) and a surface area of 143 square inches (923 cm$^2$). Fluid surround chamber 6026 corresponding to bottom conical portion of mixing chamber 6040 and flame chamber 6049 may have a length of 6.5" (16.5 cm) and an ID/OD of 6.539"/8.407" (16.6/21.35 cm) with a volume of 139 cubic inches (2.3 L) and a surface area of 349 square inches (2250 cm$^2$).

Figure 9C:
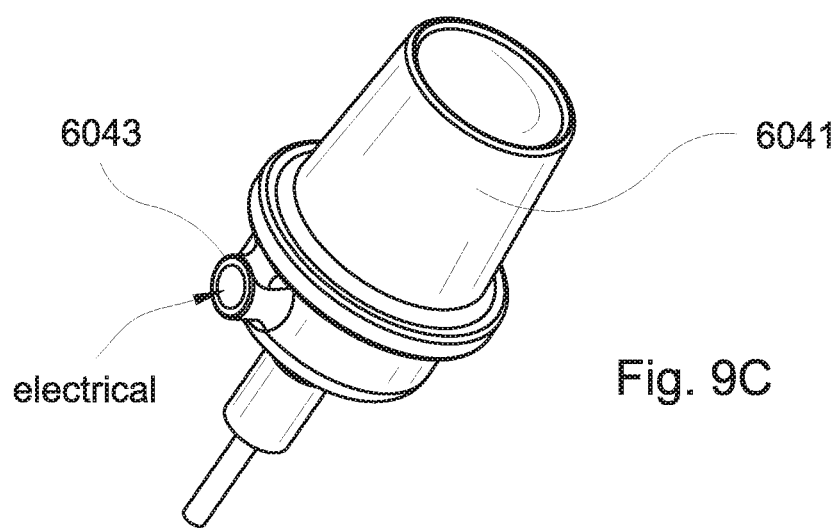
FIG. 9C is a detailed perspective view of a temperature sensor of FIG. 9A.
Figure 11:
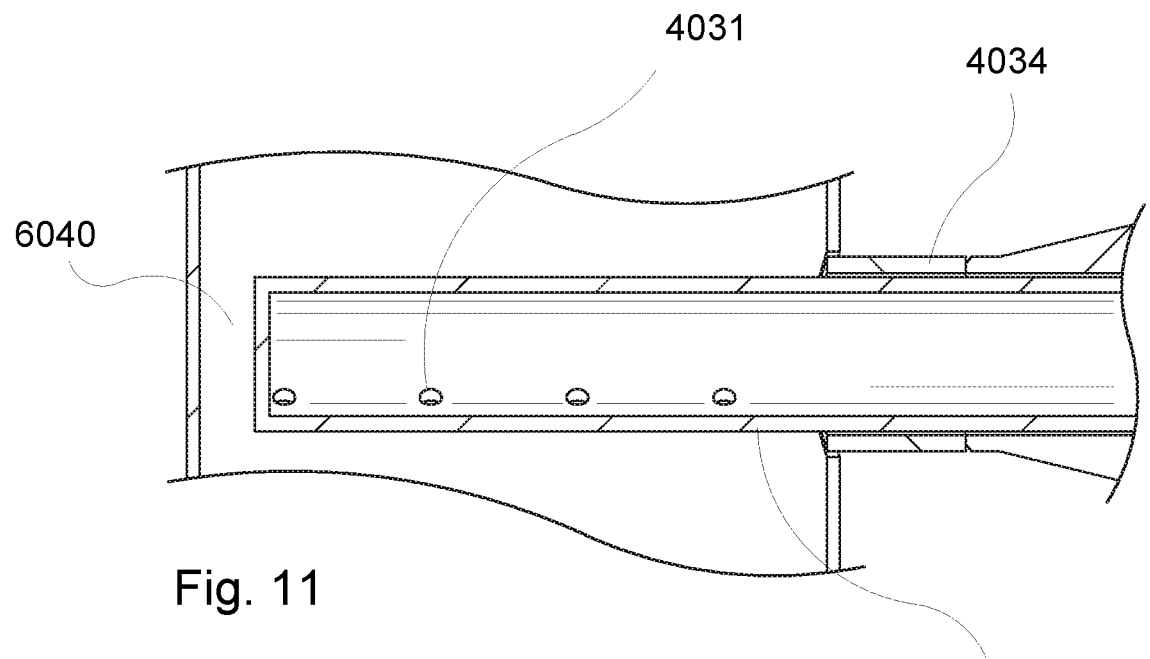
FIG. 11 is a detailed sectional view of FIG. 10A showing detail of a gas orifice.

Mixing chamber 6040 may be fitted with temperature sensor 6041 (shown in detail in FIG. 9C), mixing chamber pressure transducer 6031, and gas orifice pipe 4033 (shown in detail in FIG. 11). Gas orifice pipe 4033 may attach externally to mixing chamber 6040 via gas orifice coupling 4034 and extend into mixing chamber 6040. Gas orifice pipe 4033 may have a plurality of gas orifice holes 4031 (see FIG. 11) for delivery of fuel gas to mixing chamber 6040. Preferably, the number of gas orifice holes 4031 is 3 to 9, depending on their size (see CONFIGURATION section below), although more holes are also possible. Optionally gas orifice pipe 4033 may include gas orifice holes 4031 that may be manually or automatically adjustable to work in conjunction with gas pressure regulator 4016 for providing a wider range of potential flow rates of fuel gas. This may be advantageous in scenarios where there is a high fluctuation in the desired or required evaporation rate that cannot be accommodated solely by gas pressure regulator 4016. Inclusion of gas orifice pipe 4033 having adjustable gas orifice holes 4031 may avoid the need to stop processing to substitute a different gas orifice pipe 4033 having a different number of gas orifice holes 4031 of holes of different diameter. Temperature sensor 6041 may extend into mixing chamber 6040 and may have an external electrical input 6043 (see FIG. 9C).

Flame chamber 6049 may be fitted with external burner sight glass 6032 extending through fluid surround chamber 6026 and into flame chamber 6049 for viewing flame 6053 after ignition. Burner pressure gauge 6042 and burner pressure transducer 6004 may be attached externally to burner sight glass 6032. Pilot assembly 6509 housing pilot flame 6540 therein (shown in detail in FIG. 9B) may extend through fluid surround chamber 6026 and connect to flame chamber 6049 at pilot flame outlet 6052. Pilot flame outlet 6052 may allow flame 6053 to enter flame chamber 6049 and extend to burn chamber 6050 upon ignition of pilot flame 6540. Main gas pilot line 6530 may be fitted with pilot solenoid 6533 and may connect to pilot gas filter 6531 attached externally to pilot assembly 6509 (see FIG. 9B). Ignition spark plug 6534 may attach externally to pilot assembly 6509 near a point where pilot assembly 6509 transects fluid surround chamber 6026 so that ignition spark plug 6534 is near pilot flame 6540 housed in a portion of pilot assembly 6509 located adjacent to flame chamber 6049 at pilot flame outlet 6052. Air pilot line 6508 may be attached externally to pilot assembly 6509. Air pilot line 6508 may have attached pilot air valve 6511. Flame sensor 6538 may be attached to pilot assembly 6509 for sensing a flame therein, and it may have flame sensor cooling input 6539 attached to it to prevent damage by flame 6053. Internal pilot sight glass 6536 may be connected to pilot assembly 6509 for viewing pilot flame 6540 therein.

Figure 12:
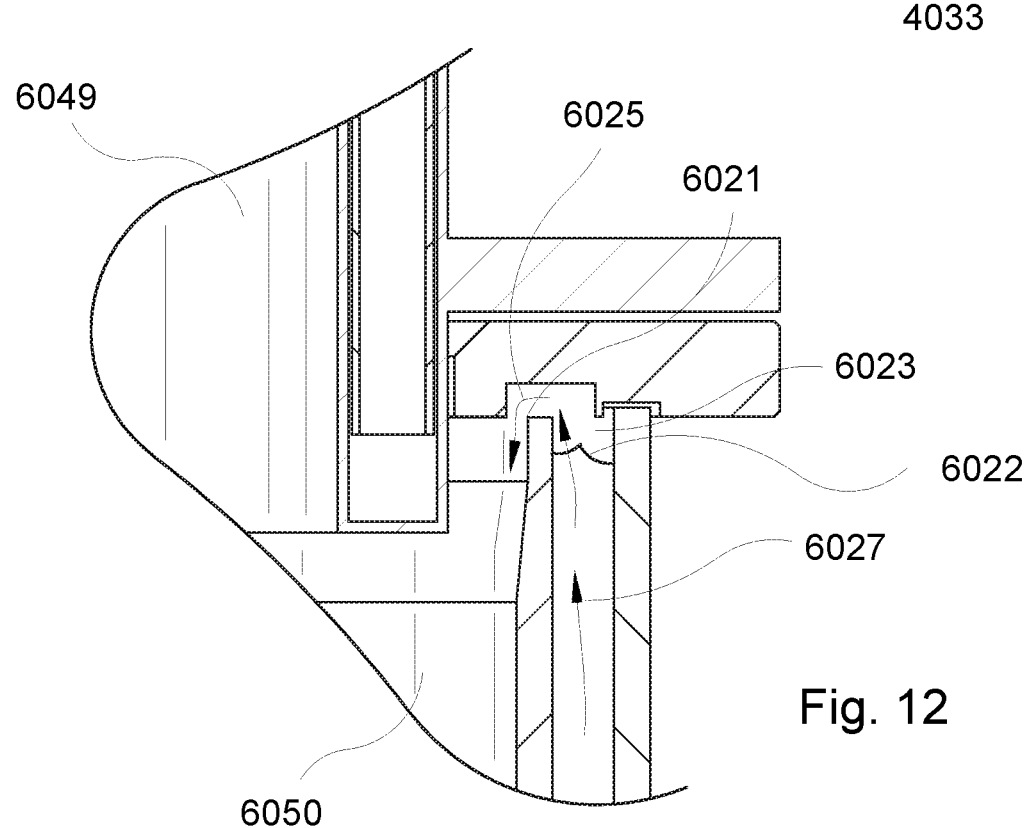
FIG. 12 is a detailed sectional view of FIG. 10B showing a detail of a cascading chamber.

Burn chamber 6050 may be a double-walled configuration (shown in detail in FIG. 12) forming hollow annulus 6027 into which fluid transfer line 6024 delivers fluid near the bottom of burn chamber 6050 for pre-heating. Fluid table 6022 may rise in annulus 6027 as fluid enters, ultimately reaching fluid table height 6023 formed by the outer wall of burn chamber 6050 and an inner wall of annulus 6027 having fluid chamber lip 6021 over which fluid table 6022 may rise, forming fluid cascade 6025 into an inner portion of burn chamber 6050 where evaporation of the fluid may be conducted by direct exposure to flame 6053. As an example, burn chamber 6050 may have a length of 26" (66 cm) and an ID/OD of 9.25"/10" (23.5/25.4 cm) with a volume of 2060 cubic inches (33.75 L) and a surface area of 980 square inches (0.63 m$^2$) and corresponding annulus 6027 may have a length of 26" (66 cm) and an ID/OD of 10.75"/12" (27.3/30.5 cm) with a volume of 593 cubic inches (9.7 L) and a surface area of 1907 square inches (1.23 m$^2$).

Burner 6000 may have a burner outlet 6051 located at its bottom leading to separator 7000, 7100, 7200, e.g., via separator inputs 7090, 7190, 7290.

In addition to the many advantages of the burner design disclosed herein, it is notable that scaling and particle build-up that commonly occurs in conventional boilers is avoided by the constant movement of product through overall system 1000. Although conventional systems typically run for about two weeks and then require shut down for maintenance and cleaning, it is possible for overall system 1000 to remain running constantly for six months or more before needing shut down for cleaning of internal build-up on the burn chamber walls. Cleaning may be accomplished manually or chemically.

Many configurations of burner 6000 are possible. In general, burner 6000 is a substantially closed unit, allows for pre-heating of the fluid to be evaporated, provides direct exposure of fluid to an open flame, and results in thin layer evaporation. Based on the foregoing examples, persons having ordinary skill within the relevant art should be capable of constructing an appropriate burner.

Separator

Separators may be employed to capture particles in a fluid state that have not evaporated over the short distance of burn chamber 6050 and to divide product into distinct phases or relative densities. This basic purpose served by separators generally is understood amongst those people having ordinary skill within the relevant art. Conventional separators typically divide product or phases that are different in density. The methods and apparatuses disclosed herein are designed to divide product or phases having much larger than customary disparity in density. Additionally, large pressure drops have an undesirable effect on the burner. Steady, even flow with little turbulence and reduced pressure drops enables burner 6000 to operate more consistently and effectively.

A separator integrated into overall system 1000 should be constructed of materials that are heat-resistant, corrosion-resistant, pressure-resistant, and capable of withstanding exposure to environmental factors, including ultraviolet (UV) rays, moisture, dust, and dirt. Preferably, the separator employed should be in compliance with American Society of Mechanical Engineers (ASME) Section VIII, Div. 1. Suitable materials include carbon steel and 316L stainless steel.

Figure 13A:
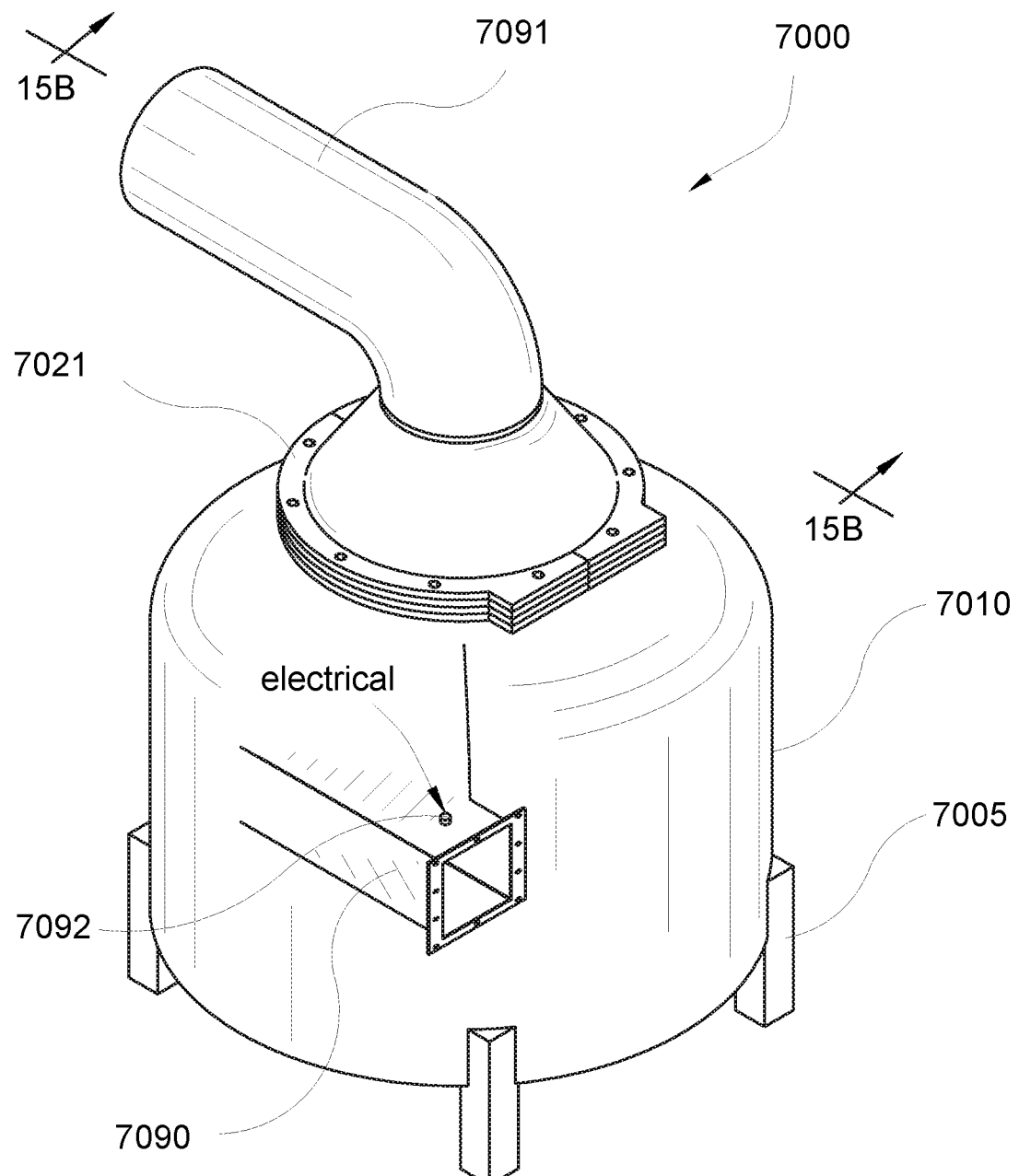
FIG. 13A is a perspective view of a cyclone separator of FIG. 2A.
Figure 13B:
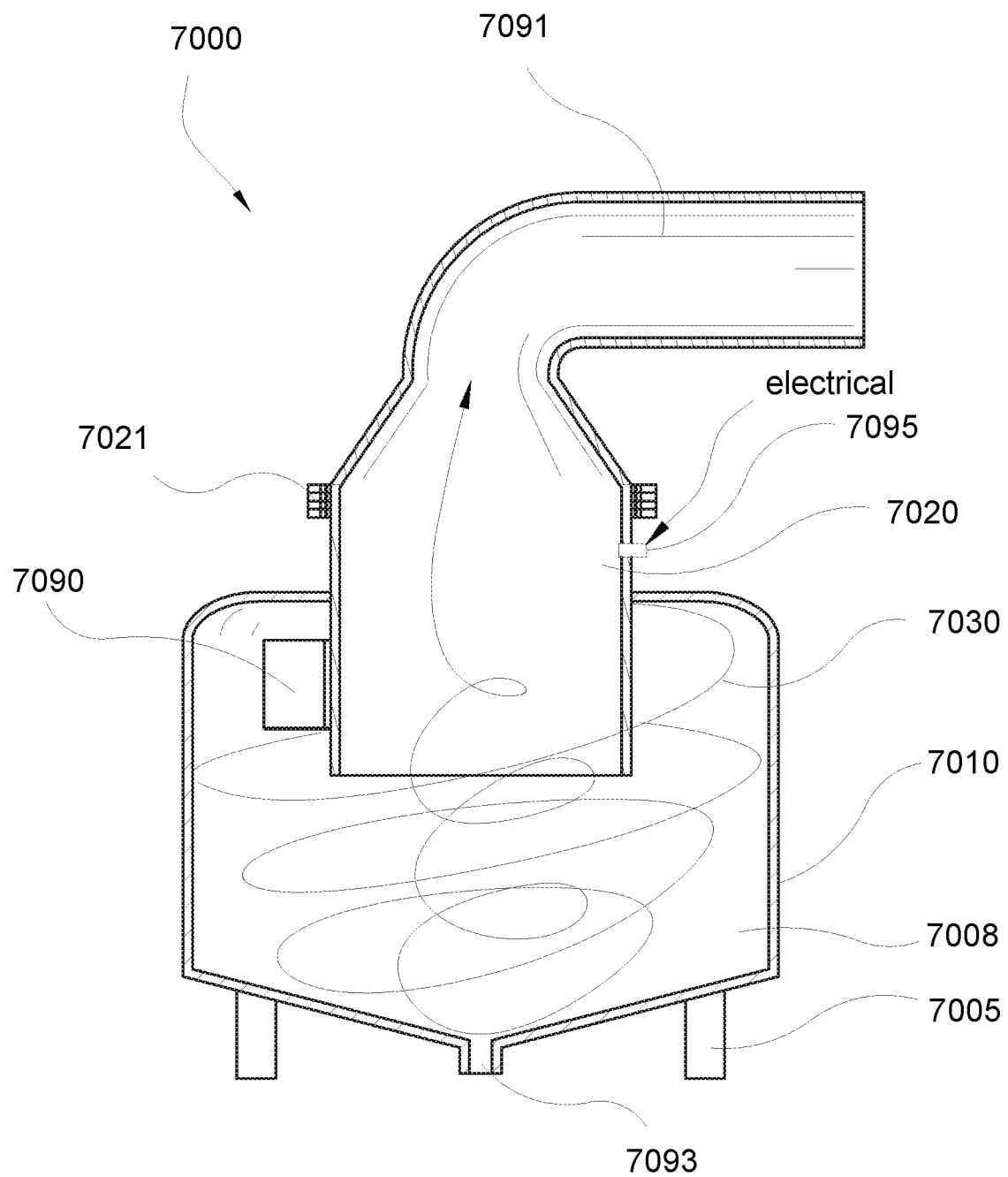
FIG. 13B is a sectional view of FIG. 13A showing internal flow patterns.

In an exemplary embodiment, overall system 1000 employs cyclone separator 7000, which is exemplified in detail in FIGS. 13A and 13B. Vertical cyclone separators may be considered preferable to horizontal impact separators because of their relatively smaller size and greater separation efficiency. For example, after fluid and vapor has passed through burner 6000, it enters cyclone separator 7000 having a plurality of stabilizing legs 7005 and outer cylinder 7010. Fluid and vapor from burn chamber 6000 may be directed to the inner chamber of cyclone separator 7000, e.g., via input 7090, which may be fitted with thermocouple 7092 transecting cyclone separator input 7090 for measuring temperature therein. This temperature may be used to determine the temperature in burner 6000. Preferably, the temperature in burner 6000 is maintained below about 300° F. (149° C.) to prevent damage to components. Upon ignition, the temperature may spike and then gradually decrease. Preferably, the process runs at a temperature just below 212° F. (100° C.), once stable. For example, the process may run at about 200° F. (93° C.), once stable; other suitable temperatures could be in the range of 190-210° F. (88-99° C.).

Fluid and vapor from burner outlet 6051 (see FIGS. 9A, 10A, and 10B), may enter the interior of cyclone separator inner chamber 7008, for example at a 90° angle relative to an inner wall of cyclone separator 7000, e.g., via cyclone separator input 7090. In other examples, the angle can be within the range of 80-110°. The internal shape of cyclone separator 7000 and a pressure differential with cyclone separator concentrate outlet 7093 may determine a flow pattern established inside. A substantially vertical, cylindrical separator unit may result in a relatively precise pattern of cyclonic flow 7030 turning in on itself and continuing to rise, as pressure is directed outward to the inner walls. A cyclonic flow pattern may achieve a high level of surface area contact. Denser matter may travel to the outer sides of inner chamber 7008, may flow around the inner walls of cyclone separator 7000, and may travel down the walls via gravitational forces. Waste fluid eventually may reach the bottom of cyclonic separator 7000, which may have a slightly concave bottom to allow for the resulting concentrated fluid to exit through cyclone separator concentrate outlet 7093.

Cyclone separator 7000 may comprise inner cylinder 7020 extending externally from above the top of cyclone separator 7000 partially into its inner chamber 7008. The top of inner cylinder 7020 may be connected to cyclone separator output 7091 via cyclone pipe coupler 7021. Flow may eventually turn from turbulent to laminar, and less dense waste product may eventually flow upward in the form of steam and micronized particles into inner cylinder 7020 and through cyclone separator output 7091. Loss of velocity and change to laminar flow may assist in separating phases.

Cyclone separator output 7091 may be modified to attach to PM scrubber 8000 (see FIGS. 16, 17, and 20), if present. Cyclone separator stack thermocouple 7095 for measuring temperature therein may transect inner cylinder 7020 between the top of outer cylinder 7010 and cyclone pipe coupler 7021. The difference between burner temperature and stack temperature may indicate temperature of the concentrate, which is important in determining the consistency of the concentrate and the efficiency of the burn. When the fluid concentrate is high in salt content, a higher temperature concentrate is desired. A change in this temperature indicates a change in fluid consistency, i.e., the amount of water in the fluid concentrate, and recalibration may be useful. Often, the temperature of the concentrate is in the range from about 170° F. to about 200° F. (77-93° C.), and preferably about 185° F. (85° C.).

In an alternate embodiment, an impact separator may be employed (not shown). Impact separators employ one or more plates, or baffles, arranged approximately at a 90° angle relative to the stream of incoming fluid and vapor. In other examples, the angle can be within the range of 80-110°. Impact of the fluid and vapor stream against the baffle(s) results in separation.

Fluid and vapor from burn chamber 6000 may be directed to the inner chamber of a horizontal impact separator, e.g., via an input, which may be fitted with a thermocouple transecting a horizontal impact separator input for measuring temperature therein. This temperature may be used to determine the temperature in burner 6000. Upon ignition, the temperature may spike and then gradually decrease to the above-described operating temperature.

Fluid and vapor from burner outlet 6051 (see FIGS. 9A, 10A, and 10B), may enter the interior of a horizontal impact separator inner chamber at a 90° angle relative to an inner baffle, e.g., via an input. In other examples, the angle can be within the range of 80-110°. A horizontal impact separator may be substantially cylindrical. After separation occurs via impact against one or more baffles, denser waste fluid may travel to the bottom of the horizontal impact separator via gravitational forces. The bottom of the horizontal impact separator may have a slightly concave bottom to allow for the resulting concentrated fluid to exit through an outlet.

The top of an inner horizontal impact separator may comprise an output, or it may be connected to an output with a pipe coupler located at the end of the horizontal impact separator furthest from the input. Flow may eventually turn from turbulent to laminar, and less dense waste product eventually may flow upward in the form of steam and micronized particles through an output. Loss of velocity and change to laminar flow may assist in separating phases.

A horizontal impact separator output may be modified to attach to PM scrubber 8000 (see FIGS. 16, 17, and 20), if present. A horizontal impact separator stack thermocouple for measuring temperature therein may transect a pipe coupler and extend into a horizontal impact separator stack. The difference between burner temperature and stack temperature may indicate temperature of the concentrate, which is important in determining the consistency of the concentrate and the efficiency of the burn. When the fluid concentrate is high in salt content, a higher temperature concentrate is desired. A change in this temperature indicates a change in fluid consistency, i.e., the amount of water in the fluid concentrate, and recalibration may be useful.

Figure 14A:
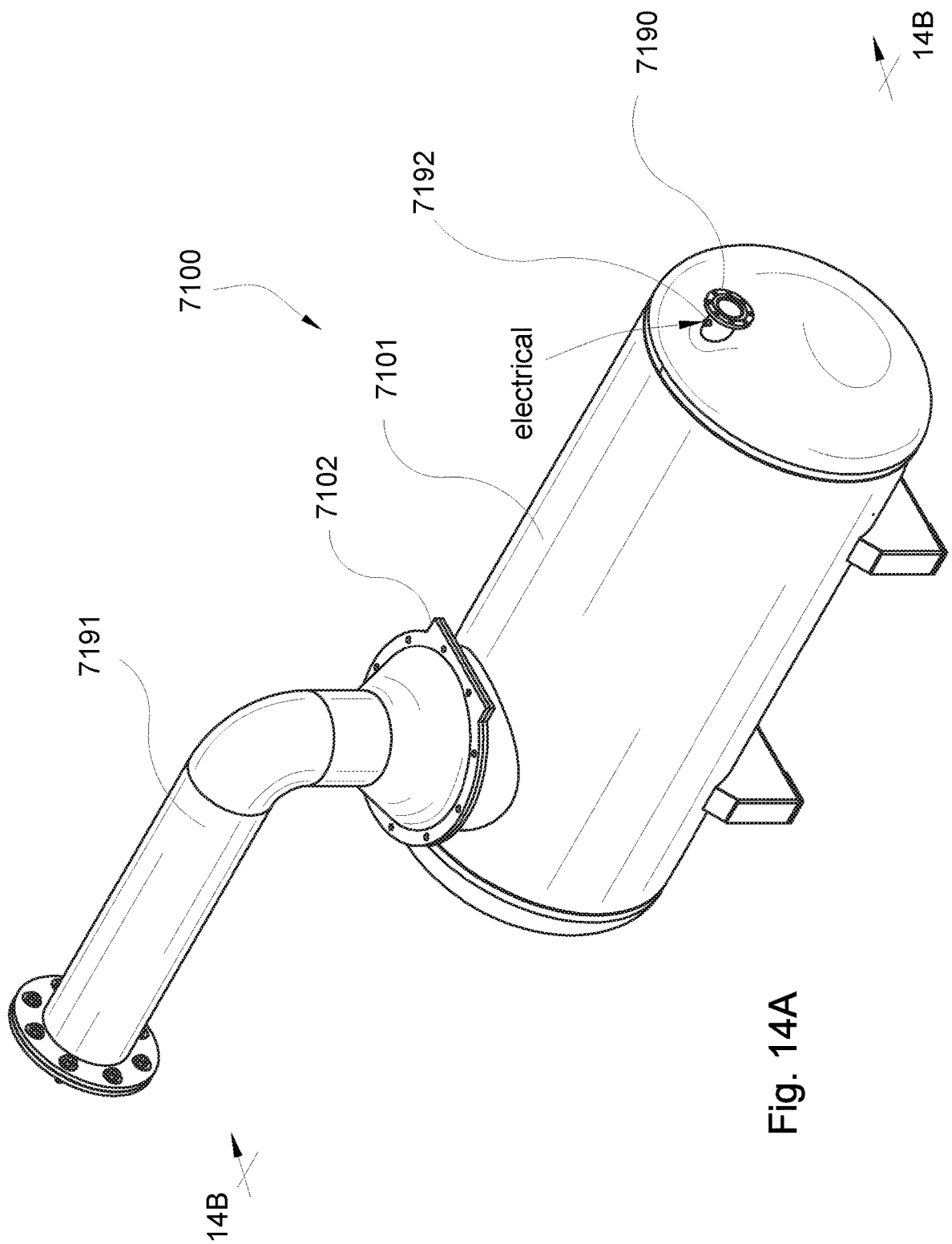
FIG. 14A is a perspective view of a vortex to a PM wash chamber/scrubber of FIG. 2B.
Figure 14B:
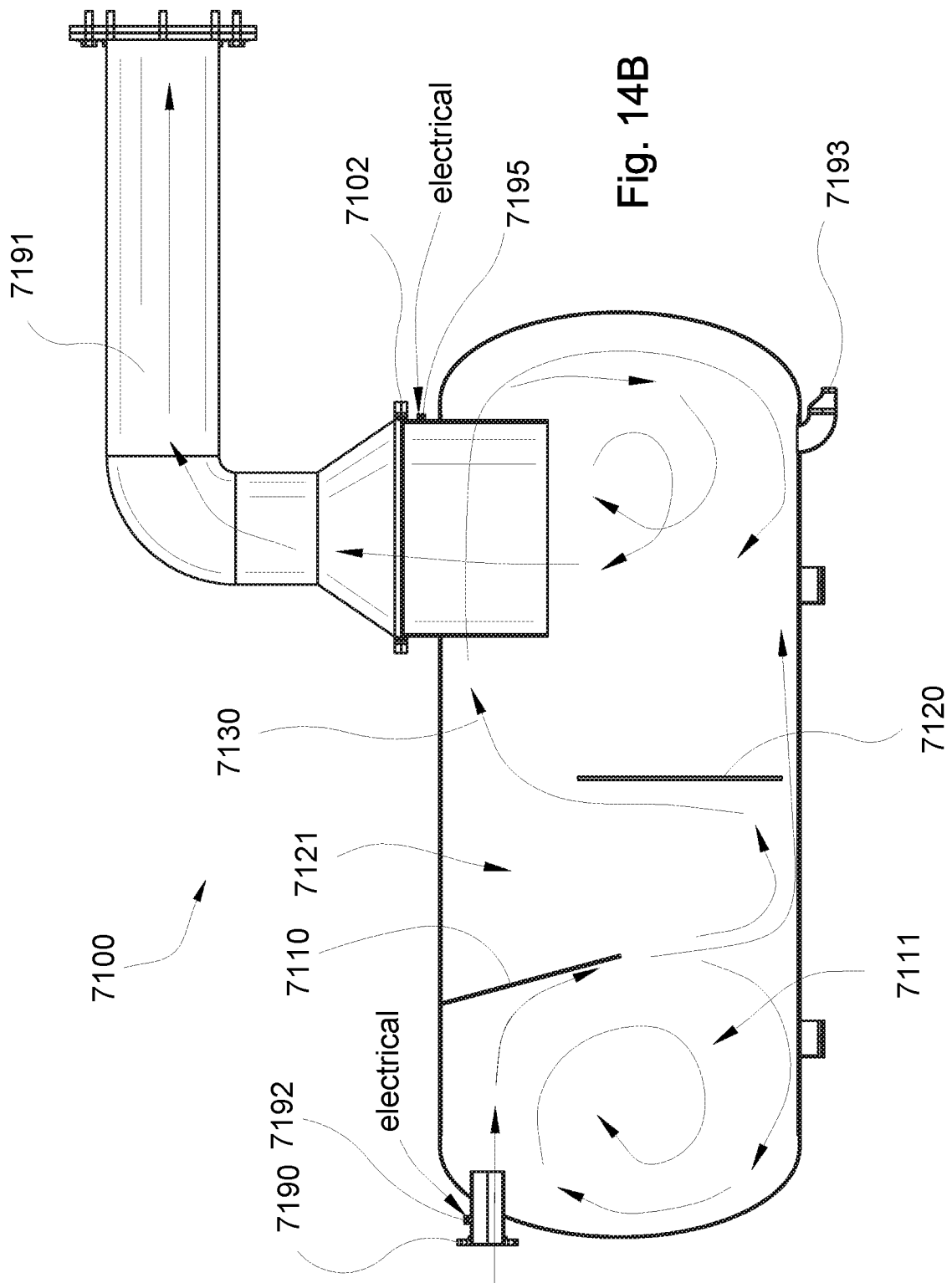
FIG. 14B is a sectional view of FIG. 14A showing internal flow patterns.

In a preferred embodiment, overall system 1000 may employ horizontal vortex separator with PM adaptor 7100, which is exemplified in detail in FIGS. 14A and 14B. Horizontal vortex separators are often larger in size relative to vertical cyclone separators, however, their diameter/size is very compact for materials having a liquid density equal to or greater than water and traveling at such high velocity. Flow through a horizontal vortex separator generally is more random than flow through a vertical cyclone separator. The flow is less precise, going to the top and sides, and turning in on itself from both sides at a lower relative velocity.

After fluid and vapor have passed through burner 6000, they may enter substantially cylindrical, horizontal vortex separator with PM adaptor 7100 having outer shell 7101, e.g., through input 7190, which may be fitted with burner thermocouple 7192 transecting vortex separator input 7190 for measuring temperature therein, which is used to determine the temperature of burner 6000.

Fluid and vapor from burner outlet 6051 (see FIGS. 9A, 10A, and 10B) may enter vortex separator input 7190 leading into the upper interior of a vortex separator first concentrate chamber 7111 having angled flow baffle 7110 extending downward from the inner top of vortex separator with PM adaptor 7100, and having about a 100-110° angle of impact relative to the flow of incoming concentrate and vapor (see FIG. 14B). Preferably, the angle of impact is about 105° relative to the flow of incoming concentrate and vapor. Angled flow baffle 7110 may create a flow pattern similar to a cyclone in first concentrate chamber 7111. Angled flow baffle 7110 may be curved to promote a cyclonic flow pattern in first concentrate chamber 7111.

Flow of fluid concentrate and vapor then may enter second concentrate chamber 7121 where second flow baffle 7120 may extend inward from an inner side of horizontal vortex separator with PM adaptor 7100 at about a 90° angle relative to the bottom of horizontal vortex separator with PM adaptor 7100. In other examples, the angle can be within the range of 80-110°. Flow baffle 7120 may act as an impact baffle, but importantly it may create vortex flow pattern 7130. Horizontal vortex separator with PM adapter 7100 may be configured with additional flow baffles 7120 extending inward from an inner side of horizontal vortex separator with PM adaptor 7100 at about a 90° angle relative to the bottom of horizontal vortex separator with PM adaptor 7100, thus forming a corresponding number of concentrate chambers 7121 (not shown). Flow in second (or multiple) concentrate chambers 7121 is slowed, broken down, and smoothed, thereby reducing pressure in second (or multiple) concentrate chambers 7121. Spinning, vortex flow 7130 continues past the last flow baffle 7120 to the back portion of horizontal vortex separator with PM adaptor 7100, where output to PM 7191 may extend externally from above the top of horizontal vortex separator with PM adaptor 7100 through PM adaptor outer shell 7101, and partially into the inner back of horizontal vortex separator with PM adaptor 7100. Flow in this portion of horizontal vortex separator with PM adaptor 7100 may revert to a cyclonic pattern. The back of horizontal vortex separator with PM adaptor 7100 may comprise a 2:1 elliptical head, i.e., twice the diameter of the curve, for smoothing direction of flow, reducing turbulence, and directing flow of vapor and micronized particles upward into output to PM 7191 stack, where gravity may assist in further separation.

Waste fluid eventually may reach the bottom of horizontal vortex separator with PM adapter 7100, and the resulting concentrated fluid may exit, e.g., through vortex separator concentrate outlet 7193. Less dense waste product eventually may flow upward in the form of steam and micronized particles into output to PM 7191. A stack thermocouple 7195 for measuring the temperature therein may transect output to PM 7191 externally adjacent to the top of separator 7100 and below adaptor coupler 7102. The difference between burner temperature and stack temperature indicates temperature of the concentrate, which is important in determining the consistency of the concentrate and the efficiency of the burn. When the fluid concentrate is high in salt content, a higher temperature concentrate is desired. A change in this temperature indicates a change in fluid consistency, i.e., the amount of water in the fluid concentrate, and recalibration may be useful.

Figure 15B:
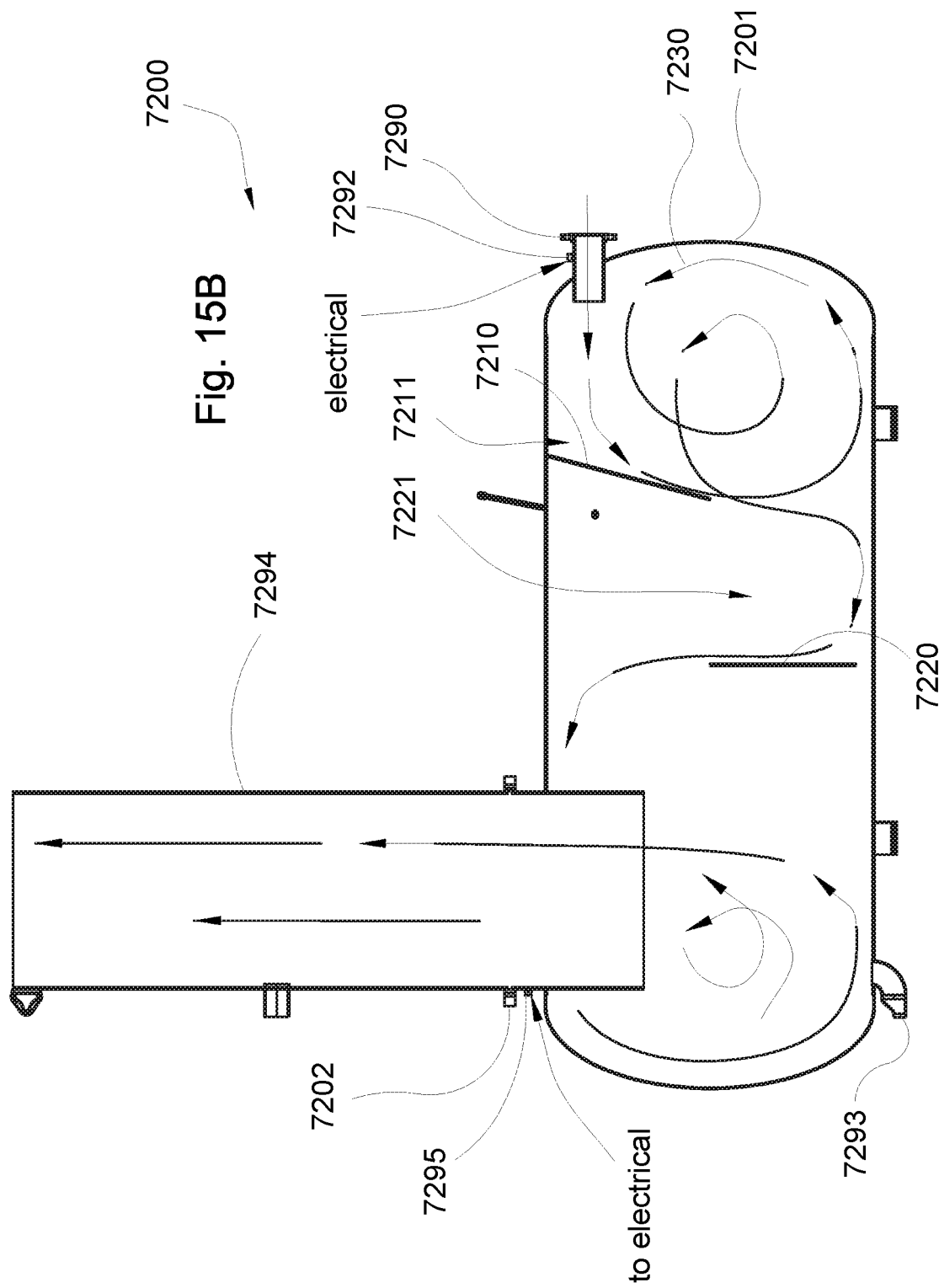
FIG. 15B is a sectional view of FIG. 15A showing internal flow patterns.

In another alternate embodiment, overall system 1000 may employ horizontal vortex separator 7200, which is exemplified in FIGS. 15A and 15B. The configuration of horizontal vortex separator 7200 essentially is the same as horizontal vortex separator with PM adaptor 7100, except that it comprises vertical vortex separator exhaust 7294 rather than an adapter connecting to PM scrubber 8000.

After fluid and vapor have passed through burner 6000, they may enter vortex separator 7200 having outer shell 7201, e.g., through input 7290, which may be fitted with burner thermocouple 7292 transecting vortex separator input 7290 for measuring temperature therein, which is used to determine burner temperature.

Fluid and vapor from burner outlet 6051 (see FIGS. 9A, 10A, and 10B) may enter vortex separator input 7290 leading into the upper interior of vortex separator first concentrate chamber 7211 having angled flow baffle 7210 extending downward from the inner top of vortex separator 7200 and having about a 100-110° angle of impact relative to the flow of incoming concentrate and vapor (see FIG. 15B). Preferably, the angle of impact is about 105° relative to the flow of incoming concentrate and vapor. The angled flow baffle 7210 may create a flow pattern similar to a cyclone in a first concentrate chamber 7211. The angled flow baffle 7210 may be curved to promote a cyclonic flow pattern in first concentrate chamber 7211. Flow of fluid concentrate and vapor then may enter second concentrate chamber 7221 where second flow baffle 7220 may extend inward from an inner side of vortex separator 7200, at about a 90° angle relative to the bottom of vortex separator 7200. In other examples, the angle can be within the range of 80-110°. Flow baffle 7220 may act as an impact baffle, but importantly it may create a vortex flow pattern. Vortex separator 7200 may be configured with additional flow baffles 7220 extending inward from an inner side of vortex separator 7200 at about a 90° angle relative to the bottom of vortex separator 7200, thus forming a corresponding number of concentrate chambers 7221 (not shown). Flow in a second (or multiple) concentrate chambers 7221 is slowed, broken down, and smoothed, thereby reducing pressure in a second (or multiple) concentrate chambers 7221. Spinning, vortex flow continues past the last flow baffle 7220 to the back portion of vortex separator 7200, where vortex separator exhaust 7294 may extend externally from above the top of vortex separator 7200 through vortex separator outer shell 7201, and partially into the inner back of vortex separator 7200. Flow in this portion of vortex separator 7200 may revert to a cyclonic pattern. The back of vortex separator 7200 may comprise a 2:1 elliptical head, i.e., twice the diameter of the curve, for smoothing direction of flow, reducing turbulence, and smoothing flow of vapor and micronized particles upward into vortex separator exhaust 7294 stack, where gravity may assist in further separation.

Figure 21:
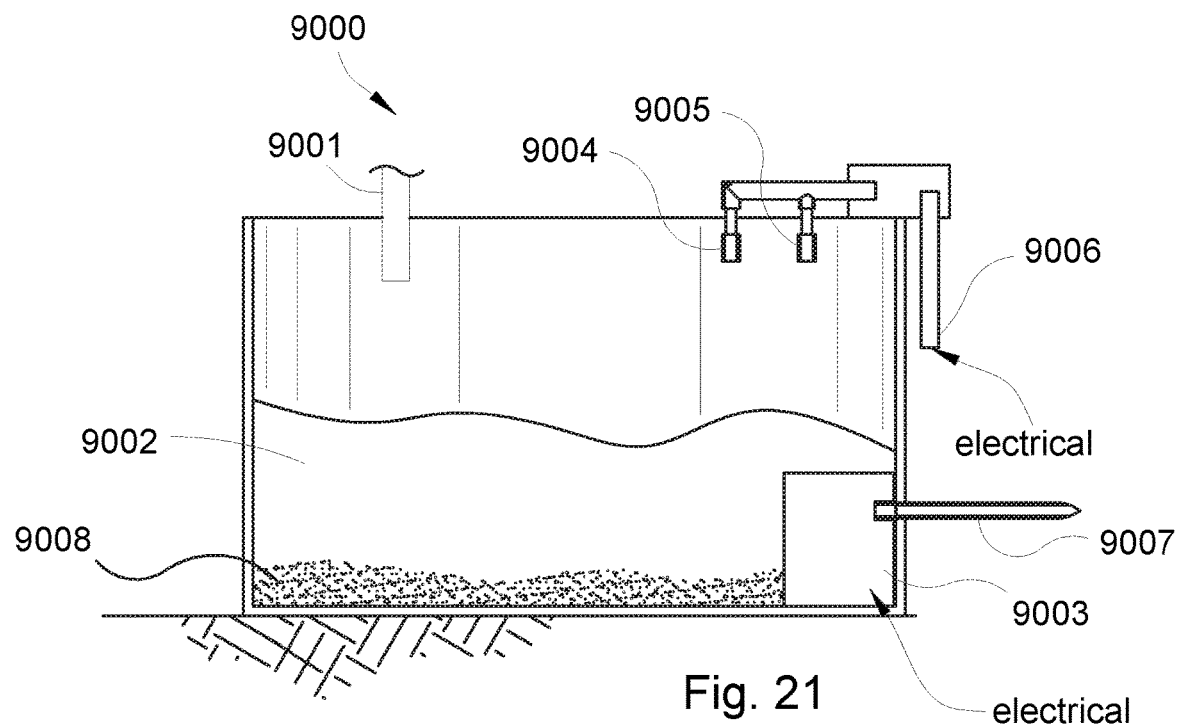
FIG. 21 is a sectional view of a separator dump tank (FIG. 1) and its contents.

Waste fluid eventually may reach the bottom of vortex separator 7200, and the resulting concentrated fluid may exit, e.g., via concentrate dump line 9001 through vortex separator concentrate outlet 7293 leading to separator dump tank 9000 (shown in detail in FIG. 21). Less dense waste product may flow upward in the form of steam and micronized particles into vortex separator exhaust 7294.

A stack thermocouple 7295 for measuring the temperature therein may transect vortex separator exhaust 7294 externally adjacent to the top of separator 7200 and below vortex separator coupler 7202. The difference between the burner temperature and the stack temperature indicates the temperature of the concentrate, which is important in determining the consistency of the concentrate and the efficiency of the burn. When the fluid concentrate is high in salt content, a higher temperature concentrate is desired. A change in this temperature indicates a change in fluid consistency, i.e., the amount of water in the fluid concentrate, and recalibration may be useful.

Traditional horizontal impact separators force flow against baffles at about a 90° angle to break up material and allow denser material to flow down its inner sides. A perpendicular arrangement of baffles does not create uniform flow. Weirs in traditional separators of this sort act to separate density layers, and the design depends on gravity. In the vortex designs disclosed herein, the angles of baffles 7110, 7210, and 7120, 7220 are optimized to create more uniform, less turbulent flow. Although a greater number of baffles creates a desirable, smoother flow pattern, this design preferably is limited to two baffles 7110, 7210, and 7120, 7220 because additional baffles result in increased back pressure in this particular overall system 1000 configuration. Use of controls and processors may make it possible to overcome this limitation, however, allowing for use of additional baffles 7120, 7220. Whereas baffles used in impact separators are responsible for separation, baffles 7110, 7210 and 7120, 7220 configured as described in a horizontal vortex separator primarily create flow patterns, and the inner walls of the separator are responsible for separation. Concave baffles 7120, 7220 may assist in creating desired flow patterns and in slowing material so that it does not travel fast enough to reach output to PM 7191 stack, or vortex separator exhaust 7294 stack prior to separation. Thus, the efficiency of cyclonic flow may be achieved with significantly reduced back pressure.

Horizontal vortex separator with PM adaptor 7100 and horizontal vortex separator 7200 may be designed according to a velocity per diameter relationship. If the configuration is too small, there may not be adequate area for slowing down the velocity of the flow. If the configuration is too large, there may be too much area for velocity to be effective. Often, velocity in a stack should be less than 27 ft/s (8.2 m/s) (terminal velocity of an approximately 250-micron diameter sphere having the density of water) for gravitational force to assist in separation by preventing particles from exiting the stack. Stack size may determine velocity of flow leaving the separator.

Horizontal vortex separator with PM adaptor 7100 and horizontal vortex separator 7200 may be designed for a desirable flow rate range using computational fluid dynamics such that first concentrate chamber 7111, 7211 has a rotational velocity from about 25 ft/sec (7.6 m/s) to about 530 ft/sec (162 m/s). Although separation may occur at less than 25 ft/sec (7.6 m/s), rotation may not be achieved. Computer programs for determining computational fluid dynamics may be used to assist in a working design, which programs are known to persons having ordinary skill in the relevant art. Important factors used in designing horizontal vortex separator with PM adaptor 7100 or horizontal vortex separator 7200 include 1) initial velocity (determined by flow rate of material and size of input 7190, 7290); 2) rotational velocity (determined by vessel size); 3) angle of angled flow baffle 7110, 7210; and 4) vessel pressure, which may affect flow rate. It is important for rotational velocity to be maintained within range for avoiding blowback and to create efficacious force for separation at the inner walls. If rotational velocity is too slow, there may not be adequate centripetal force against the vessel inner walls for separation to occur. However, if rotational velocity is too fast, material may bounce off the walls without separation occurring. If the angle of angled flow baffle 7110, 7210 is not adequately obtuse, too little rotation will be created and flow may be disadvantageously turbulent. Other factors may not be known, or may take significant effort to know, e.g., density of material. Therefore, some initial trial and error may be involved to achieve any specific working embodiment useful with certain materials and design parameters, although such trial and error should be understood by persons having ordinary skill in the relevant art.

FIG. 21 exemplifies separator dump tank 9000. Concentrate dump line 9001 may deliver concentrate into separator dump tank 9000. Upon cooling, concentrate may separate into concentrate fluid 9002 and concentrate sediment 9008. Dump tank 9000 may be fitted with level sensor assembly 9006 having one or more level sensors, e.g., high level sensor 9004 and low level sensor 9005, which may trigger automatic shut off of overall system 1000. Concentrate pump to concentrate tank line 9003 may draw concentrate fluid 9002 into separator dump tank line 9007, where it may be directed to concentrate tank 9050 (see FIG. 24), e.g., via concentrate tank line 9054. When concentrate sediment 9008 accumulates to an unacceptable level, it may be manually removed and stored.

Figure 23:
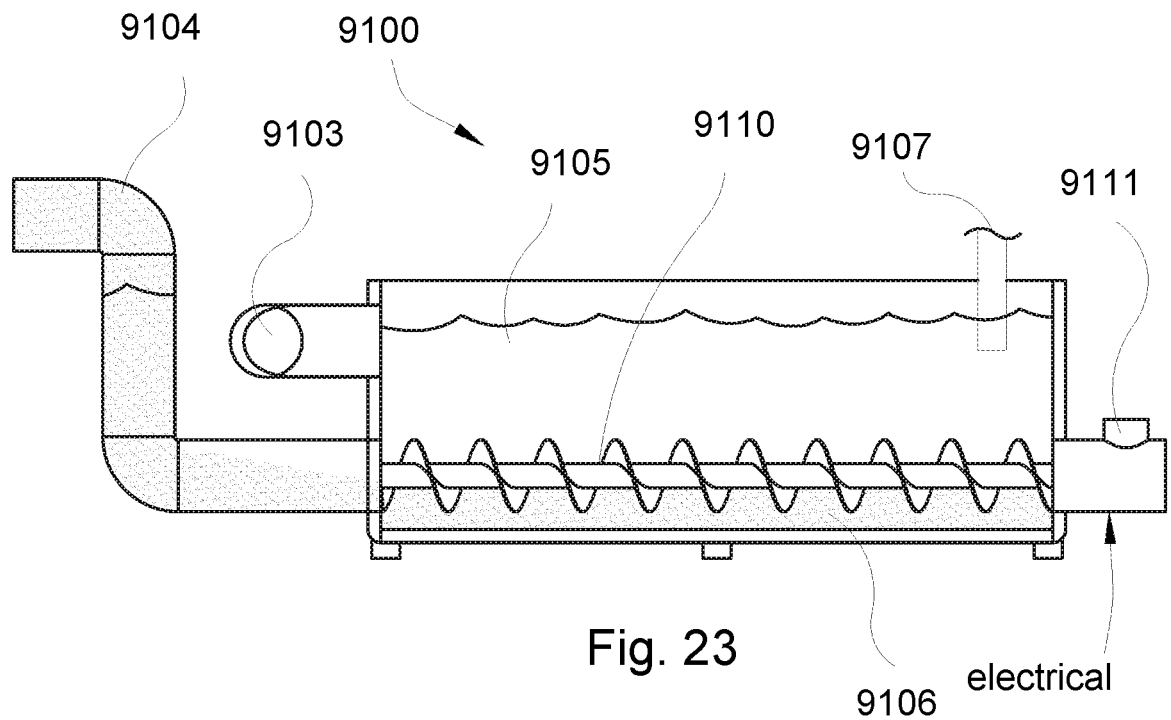
FIG. 23 is a sectional view of an alternative embodiment of a PM dump tank and its contents.

FIG. 23 exemplifies an alternative embodiment of separator dump tank 9100. Concentrate dump line 9107 may deliver concentrate into separator dump tank 9100. Upon cooling, concentrate may separate into light concentrate 9105 and heavy concentrate 9106. Auger 9110 extending along the length of the bottom of separator dump tank 9100 may be powered by auger motor 9111 for moving heavy concentrate 9106 near the bottom of separator dump tank 9100, e.g., into pipe to heavy concentrate collection 9104. Light concentrate 9105 may be removed from separator dump tank 9100 into pipe to light concentrate collection 9103. Both concentrate products may be delivered to storage tanks (not shown).

Figure 24:
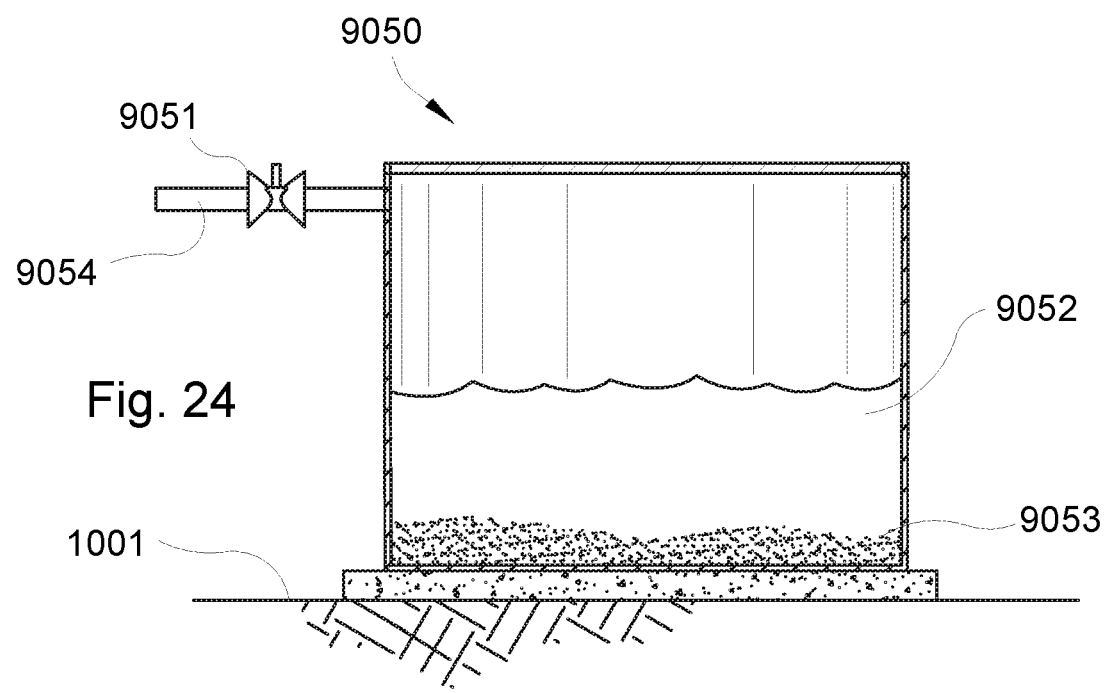
FIG. 24 is a sectional view the concentrate tank.

FIG. 24 exemplifies concentrate tank 9050 storing concentrate fluid 9052 and concentrate sediment 9053. Concentrate tank 9050 may be fitted with concentrate valve 9051 connecting to concentrate tank line 9054 for accepting concentrate fluid 9002 from separator dump tank 9000. When the concentrate sediment 9053 accumulates to an unacceptable level, it may be manually removed and stored.

Many configurations of separators are possible. The purpose of the separator is to adequately separate the vapor and concentrate phases resulting from the evaporation process. Based on the foregoing examples, persons having ordinary skill within the relevant art should be capable of constructing an appropriate separator.

Particulate Matter (PM) Scrubber

Depending on the composition of waste water, the vapor product released from separator 7000, 7100, 7200 may be pure enough for release to atmosphere 1700 directly. Some waste water, however, contains dissolved particles, e.g., salts, that are micronized in burner 6000 and retained in vapor phase after separation. To remove micronized particles from the vapor phase, a PM scrubber may be employed. A PM dry scrubber filter is more compact and needs less space, but it is more prone to becoming clogged. Preferably an optional scrubber is a PM wet scrubber when space is not a concern.

A PM wet scrubber may be employed in a final process step following separation. PM wet scrubbers are available in many styles and configurations that are familiar to persons having ordinary skill in the relevant art. Examples of PM wet scrubbers include spray towers, cyclonic spray towers, dynamic scrubbers, Venturi scrubbers, and combinations of those technologies. In a preferred embodiment, a design employing particulate matter (PM) wash chamber 8020 and PM separator 8019 may be employed (e.g., Hydro-Sonic Systems, Wylie, Tex., Tandem Nozzle Models 150 and 250). PM wash chamber 8020 and PM separator 8019 work in conjunction with one another and in such embodiments may be referred to singularly as PM scrubber 8000.

PM wash chamber 8020 and PM separator 8019 should be constructed of materials that are heat-resistant, corrosion-resistant, pressure-resistant, and capable of withstanding exposure to environmental factors, including ultraviolet (UV) rays, moisture, and dust. Preferably, PM wash chamber 8020 and PM separator 8019 should be in compliance with American Society of Mechanical Engineers (ASME) Section VIII, Div. 1. Suitable materials include fiberglass reinforced plastic, carbon steel, and 316L stainless steel.

FIGS. 2A and 2B exemplify an embodiment of PM wash chamber 8020 comprising at least one spray nozzle inlet 8011 (shown in detail in FIGS. 16, 17, and 20) coupled to a corresponding number of spray nozzle inputs 8013 supplied by fluid tank 3061, e.g., via fluid line outlet 8009, as discussed further herein.

FIG. 2A exemplifies an embodiment of overall system 1000 in which cyclone separator output 7091 of vertical cyclone separator 7000 may be coupled to PM scrubber 8000 comprising PM wash chamber 8020 leading to PM separator 8019.

FIG. 2B exemplifies alternate embodiment 1200 of the overall system in which a PM adapter output 7191 of horizontal vortex separator 7100 may be coupled to PM scrubber 8000 comprising PM wash chamber 8020 leading to PM separator 8019.

FIG. 2C exemplifies alternate embodiment 1300 of the overall system in which horizontal vortex separator 7200 is employed without PM scrubber 8000 or PM dump tank 9020. In this embodiment, processed vapor may exit vortex separator exhaust 7294 (see FIG. 15A) directly into atmosphere 1700.

Figure 19:
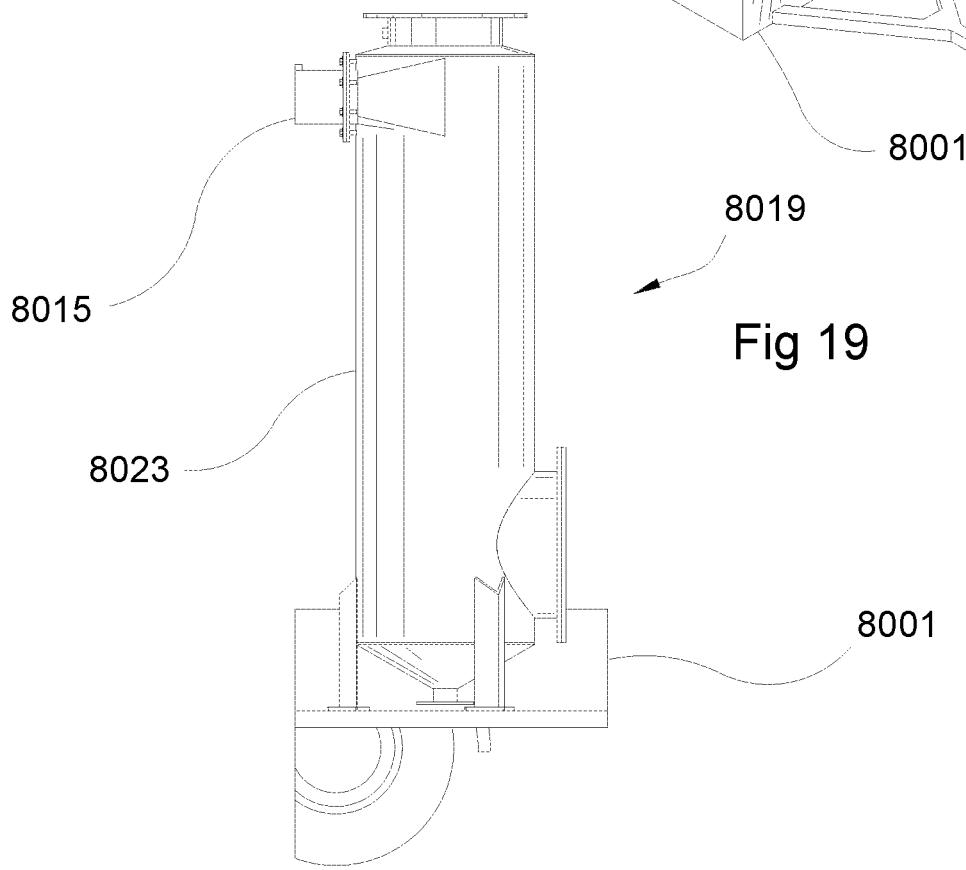
FIG. 19 is a cut elevation view of a PM separator (FIG. 16) on a trailer.
Figure 20:
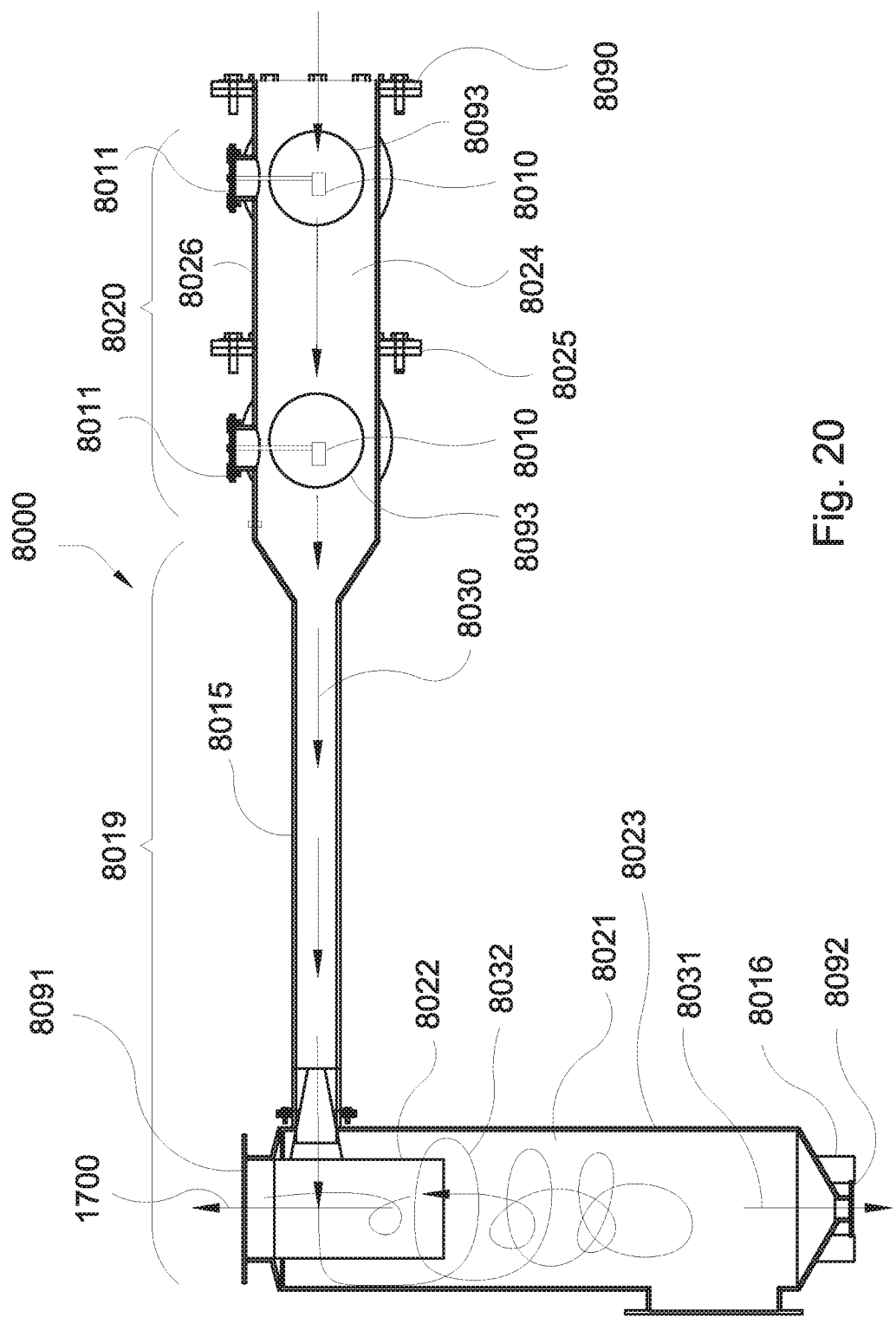
FIG. 20 is a sectional view of a PM scrubber (FIG. 16) showing internal flow patterns through the unit.

FIGS. 16, 17, 18, and 20 exemplify a preferred PM scrubber 8000 comprising PM wash chamber 8020 leading to PM separator 8019. FIGS. 19 and 20 exemplify a preferred PM scrubber 8000 and PM separator 8019 setup on PM trailer 8001. Vapor from separator 7000, 7100 may be delivered to PM wash chamber 8020, e.g., having PM wash chamber inlet 8090 coupled to cyclone separator output 7091 (see FIG. 13B) or coupled to vortex separator with PM adaptor output to PM 7191 (see FIG. 14A). One or more PM wash chambers may be connected in series, for example, by coupling PM wash chamber inlet 8090 to opposing PM wash chamber connector 8025. Spray nozzle fluid pump 8012 (see FIG. 1) may draw fluid from fluid tank 3061, e.g., through fluid line outlet 8009 to spray nozzle input 8013 to supply fluid to spray nozzle inlet 8011, each inlet comprising corresponding spray nozzle 8010 extending through PM wash chamber outer shell 8026 into inner PM wash chamber 8024. A vapor stream in PM wash chamber 8020 may be contacted with fluid droplets, such as greater than 190 microns, dispensed by one or more spray nozzles 8010, and particles from the vapor may be captured by impaction or diffusion into the fluid droplets. Collection efficiency tends to increase with pressure differential, e.g., the amount of energy expended in contacting the vapor stream with the fluid, and also with an increase in sprayed droplet size. PM wash chamber 8020 may comprise one or more PM wash chamber inspection ports 8093.

Steam vapor and fluid containing captured PM may enter PM separator 8019, e.g., via PM flow pipe 8015 extending from PM wash chamber 8020 (or a series thereof) at PM wash chamber connector 8025 furthest from PM wash chamber inlet 8020 connected to a separator output, transecting PM separator outer shell 8023, and extending into internal PM separator outer chamber 8021 near its top. PM exhaust 8091 may extend through the top of PM separator 8019 partially into internal PM separator outer chamber 8021, forming central PM separator inner chamber 8022. PM separator 8019 optionally may comprise a plurality of PM separator stabilizing legs 8016 or PM separator inspection port 8094.

As steam vapor and fluid containing captured PM enter PM separator 8019, they may impact an outer wall of PM separator inner chamber 8022 and undergo a flow pattern separating fluid and vapor phases into downward PM flow 8031 and upward steam flow 8032. PM separator 8019 may have a bottom, preferably concave, with PM waste outlet 8092 through which liquid PM flow 8031 may lead to PM dump tank 9020 (see FIG. 22), e.g., via PM concentrate line 9021. Steam flow 8032 eventually may rise through PM exhaust 8091 and may be released to atmosphere 1700 or re-captured and used as energy. Optionally, PM exhaust 8091 may be fitted with one or more sensors for emissions monitoring.

Figure 22:
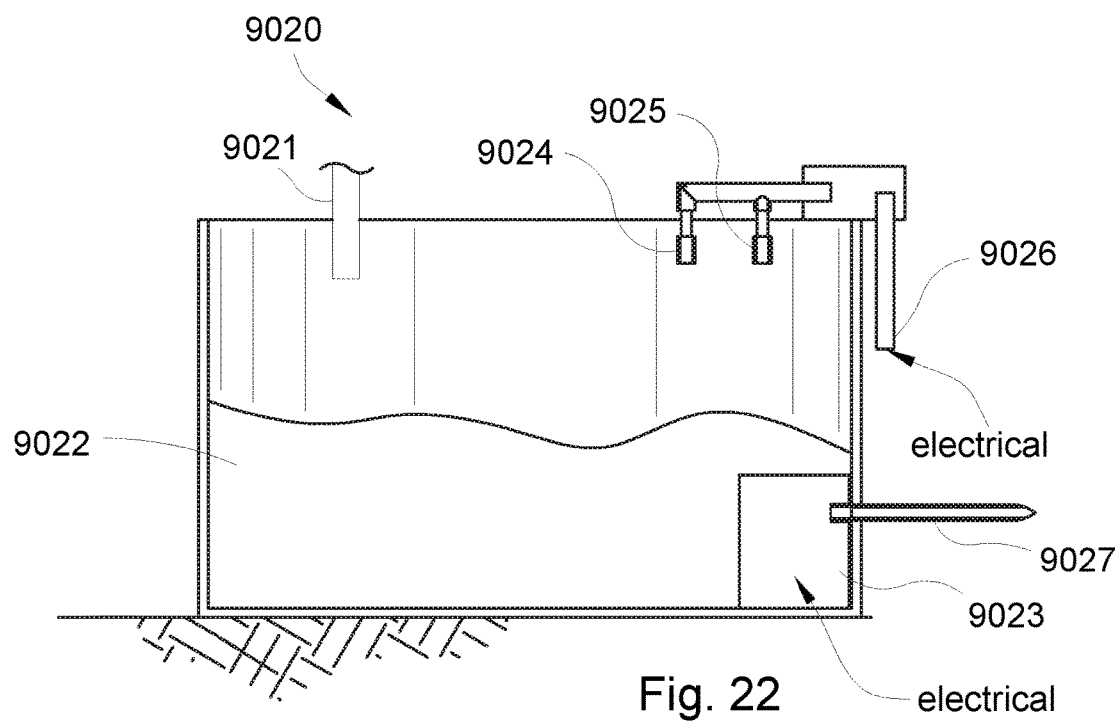
FIG. 22 is a sectional view of the PM dump tank (FIGS. 1, 2A, 2B, and 2C) and its contents.

FIG. 22 exemplifies PM dump tank 9020. PM concentrate 9022 may be delivered to PM dump tank 9020, e.g., via PM concentrate line 9021. PM dump tank 9020 may be fitted with level sensor assembly 9026 having one or more level sensors, e.g., a high PM level sensor 9024 and a low PM level sensor 9025, which may trigger automatic shut off of overall system 1000. PM concentrate pump to fluid tank 9023 may draw PM concentrate 9022 into PM dump tank line 9027, where it may be directed, e.g., to fluid tank 3061 (see FIG. 1).

In some cases, fluid in fluid tank 3061 may be highly or fully saturated and would not absorb additional PM concentrate 9022. In an alternate embodiment, a closed loop system may be employed, e.g., wherein PM concentrate 9022 is drawn from PM dump tank 9020, e.g., via PM dump tank line 9027 leading to PM dump filter 9029 that is directed to spray nozzle fluid pump 8012 and spray nozzle inputs 8013. PM dump filter 9029 may be any type that is appropriate for the composition of concentrate being filtered, e.g., a disposable salt or reverse osmosis filter.

Many configurations of PM scrubbers are possible. The purpose of PM scrubbers is to ensure that the resulting vapor released to atmosphere 1700 meets governmental standards, such as Environmental Protection Agency (EPA) standards. Based on the foregoing examples, persons having ordinary skill within the relevant art should be capable of constructing an appropriate PM scrubber.

Chemical Reagent Scrubbers

Chemical reagents may be employed as vapor scrubbing agents used in conjunction with PM scrubber 8000. Sodium sulfide, caustic sodium hydroxide, sodium chlorite, sulfuric acid, sodium bicarbonate, and lime are common scrubbing agents. For example, hydrogen sulfide, hydrogen chloride, chlorine, and sulfur dioxide may be scrubbed with caustic sodium hydroxide, and ammonia may be scrubbed with sulfuric acid. Nitrogen oxides (NOx) may be scrubbed with sodium sulfide. If sulfur dioxide is present also, better results may be achieved with sodium hydroxide due to intermediate reactions. Vapor streams having multiple contaminants that do not react with the same reagents may benefit from multiple reagents. TDS in the fluid may improve or adversely affect the ability of the chemical reagents to react with the gaseous contaminants.

Common contaminants and corresponding chemical reagents suitable for their removal are appreciated by those having ordinary skill within the relevant art. Often, the chemical reagent is added to the washing fluid by aid of a dedicated metering pump to maintain an effective pH for a particular contaminant/scrubbing agent reaction. FIG. 1 exemplifies a setup having reagent lines 8014 running from reagent tank and pump 8008 and connecting to spray nozzle inputs 8013. Preferably, the reagent tank may be disengaged from the pump to replenish reagent as needed, for example, by substitution with a fresh, full tank.

In cases where the composition of the vapor stream is unknown, experimentation performed by ordinarily skilled artisans may help determine an effective chemical reagent and pH. Spectrometry may assist in determining an effective chemical reagent.

Materials

In addition to specific materials noted elsewhere herein, fittings and connections requirements may vary according to jurisdiction. Materials preferably should meet or exceed jurisdictional requirements determining the use of API or ASME code for transmission and type of connection for the types of fluid and gas, depending on pressure.

For example, common connections for low pressure gas transmission (e.g., less than 1000 psig (6895 kPa)) include threaded 3000# couplings, threadolets, elbowlets, and unions. Threaded connections typically are ⅛" (3.175 mm) to 2" (5.1 cm) and have material grade SA-105 or ANSI equivalent. Stainless steel also is allowed and sometimes required. Hammer unions and flange fittings typically meet API or ANSI requirements with appropriate pressure specifications. Those that are expected to handle $H_2S$ should use material grade stainless steel or other materials that are $H_2S$ rated.

For example, common connections for water transfer typically include 3000# couplings, threadolets, elbowlets, and unions. Threaded connections typically are ⅛" (3.175 mm) to 2" (5.1 cm) and have material grade SA-105 or ANSI equivalent. Stainless steel also is allowed and sometimes required Hammer unions, and flange fittings, victaulic fittings, and quick-connect couplings typically meet API or ANSI requirements with appropriate pressure specifications, where required.

Controls

All gauge readings, other measurements, calculations, and controls may be performed manually. However, a burner control management system is mandated in every jurisdiction for reasons of safety. In an alternate embodiment, manual adjustment box 5501 may be employed for receipt of signal information and remote control via relays 5276. FIGS. 5A and 5B exemplify manual adjustment box 5501, as previously discussed. Connected components may be set to deliver a signal within a pre-determined range. Readings outside of the pre-determined range may result in loss of signal, and the system may be set to trigger an automatic shut-down of overall system 1000 when that occurs.

Figure 25:
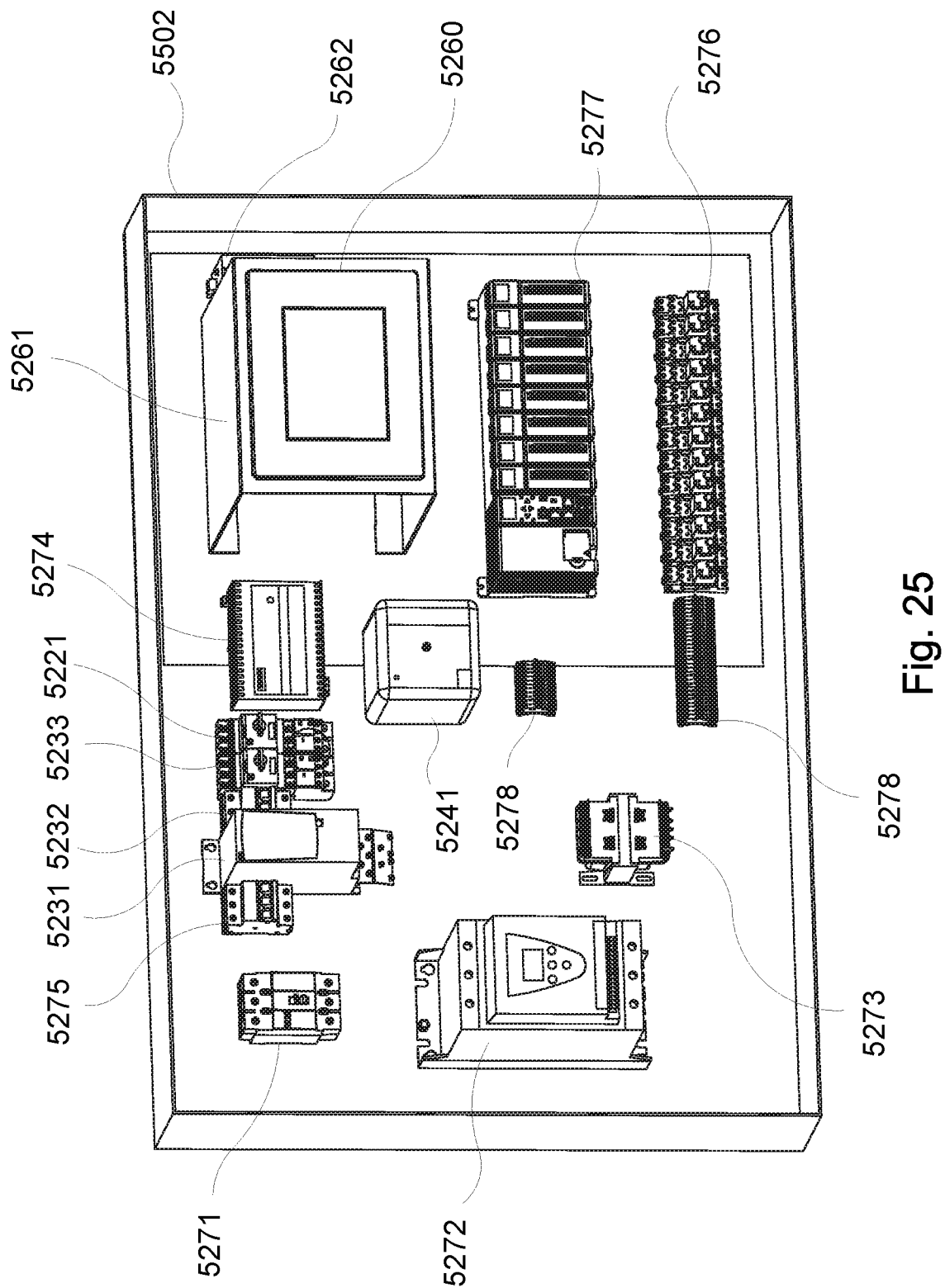
FIG. 25 is a perspective view of the inside of a controller box of FIGS. 2A, 2B, and 2C.

In an alternative embodiment, a programmable logic controller (PLC) 5277 may be employed in a standard manual adjustment box 5501 to allow for automated receipt of information and control of components. Given the requisite number and types of connections, which would be appreciated by persons having skill within the art, the system may be fully automated after initial setup. FIG. 25 exemplifies a controller box 5502 having the components shown in manual adjustment box 5501, as well as PLC 5277, human-machine interface (HMI) 5260 and HMI mount 5261, and uplink 5262 for connecting to HMI 5260, e.g., via WiFi or cellular service.

Examples of sensors and instruments that may provide real time data for making automated adjustments include:

Sensors for Fluid Train 3000

Fluid flow meter 3051 may provide an electric output of readings. It may be powered with 24 V DC current and may use an ultrasonic transducer and receiver to calculate the flow rate of fluid passing through fluid flow meter 3051. It may then send a 4-20 mA signal that may be received and scaled by PLC 5277 to give a representation of fluid flow, such as in gallons per minute. This value may be used for fluid pump VFD 5231 to correct the speed of fluid pump 3067 if there is a change in the system causing more or less flow.

Fluid pressure transducer 3205 (used with fluid pressure gauge 3200) may be powered with 24 V DC current and may transmit a 4-20 mA signal that may be received and scaled by PLC 5277 to give a representation of fluid pressure, such as in psig. This value may provide confirmation that fluid pump 3067 is running correctly. If the pressure goes below or above a set range, e.g., 30-50 psig (207-345 kPa), PLC 5277 may react by shutting down the system.

Fluid pump VFD 5231 may use 3-phase 480 V current that may pass through to fluid pump 3067 or VFD 5231 may be controlled with 24 V DC current from PLC 5277. Fluid pump VFD 5231 may provide feedback about the frequency at which fluid pump 3067 is driven, and may create a check and balance of the information sent to PLC 5277 about the speed of fluid pump 3067. If PLC 5277 detects a change in flow rate from flow meter 3051 or a change in pressure from pressure transducer 3205, correction of flow rate determined by the calculations (see CONFIGURATION section below) may be achieved by speeding up or slowing down fluid pump 3067.

A fluid spectrometer is a device for analyzing the chemical composition of fluid. It may be located anywhere between fine filter 3030 and burner 6000 (e.g., see FIGS. 9A, 10A, and 10B). A fluid spectrometer may send spectrometry data to PLC 5277, e.g., the available water for evaporating out of the fluid stream. This information may be used to create a value W for use in the formula that solves for the total flow rate Tw that the system can process most efficiently (see CONFIGURATION section below).

Sensors for Air Train 2000

Figure 6B:
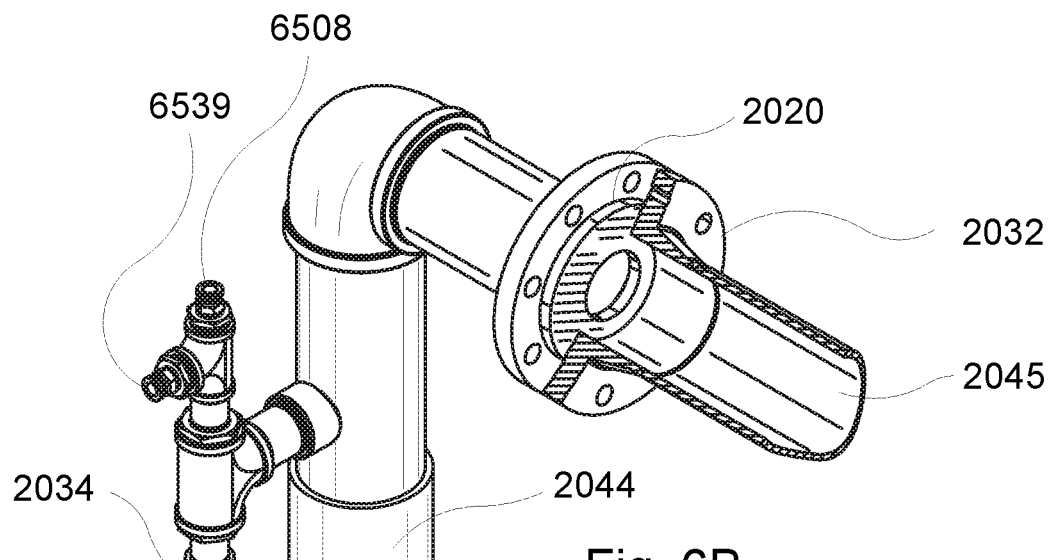
FIG. 6B is a perspective sectional view of an air orifice and flame sensor of FIG. 6A.
Figure 6C:
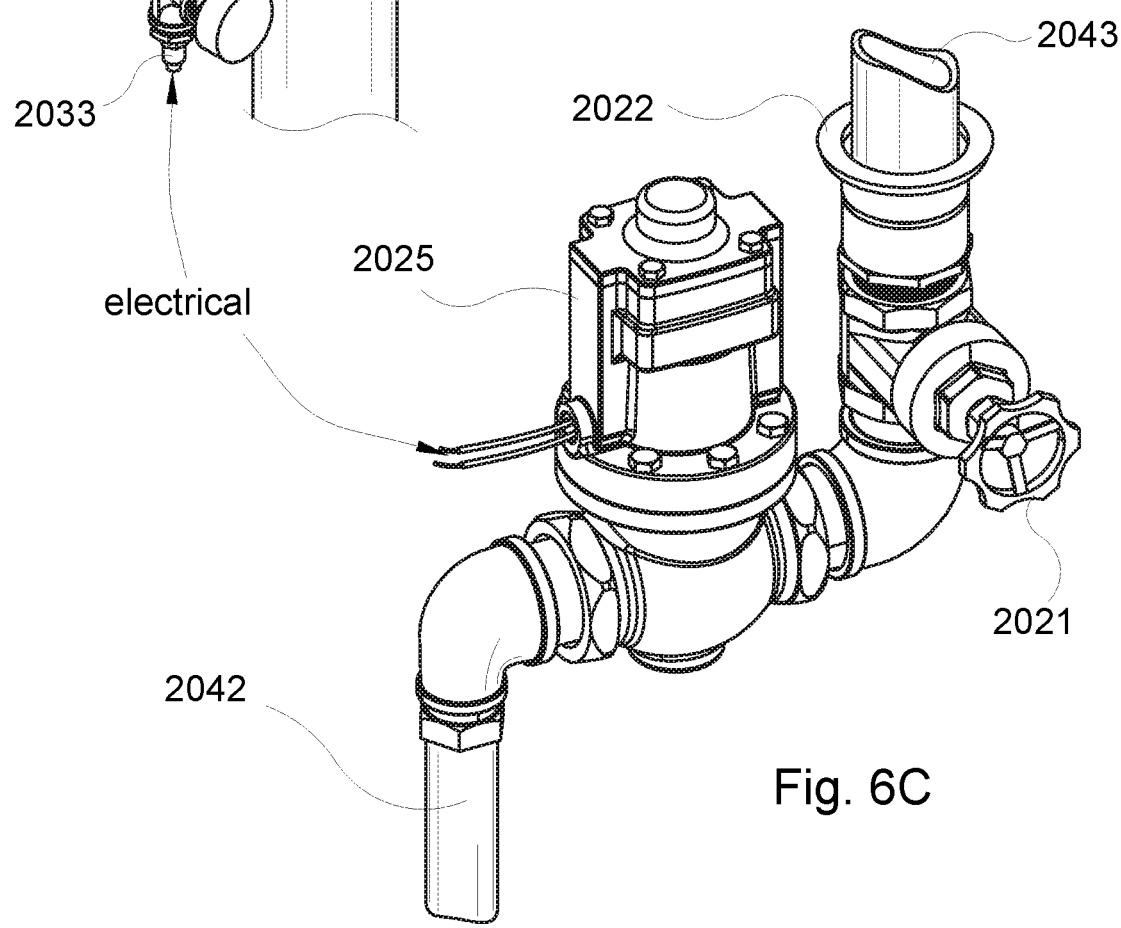
FIG. 6C is a perspective sectional view of an air gate valve and magnitrol quick open/shut valve of FIG. 6A.

Air train transducer 2033 (used with air train pressure gauge 2034) may be located between air orifice 2020 and blower 2005 (e.g., see FIG. 6B). It may be powered with 24 V DC current and may transmit a 4-20 mA signal that may be received and scaled by PLC 5277 to give a representation of air flow rate, such as in psig. This value may be used for calculating the flow rate of blower air, which includes fan speed (such as in RPM), ambient temperature, humidity, altitude, and dew point. This total air flow rate (C) may be used to calculate the flow rate of fuel needed, such as in standard cubic feet per minute (SCFM), depending on the type of fuel used (see CONFIGURATION section below).

Oxygen sensor 2101 may be located between air orifice 2020 and blower 2005 (not shown). The value provided by the sensor may solve for the flow rate of air (C) delivered to burner 6000 with a single reading and without the need to account for pressure, fan speed, ambient temperature, humidity, altitude, and dew point without using the manufacturer's charts. The signal may be received through electrical input to PLC 5277 to calculate C (see CONFIGURATION section below). When oxygen sensor 2101 is employed, there is no need for air pitot tube 2030.

Sensors for Gas Train 4000

Main gas train pressure transducer 4092 (used with pressure gauge 4018 located on gas pressure regulator 4016) may be located behind main gas valve 4002 (see FIG. 7A). It may be powered with 24 V DC current and may transmit a 4-20 mA signal that may be received and scaled by PLC 5277 to give a representation of gas pressure, such as in psig. This value may indicate that fuel is available and may shut down the system if the pressure goes above or below range, e.g., 14-25 psig (97-172 kPa).

Gas orifice pressure transducer 6036 (used with gas pressure gauge 6035) may be located between gas orifice pipe 4033 and gas pressure gauge 6035. It may be powered with 24 V DC current and may transmit a 4-20 mA signal that may be received and scaled by PLC 5277 to give a representation of gas pressure, such as in psig. This value may be used to operate automated gas valve low 4091 to maintain the pressure in a desired range e.g., within about 2% of calculated Op via automated low gas valve 4091 (see CONFIGURATION section below).

Gas orifice thermocouple 6029 may be located between gas orifice pipe 4033 and heat exchanger 4020 (see FIG. 10A). It may be powered with 24 V DC current and may transmit a 4-20 mA signal that may be received and scaled by PLC 5277 to give a representation of temperature. This value may be used to understand the temperature of fuel exiting heat exchanger 4020 and to shut down the system if the temperature is above a pre-determined maximum value, e.g., 500° F. (260° C.).

Automated low gas valve 4091 may be actuated by electrical input. It may be powered with 24 V DC current and may transmit a 4-20 mA signal that may be received and scaled by PLC 5277 to give a representation of valve position, e.g., open to closed in increments of 0-100, and it may be automated to change valve position so as to maintain pressure in gas orifice pipe 4033 at or near the Op value calculated, e.g., within about 2%.

Main gas valve 4002 may be powered with single phase 110 V AC current and may send a 110 V AC signal to burner control management device 5241 indicating that main gas valve 4002 is open. If a loss of flame 6053, 6540 is detected by flame sensor 6538, burner control management device 5241 may send a signal to close main gas valve 4002, thereby cutting off fuel to burner 6000.

Gravity diverter liquid level controller 4014 may activate an electrical signal when liquid level in HC gravity diverter filter 4011 reaches a pre-determined level. It may be powered with single phase 110 V AC power supply which then loops the power to gravity diverter dump solenoid 4013 when the signal is activated, thereby opening an outlet for draining, e.g., dump to liquid pressure vessel line 4097. The connection may be broken when the liquid level reaches a point below the pre-determined level.

A gas spectrometer is a device for analyzing the chemical composition of gas. It may be located between heat exchanger 4020 and HC scrubber filter 4012. It may transmit data to PLC 5277 about the composition of the fuel and BTU value, to calculate the value (B) to determine the total flow rate of fuel that the system can use to burn most efficiently (see CONFIGURATION section below).

Sensors for Burner 6000

An element in flame sensor 6538 may create a 0-20 mA current when exposed to light from flame 6053, 6540. This current may transmit information to burner control management device 5241. If flame is lost, the resulting loss of signal may set off a chain of events to shut the system down.

Burner control management device 5241 is a UL-rated safety system. For the system to run, all pre-determined, programmed input values should be satisfied, e.g., presence of flame 6053, 6540 indicated from flame sensor 6538, gas pressure indicated from main gas train pressure transducer 4092, and fluid pressure indicated from fluid pressure transducer 3205. Additional input values may be programmed for values supplied from an external input, e.g., a fluid spectrometer, a gas spectrometer, and sensors measuring carbon monoxide, carbon dioxide, and HCs in exhaust. Failure of inputs to meet any pre-programmed specifications may result in burner control management device 5241 shutting down the system by closing main gas valve 4002. Optionally, it may signal PLC 5277 to shut down air train 2000 and fluid train 3000.

Sensor 6041 is a temperature thermocouple that sends electrical output when temperature reaches a pre-determined level. It may be powered with single phase 110 V AC current, which then loops the power to burner control management device 5241 when the designated temperature is reached. This may act as a safety measure to prevent the area near gas orifice pipe 4033 from overheating by triggering shut-down of the system if the temperature reaches a pre-determined maximum value, e.g., 400° F. (204° C.).

Burner thermocouple 7092, 7192, 7292 is an electric thermometer. It may be powered with 24 V DC current and may transmit a 4-20 mA signal that may be received and scaled by PLC 5277 to give a representation in temperature. This value may be used as an indicator to allow the low or high solenoid 3047, 3049 to open when the temperature reaches a set point, such as 220° F. (104° C.). It may be used also to monitor temperature coming out of the burner, and it may act as a safety mechanism to trigger shut-down of the system if the temperature falls outside a pre-determined range, e.g., 180-230° F. (83-110° C.).

Stack thermocouples 7095, 7195, 7295 form an electric thermometer. It may be powered with 24 V DC current and may transmit a 4-20 mA signal that may receive and be scaled by PLC 5277 to give a representation in temperature of exhaust leaving separator 7000, 7100, 7200 for data logging.

A carbon monoxide sensor (not shown) may be located on overall system 1000 where vapor and flue gases reach atmosphere 1700. It may send an electronic signal to PLC 5277 to shut down the system if the transmitted value is out of a pre-determined range for a pre-determined amount of time. This also would be used for ensuring regulatory compliance and for data logging.

A carbon dioxide sensor (not shown) may be located on overall system 1000 where vapor and flue gases reach atmosphere 1700. It may send an electronic signal to PLC 5277 to shut down the system if the transmitted value is out of a pre-determined range for a pre-determined amount of time. This also would be used for ensuring regulatory compliance and for data logging.

A hydrocarbon sensor may be located on overall system 1000 where vapor and flue gases reach atmosphere 1700. It may send an electronic signal to PLC 5277 to shut down the system if the transmitted value is out of a pre-determined range for a pre-determined amount of time. This also would be used for ensuring regulatory compliance and for data logging.

Controls

Figure 26A:
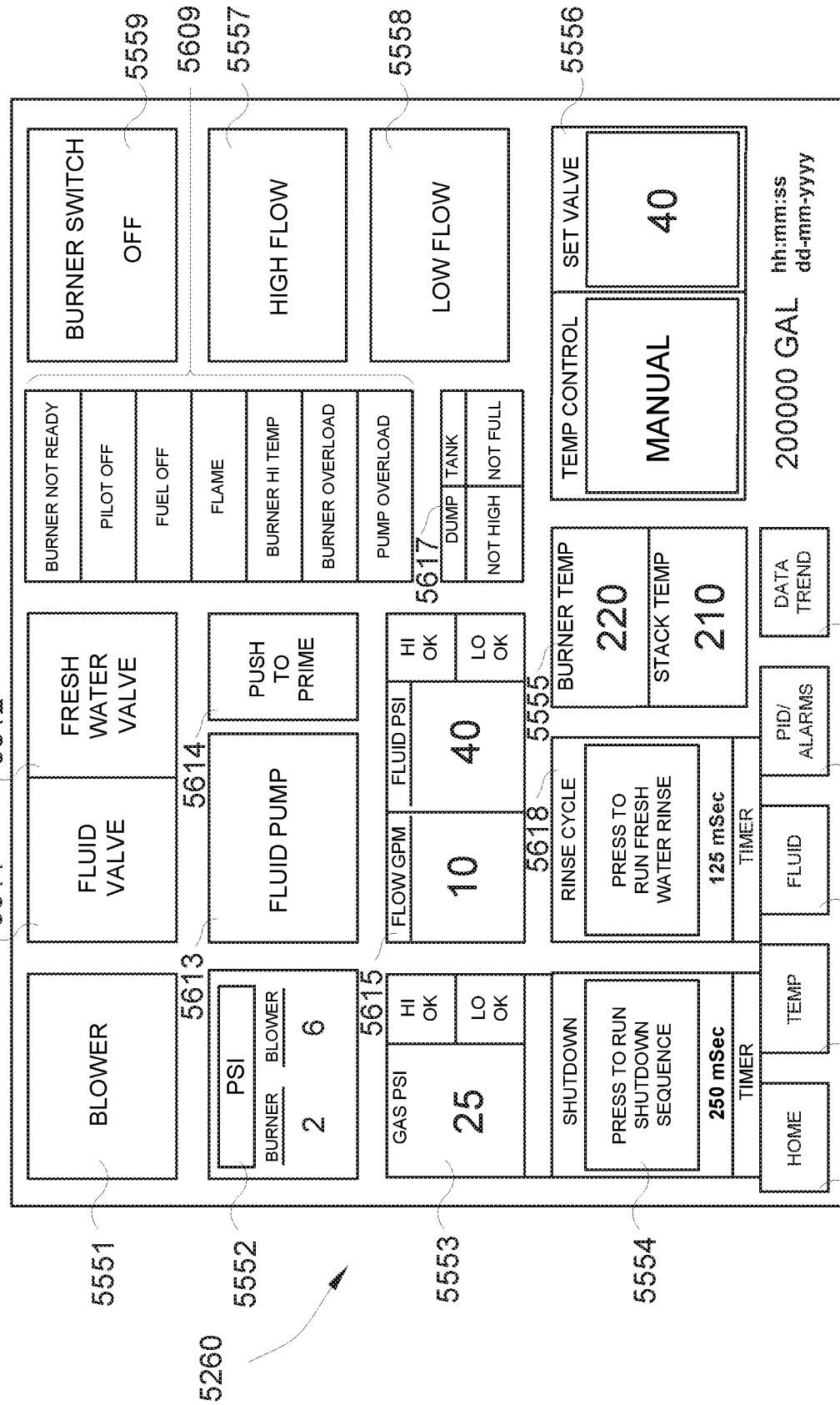
FIG. 26A is a screen of HMI showing view A of a controller system on home page.

FIG. 26A exemplifies HMI 5260 touch screen showing a HOME page having informational and operational icons displaying an overview of overall system 1000 and enabling a human to navigate through additional informational and operational screens. For example, operational icons for major components of the system are exemplified by the following icons: blower on/off 5551 (i.e., "on" and "off" designated by screen colors green and red, respectively), shutdown 5554 (for maintenance and cleaning), auto fluid valve 5611, auto fresh water valve 5612 (i.e., "open" and "closed" designated by screen colors green and red, respectively; both may be closed, but only one may be open at a time), fluid pump on/off 5613 (i.e., "on" and "off" designated by screen colors green and red, respectively), push to prime 5614 (to aid in purging or priming the lines of air; limited to operation of ramp up flow solenoid 3047 and low flow solenoid 3048 when burner 6000 is off), rinse cycle 5618 (for example, to run fresh water through the system for a period of time followed by automatic reversion to waste water), burner switch on/off 5559, high flow 5557 and low flow 5558 (for activating the corresponding fuel, fluid, and air amounts), and automated gas ball valve control 5556. Shutdown 5554 sequentially closes main gas valve 4002, maintains water and air flow for a short period of time (e.g., about two to three minutes) for cool down, then stops the power supply to blower 2005, closes ramp-up flow solenoid 3047, low flow solenoid 3048, and high flow solenoid 3049, and stops power to fluid pump 3067. Low flow 5558 signals PLC 5277 to close high gas solenoid 4067, open automated gas valve low 4091, open air bypass 2093, and open ramp-up flow solenoid 3047 and low flow solenoid 3048. High flow 5557 signals PLC 5277 to open high gas solenoid 4067, close air bypass 2093, and open high flow solenoid 3049. Automated low gas valve 4091 remains open, and high gas adjustable valve 4066 is adjusted during setup.

Informational icons are exemplified by icons for air pressure 5552 (showing burner pressure taken at burner pressure transducer/gauge 6004, and blower pressure taken at air train transducer/gauge 2033), main gas valve pressure 5553 (if outside of specifications for "high" or "low," auto shutdown will occur), fluid measurements 5615 (flow rate and pressure), temperature 5555 (for example, taken from thermocouples at the burner 7092, 7192, 7292 and stack 7095, 7195, 7295), and separator dump tank level 5617.

Navigational icons are exemplified by icons for home page 5510, temperature page 5550, fluid page 5610, Potential Integer Derivative (PID)/alarms page 5650, and data trend page 5710. For example, temperature page icon 5550 (labeled as "TEMP" in FIGS. 26A, 26B, and 26C) navigates to a page dedicated to information and operations relating to temperature settings and readings.

Figure 26B:
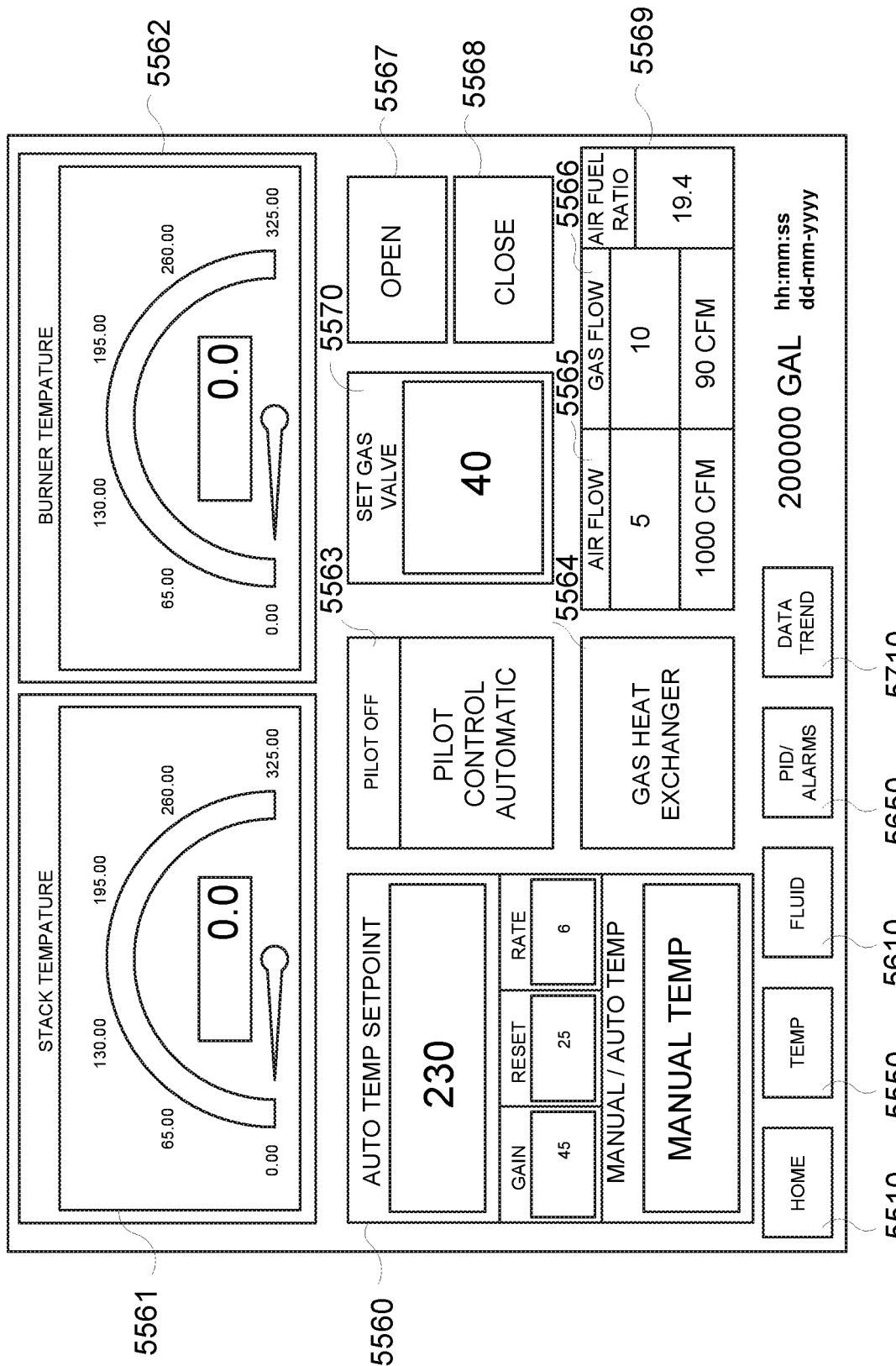
FIG. 26B is a screen of HMI showing view B of a controller system on temp system page.

FIG. 26B exemplifies a TEMP SYSTEM page. Operational icons are exemplified by icons for temperature set-point 5560 (for example, to switch between temperature settings automatically adjusted by a PID system and manual input of settings, both of which are based on values derived by calculations), pilot on/off switch 5563, gas heat exchanger on/off 5564, set main gas valve 5570 (corresponding to main gas valve 4002), open automated gas valve 5567, and close automated gas valve 5568 (corresponding to automated gas valve low 4091). Informational icons are exemplified by icons for stack temperature 5561 and burner temperature 5562, pitot tube air flow measurements 5565, pitot tube gas flow measurements 5566, and air/gas flow ratio 5569.

Figure 26C:
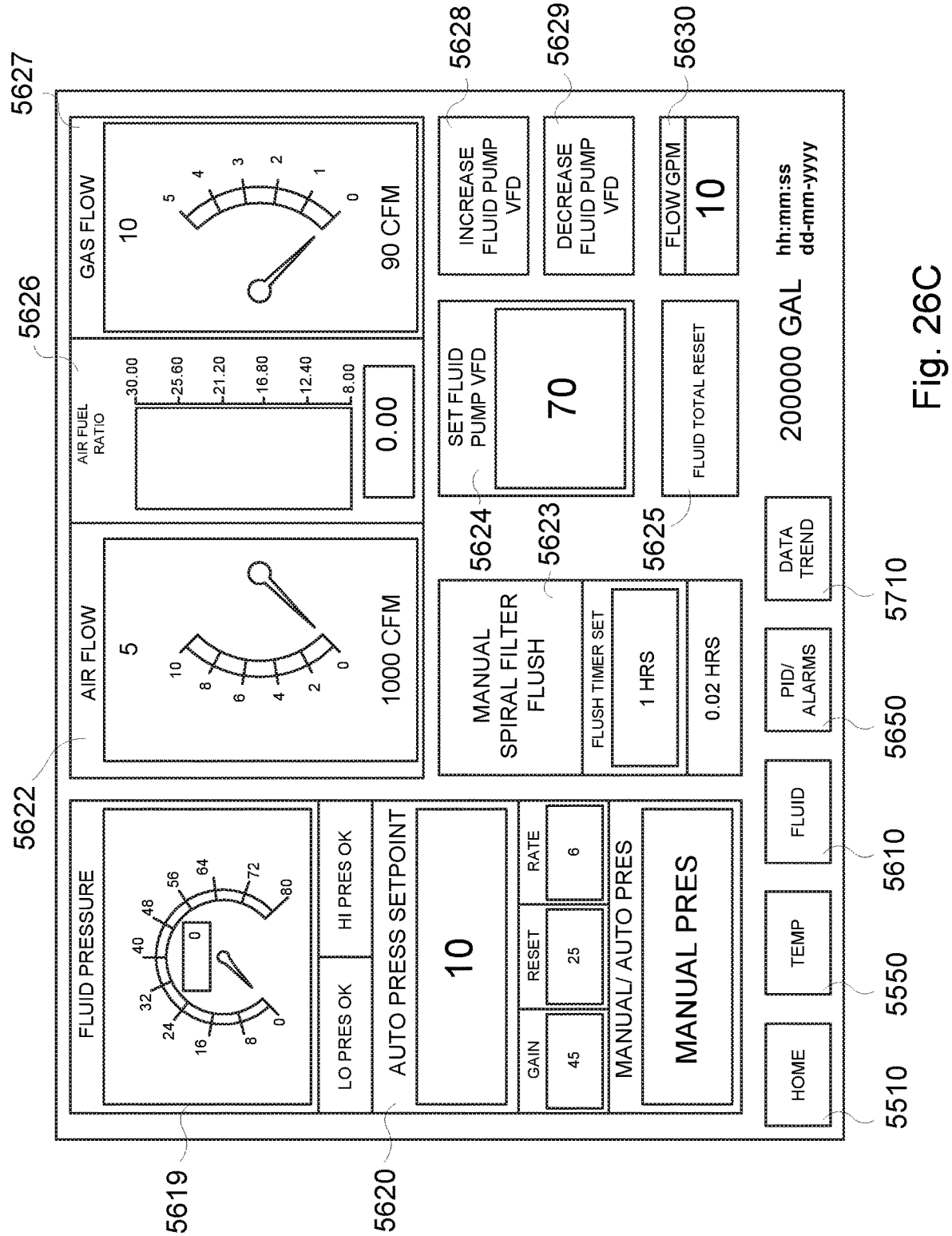
FIG. 26C is a screen of HMI showing view C of a controller system on fluid system page.

FIG. 26C exemplifies a FLUID SYSTEM page. Operational icons are exemplified by icons for fluid pressure set-point 5620 (for example, to switch between fluid pressure settings automatically adjusted by a PID system and manual input of settings, both of which are based on values derived by formulae calculations), fine filter timer set 5623, fluid pump rate (such as in RPM) 5624, increase fluid pump VFD 5628, decrease fluid pump VFD 5629, and fluid total reset 5625. Informational icons are exemplified by icons for fluid train pressure 5619 (for example, as measured by transducer/gauge 3205), current GPM flow rate of fluid 5630, pressure/SCFM measured by air pitot tube 5622, pressure/SCFM measured by gas pitot tube 5627, and ratio of air/gas pitot tube readings 5626.

Instrumentation

The apparatuses and methods disclosed herein heavily depend on instrumentation readings at various places on the apparatus. Preferably, pressure values that should be monitored include those before and after the main gas valve, at each pump in the fluid train, before the air orifice in the air train, before and after the gas orifice, in the mixing chamber, in the burn chamber, in the separator, and in the PM scrubber (if employed).

Some of the pressure and temperature readings are used to ensure safety, or for data logging, for example. Certain readings, however, are used in calculations made when operating the system.

The following information clarifies the purpose of the instrumentation readings taken along the system:

Air Train Instruments

Pressure transducer 2033 and pressure gauge 2034 (see FIG. 6C)—located between blower 2005 and air orifice 2020; used to calculate C using the manufacturer's charts (see CONFIGURATION section below).

Pitot tube 2030 (see FIG. 6A)—used to measure the flow rate of air going to the burner 6000.

Oxygen content gauge 2101—located between air bypass 2093 and mixing 6040 chamber; used to measure molar flow rate of oxygen in the air flow (if used in the configuration, it is an alternate method of calculating Cd—the flow rate of gas to deliver, based on molar ratio of oxygen to fuel, not in reliance on manufacturer's charts).

Gas Train Instruments

Pressure transducer 4092 (see FIG. 7A)—located between regulator 4016 and main gas valve 4002; used for safety range in burner management controller that controls main gas valve 4002.

Gas pitot tube 4028 (see FIGS. 7A and 7F)—measures the flow rate of gas going to the heat exchanger.

Spectrometer (gas)—located between the HC scrubber filter 4012 and heat exchanger 4020 (see FIG. 7A), and optionally additionally located between heat exchanger 4020 and burner 6000; provides value B (see CONFIGURATION section below).

Fluid Train Instruments

Pressure gauge 3200 and pressure transducer 3205 (see FIG. 8J)—located between fluid pump 3067 and ramp up flow solenoid 3047; used for safety range in burner management controller.

Fluid flow meter 3051 (see FIGS. 8A, 8B, and 8D)—located between fluid pump 3067 and burner 6000; used for measuring flow rate of fluid going to the burner 6000.

Spectrometer (fluid)—located between fine filter 3030 and burner 6000; used to solve for W (see CONFIGURATION section below).

Burner Instruments

Temperature sensor 6041 (see FIG. 9A)—located over the mixing chamber 6040; used for safety range in burner control management device.

Mixing chamber pressure transducer 6031 (see FIG. 9A)—located at or near the location of temperature sensor 6041; used for determining the pressure (Mp) in mixing chamber 6040 (see CONFIGURATION section below).

Pressure gauge 6042 and pressure transducer 6004 (see FIG. 9A)—used for measuring burn chamber pressure.

Separator Instrumentation

Thermocouple 7092, 7192, 7292 (see FIGS. 13A, 14B, and 15B)—used to measure burner 6000 temperature for safety range in burner management controller.

Thermocouple 7095, 7195, 7295 (see FIGS. 13B, 14B, and 15B)—used to measure exhaust temperature as an indication of efficiency.

Configuration

The system has been found to achieve highly improved effectiveness, which sometimes can mean the difference between a workable and non-workable system, when parameters and settings are controlled. Such configuration is not easy to do, given the variability in water treated, fuels, and processing equipment. Another problem in configuring systems is that the gas, air, and fluid flows are factors that are highly interdependent.

This section describes an approach to achieve improved setup and configuration of embodiments disclosed herein. The described approach involves four steps or configuration-related actions, referred to herein as phases: (A) starting with air flow rate, determine the gas and fluid evaporation rates (or alternately, starting with desired fluid evaporation rate, determine gas and air flow rates); (B) configure the burners for the determined gas flow rate; (C) determine the fluid flow rate to the input to produce the desired fluid evaporation rate while ensuring a suitable exit flow; and (D) establish ramp-up fluid flow rates.

Details of examples within each of those phases, including formulae and calculations supporting the described configuration techniques, follow, it being understood that the description gives examples that may have many suitable alternatives or deviations, some of which are described and others that would be readily apparent to persons having ordinary skill within the relevant art.

Phase A: Determining Flow Rates. In overview, embodiments for determining flow rates comprise the following steps: (1) choosing either of two parameters, air flow rate or fluid evaporation rate, as a starting point; (2) calculating the gas flow rate (Cd) needed for the chosen rate; and (3) using that calculated gas flow rate Cd to calculate the other of the two parameters. In step 1, a first option is to start with the rate of ambient air that is delivered to the burner by air blower 2005, which can be measured, for example, in SCFM. This can be, in one useful example, the maximum rate of air that blower 2005 can produce. The rate of ambient air delivered to the burner by blower 2005 may be used in step 2 to calculate the rate of delivery of fuel gas of a given type and, from that, in step 3, to determine the fluid flow rate that the fuel can evaporate. A second option is essentially the reverse: In step 1 start with a desired fluid evaporation rate, that is the rate of fluid that the operator wishes the equipment to evaporate, often measured in GPM, and determine in step 2 the fuel gas flow rate needed to evaporate that fluid flow, and from that, in step 3, establish the air flow rate required to support burning fuel at that fuel flow rate.

If starting with air flow rate, step 3 can be broken down into first calculating the energy rate (Bt) of the gas at the gas flow rate (Cd), then calculating the fluid flow rate (E) that can be fully evaporated with that rate of energy. If starting from fluid flow rate (E), step 2 can be broken down into first calculating the energy rate (Bt) needed to evaporate that fluid flow rate (E), then calculating the gas flow rate (Cd) needed to supply that energy rate (Bt). The energy rate (Bt) of the gas refers to the amount of heat energy that is available to evaporate the fluid and is often measured in British thermal units (BTUs). The BTU rating of the burner is relevant in that calculation.

The formula $$Cd = C \times S$$

expresses the relationship between air and fuel gas fluid flow, where Cd is the gas flow rate and C is the air flow rate. Both can be measured in cubic feet per minute, for example. S is a stoichiometric ratio, which depends on the type of fuel gas used. For example, natural gas has a stoichiometric air to gas ratio of 9.7:1 (ideal) and the ratio can range from 5.6:1 to 19:1, whereas propane gas has a stoichiometric air to gas ratio of 23.9:1 (ideal) and the ratio can range from 8.9:1 to 46.62:1.

For illustration, suppose propane gas is used as a fuel and S is the ideal value. An example blower is rated at 680 SCFM (19 Kl/m), according to the charts provided by the manufacturer (in one example embodiment, a Dura Flow 4512 from Gardner Denver, Inc. of Sedalia, Mo.). Alternatively, to take into account electrical variations that might cause the fan to operate at different than expected speed (e.g., in RPM), or environmental factors, such as elevation, temperature, humidity, and dew point, that might alter the blower's capacity by changing air pressure, the value can be measured by an oxygen sensor downstream of the blower. Applying the formula results in Cd of 28.35 SCFM (803 Kl/m). This quantity, per step 2 above, is the gas flow needed for maximum efficiency at the blower's operating air flow setting.

The formula $$E = (Cd \times B \times W)/Ev$$

expresses the relationship between the fuel gas rate and fluid evaporation rate, where E is the fluid flow rate that can be evaporated, Cd is the gas flow rate (see above), B is the energy density of the particular type of gas used, W is a fraction representing the portion of heat used in evaporation (i.e., not absorbed by the residual fluid, which will be the concentrate that does not evaporate), and Ev is the energy needed to evaporate waste water, i.e., to heat water from approximately 70° F. to 212° F. (21° C. to 100° C.).

For example, E can be measured in GPM, B in BTUs per cubic foot of the gas, and Ev in BTUs for a gallon of fluid. The constant B depends on the type of gas; for example, B is 2500 BTUs for a cubic foot (93 MJ/m$^3$) of propane. W can be determined either experimentally via spectral analysis before or during run time (see Phase C below) or by using tables that show the absorption profile of material with given percentage of dissolved solids. Ev can be measured by spectrometry, as it will depend on the composition of the waste water being evaporated. For instance, the greater the amount of salt contaminants in the waste water, the more energy will be needed to evaporate it, and so the BTU value of Ev will increase. In nearly all instances, the value Ev will exceed that value for plain water, which is 8019 BTU/gal (2.2 GJ/m$^3$). The only exception is where the waste water contains a significant quantity of a substance that is less dense than water, for example ethanol.

Note that Cd×B is the energy rate per hour, labeled Bt above.

For example, in the previous illustration, where propane gas is used and Cd is calculated as 28.35 SCFM (803 Kl/m), suppose 90% of the heat is used in the evaporation (W) and 10% absorbed by the concentrate, and Ev is measured at 9274 BTU/gal (2.6 GJ/m$^3$). Then E=28.35 ft$^3$/min×2500 BTU/ft$^3$×0.9×(1/9274) gal/BTU=6.9 GPM (26.1 L/m), which is the rate of fluid that the system can evaporate (E).

Phase B: Configuring the gas inlet. From Phase A, starting from a given blower air flow rate or a given fluid input rate, the desired gas flow rate Cd has been established. From that figure, it is useful to configure and construct the gas inlet for the burner that will achieve that flow rate in a working system.

An important issue is that the gas should be delivered to the burner with enough force to overcome the pressure that is created during ignition and the expansion of fluid to superheated vapor. Mixing chamber 6040 is directly above the flame chamber 6049 and feeds the mixture of air and gas to be ignited in flame chamber 6049. Contrary to logic, mixing chamber 6040 is at a lower pressure than flame chamber 6049 because a Venturi effect creates suction.

In a preferred embodiment, the pressure (Op) at gas inlet 6030 of burner 6000 (see FIG. 9A) should be greater than three times the pressure (Mp) inside mixing chamber 6040, where the air and fuel mix. If not, the change in pressure created by ignition and the expansion of the fluid changing state disrupts the stoichiometric ratio so that a flame cannot be sustained. Thus, ensuring a greater difference between Op and Mp creates a more stable burn that is less affected by changes of pressure within the system due to variations caused by ignition and the associated rapid expansion of the fluid converting to superheated vapor. The difference between Op and Mp is referenced as the pressure drop (H), which is the difference in pressure across the set of gas orifice holes 4031 (see FIG. 11) for delivery of fuel gas to mixing chamber 6040.

In overview, embodiments for configuring the gas burner comprise: (a) estimating the pressure drop (H) using knowledge of the pressures likely in the vessels and the gas train's delivery system; (b) calculating the number (Go) of gas orifice holes 4031 (assuming a given, standard hole size) using the estimate for H and the value of Cd determined in Phase A; (c) conducting a test burn with a test version of gas orifice pipe 4033 having the calculated number of holes, and during the test measuring pressures Op and Mp; and (d) if observed Op is not at least three times Mp, adjusting the number of gas orifice holes 4031 to change H and repeating the process.

Pressure Op can be measured at the fuel gas orifice with gas train pressure gauge 4018 on gas pressure regulator 4016 (see FIG. 7A). Pressure Mp can be measured inside mixing chamber 6040 during sustained burn with mixing chamber pressure transducer 6031 (see FIG. 9A). Pressures can be stated in psig. Especially for measuring Mp, the pressure may be better measured and expressed in terms of inches of water column because water column measurements are more accurate than measurements taken in psig and inches of mercury, on account of the common use in pressure gauges of whole number units. A conversion factor of 1 psig to 27.7076 inches of water column can be applied. If using standard (metric) units, 1 psig is about 6.9 kPa and one inch of water column is about 191 kPa; alternatively meters of water column can be used instead, with 1 meter of water column (at 4° C.) equating to about 9.8 kPa.

The process is non-linear, because changing the number of holes will primarily change Op, but it will also cause some change in Mp as well. Therefore, an iterative process may be required with several test versions of gas orifice pipe 4033 having different number of holes before a suitable version is obtained. It is also desired to avoid having Op become excessively high, because that can cause excess stresses on the gas train delivery system, risk explosions, or cause higher energy use or expense. Therefore, setting Op at a factor not very much higher than three times Mp is preferred. The iterative process can be repeated, for example, until Op is between 3 and 4 times Mp.

The pressure drop (H) is related to the gas flow gas flow rate (Cd) and the number of holes (Go) according to the formula $$Go=Cd/[A \times k \times c \times \sqrt{(H/D)}]$$

where A is the area of each hole, and D is the specific gravity of the fuel gas relative to water. The constant k the discharge coefficient, which is a factor adjusting for loss in pressure as a fluid is forced through a nozzle, and is unit-less. The constant c is a factor that measures the effect of pressure on the rate of flow of gas, discussed further below, and may also include any unit conversion constants needed. The formula and the constant c derive from the orifice formula, which holds that gas flow rate equals $\sqrt{2gh}$, where g is the gravitational constant (32.2 ft/s$^2$ or 115920 ft/min$^2$ or 9.81 m/s$^2$) and h is the head (here usefully measured in feet). The head (h) is in turn equal to the pressure (H) divided by the specific gravity of the gas relative to air (d). Pressure H may be usefully measured in feet of water, to keep constant units. Because specific gravity of the fuel gas is usually stated relative to water (D), to get d, one must divide D by the relative density of water to air (which is known to be 820 at normal atmospheric pressure and 60° F. (15.5° C.), but which could be adjusted for other pressures or temperatures). Substituting, the gas flow rate Cd is $\sqrt{(2 \times 115920}$ ft/min$^2 \times$H ft/(D/820)). Grouping the constants and calculating their square root, this reduces to $13788 \times \sqrt{(H/D)}$, with the result measured in feet per minute, so in this example, c is the factor 13788, provided that the pressure H is stated in feet of water column and D is specific gravity of the gas relative to water.

In that example, suppose a burner pipe uses eighth-inch-diameter holes, then the area (A) of each hole is 0.0123 square inches (0.08 cm$^2$) or, to keep to feet, 8.54E-5 square feet. For eighth-inch holes and the pressure ranges involved, the discharge coefficient (k) is 0.82. For propane gas, specific gravity (D) is 1.52. From Phase A, the calculated value of Cd is 28.35 SCFM (803 Kl/m). Suppose we initially estimate H at 23 feet (7 m) of water column. Now that everything is stated in common units (feet and minutes), we can calculate the number of holes (Go) from the above formula, in this example: Go=28.35 ft³/min divided by [0.0000854 ft²×0.82×13788×√(23/1.52) ft/min]=7.55.

If the number of holes calculated from the formula is not a whole number, one can choose the closest number for the test. For example, the example calculation yielded 7.55 for Go, so we may wish to try seven or eight of the eighth-inch holes initially. For more precision, the estimated value of H can be altered to force the formula to produce a round number of holes, then a pipe with that number of holes installed for the test. Here, for example, if H is increased from 23 to 26.75 feet of water column (8 to 8.15 m of water column), the calculation for Go results in nearly exactly seven holes, whereas if H is reduced to 20.5 feet (8 to 6.25 m of water column), the calculation for Go results in nearly exactly eight holes.

The process has been described above as choosing a suitable number (Go) of holes 4031. One can achieve the same effect, equivalently, by altering the area (A) of each hole without changing the number of holes. Also, in making the adjustment to produce a round number of holes, instead of changing the estimated value of H, it is also possible to alter the area of each hole until the formula produces a round number for the number of holes, and the test can proceed with the initial estimate for H, the altered hole size, and the calculated number of holes. However, it should be recognized that changing the hole size will also change the discharge coefficient, and the calculation should take that into account.

After the above-described iterative process has concluded, the key characteristics of the burner, especially the number of holes and their area, have been established.

Phase C: Notice that the flow rate of fluid into the system must exceed the rate of fluid evaporated (E), because the concentrate exiting the system must flow. In overview, embodiments include testing a particular use of the system to set an input fluid flow rate so as to evaporate as much fluid as practicable while maintaining enough fluidity of the concentrate product that the burner does not evaporate. The goal is to allow the concentrate to flow out of the equipment after the system evaporates most of the fluid.

Appropriate calculations use a factor Wf, which is related to the flow rate of the concentrate product produced after fluid evaporation. Wf will depend on the composition of the fluid being processed, for example the amount of total dissolved solids in the fluid. Wf is 1.0 is interpreted as implying complete evaporation, resulting in salt solids which can accumulate, and no flow of concentrate.

The operator can set the total fluid going into the system (Tw), then vary Tw so as to control Wf. Adjustment of Wf can be achieved by trial and error testing upon initial set-up of the system, such as using manual adjustment and visual inspection of output flow. Because the composition of the fluid may change over time, periodic adjustment may be useful after initial setup.

Tw and Wf are related by the formula $$Tw = E + ((1-W) \times Wf \times E)$$

where E and W are as stated above in connection with Phase A. Tw and E can be measured in GPM for example, and W and Wf are unit-less constants. The calculations depend on specific parameters, including the stoichiometric ratio of fuel gas used and the make-up of the fluid.

Wf is controllable because E and W have been determined according to the calculations in Phase A, so Tw can be set at a value that would be produced by the formula just above for any given Wf.

For example, suppose an initial test run is implemented using a Wf of 1.5. Using the formula just above, where E is 6.9 GPM (26.1 L/m) and W is 0.9, to test a Wf of 1.5, the operator would input into the system Tw=6.9 GPM+((1−0.9)×1.5×6.9 GPM), which is 7.935 GPM (30 L/m) (Tw).

If the concentrate appears to be quite liquid at the initial setting, the value of Tw may be adjusted downward, whereas if the output flow is too concentrated and does not move fluid through the system well, Tw may be increased until a desirable flow is achieved. Due to the high temperature of the concentrate flowing out of the system, manual analysis of the rate may be preferable, that is manually measuring the time (such as in minutes) needed to collect one gallon of concentrate.

In an alternate method, during run time, the value of W may be determined by measurement, simply dividing the flow rate of the concentrate (Tc) by the flow rate of fluid (Tw), i.e., W=Tc/Tw. These may be measured in GPM, for example.

Systems often operate at more than one flow rate, e.g., "system low" and "system high." It is optionally possible to establish such a "system low" setting, which will utilize a lower blower air flow rate or handle a lower fluid input rate. Such a setting would run the equipment in a less efficient way but may be desired nonetheless, because running at system low can ensure that a system is operating at a steady state before increasing output to system high, and it may be preferable to operate the system continuously at system low when the supply of waste water, e.g., from a gas well, cannot sustain a constant run at system high, because it may be preferable to run at system low rather than stopping and re-starting the process.

To determine the proper lower setting, certain embodiments contemplate repeating the Phase A and Phase C calculations above without changing the burner characteristics (Phase B). For example, assuming Phase A began with air flow, one can reduce the assumed air flow from the maximum flow used previously and calculate a new gas flow (Cd) and fluid flow for the lower setting, then repeat Phase C to establish a Wf for the lower setting. Third or additional settings are also possible using similar techniques.

Phase D: The fluid preferably should be delivered to the burner in a way that minimizes back pressure resulting from the fluid expansion. As noted above, water expands when evaporated by a factor of roughly 1600:1 at atmospheric pressure. As fluid begins to evaporate, the back pressure increases greatly. If the system starts immediately at the full flow rates calculated above, particularly the water flow rate, then the sudden and dramatic increase in pressure will create back pressure that (1) can damage the pumps on the air, gas, and fluid trains, and (2) can disrupt the air/fuel mixture, possibly extinguishing the flame or causing failed combustion. On the other hand, if the water flow rate is too low, the heat from the burner can cause temperatures to rise very quickly and become dangerous, even leading to explosions. In one experiment, for example, the bottom of the burner outlet reached 350° F. (177° C.), which was far too high.

The combined gas law says that pressure is proportional to temperature over volume (in this instance, meaning low rate). Therefore, if the flow rate and temperature increase in tandem, the pressure will remain constant, excluding the effect of volume expansion from fluid evaporation. Therefore, it makes sense to increase the fluid flow rate over time. Even if the flow rate is increased in tandem with the temperature, however, the volume expansion once the burner becomes hot enough to begin evaporating the fluid will cause an increase of pressure, but if the fluid flow increases gradually, the pressure will likewise increase gradually. By staging the fluid delivery, the fluid flow rate from the burner through the rest of the system is decreased, thus allowing room for the flow rate expansion caused by the thermal effect.

The rate of air flow (C) and the rate of gas flow (Cd) can be totaled, and the fluid evaporation flow rate (E) can be converted to vapor using a multiplication factor, to calculate a rate at which vapor is being inserted into the system. To understand how the system's pressure heavily depends on the amount of fluid evaporated, which in turn depends on the fluid flow rate, consider the above-calculated flows, using the calculations in the example done in Phases A-C above. In those calculations C=680 SCFM (19 Kl/m), Cd=28.35 SCFM (803 Kl/m), E=6.9 GPM (26.1 L/m), and Tw=7.935 GPM (30 L/m). Converting E from GPM to SCFM can be done by dividing the GPM rate by the conversion factor 7.48, so E=0.922 SCFM (26 l/m) of fluid, but when evaporated at the 1600× expansion rate, that produces 1475.2 SCFM (41.8 Kl/m) of vapor. At full flow, therefore, the total gaseous flow rate is 680 SCFM (19 Kl/m) (air)+28.35 SCFM (803 Kl/m) (propane)+1475.2 SCFM (water vapor) for a total gaseous flow of 2184 SCFM (62 Kl/m). By contrast, if the fluid flow rate is controlled so that E is only one third of the full rate, the total gaseous flow rate is 680 SCFM (19 Kl/m) (air)+28.35 SCFM (803 Kl/m) (propane)+491.7 SCFM (14 Kl/m) (water vapor) for a total gaseous flow of 1200 SCFM (34 Kl/m), only 55% of the full rate. Thus it can be seen that controlling fluid flow will strongly change the pressure caused by evaporation, even if the air flow and fuel gas flow are at full rates. Thus, in some embodiments, "start-up" and "system low" conditions may rely only on control of the water flow while allowing full air and fuel flows.

In some embodiments, therefore, the system can be set to stage the fluid delivery, i.e., begin with a low fluid flow at ignition but ramp up the fluid flow to the full value, either gradually or incrementally. In one embodiment, the start-up fluid flow (Ts) can be set at one third of Tw (calculated in Phase C) and increased to full Tw upon reaching a temperature in the burner chamber of 230° F. (110° C.). In other embodiments, the temperature at which the fluid flow is increased can be set at a figure in the range of 190-230° F. (88-110° C.). In other embodiments, Ts can be set at a different fraction of Tw. In still other embodiments, several "pause points" (Ts1, Ts2, etc.) can be set as needed or desired. In some embodiments, the fuel gas train and the air train are set for a "soft start," in which they ramp up to full volume gradually, but within a few seconds, whereas the water is introduced more slowly. In one example where Ts is set at one third of Tw, an example system can reach the Ts rate at, or a few seconds after, the "soft start," then the system increases the fluid flow to the full Tw rate upon detecting the burner chamber has reached the pre-set temperature, perhaps somewhere between 20-60 seconds thereafter.

Equipment Setup

Figure 27:
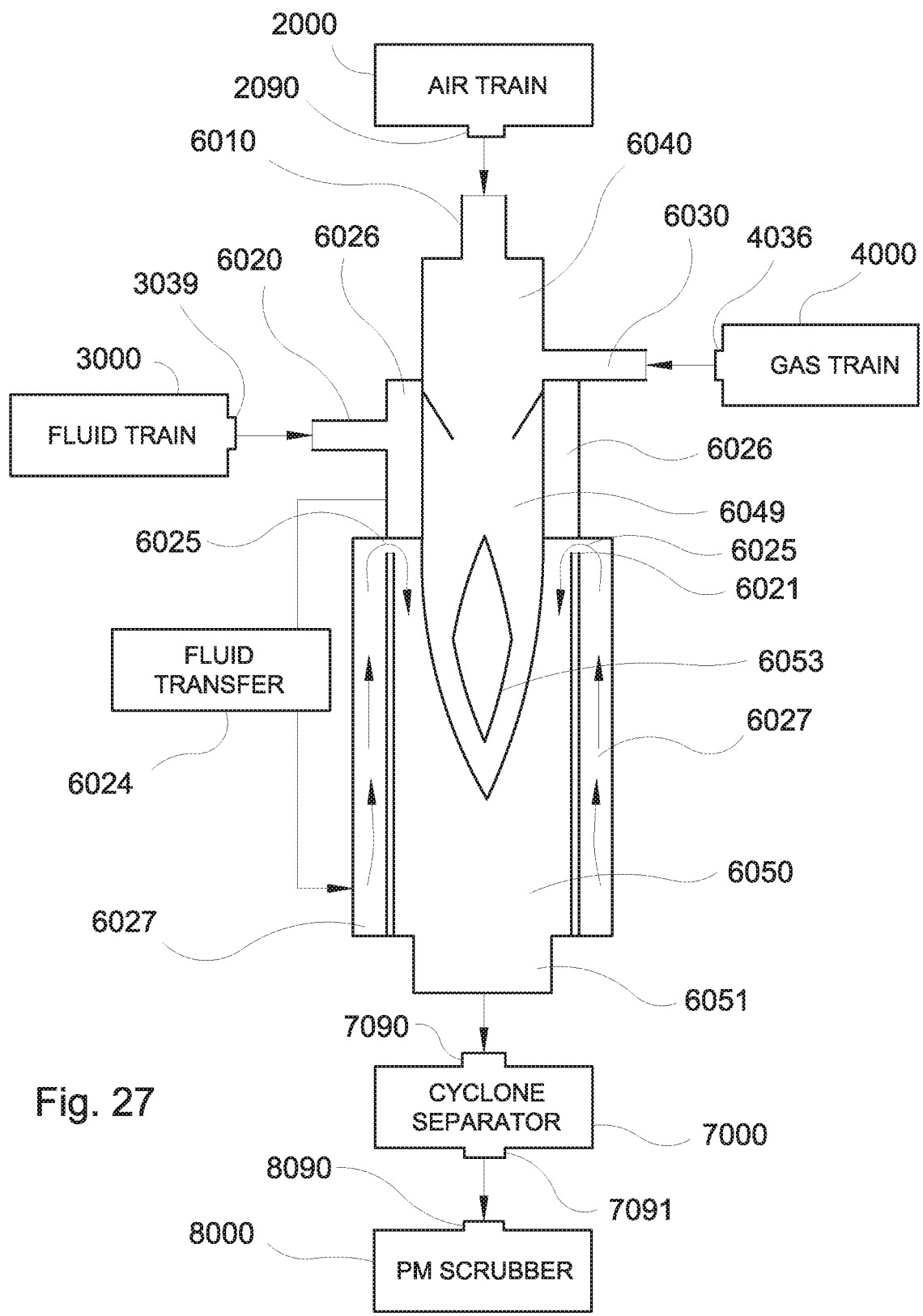
FIG. 27 is a diagram of burner operations.

Regardless of the degree of system automation, often most of the effort is involved in the initial setup of the system, after which the system may process waste water continuously for an extended period of time with minimal effort. FIG. 27 exemplifies a general overview and major components of an example overall system 1000 having, in particular, air train 2000, fluid train 3000, and gas train 4000 supplying air, fluid, and fuel gas to burner 6000, burner 6000 having annulus 6027 for providing the above-described fluid cascade 6025 into burn chamber 6050 for direct exposure of the fluid to flame 6053, whereby the fluid undergoes evaporation, the product of which is further processed in a separator (cyclone separator 7000 shown), and optional PM scrubber 8000. The manner of setting up overall system 1000 is described further in this section, it being understood that the description includes examples that may have many suitable alternatives or deviations, some of which are described and others that would be readily apparent to persons having ordinary skill within the relevant art.

Figure 28A:
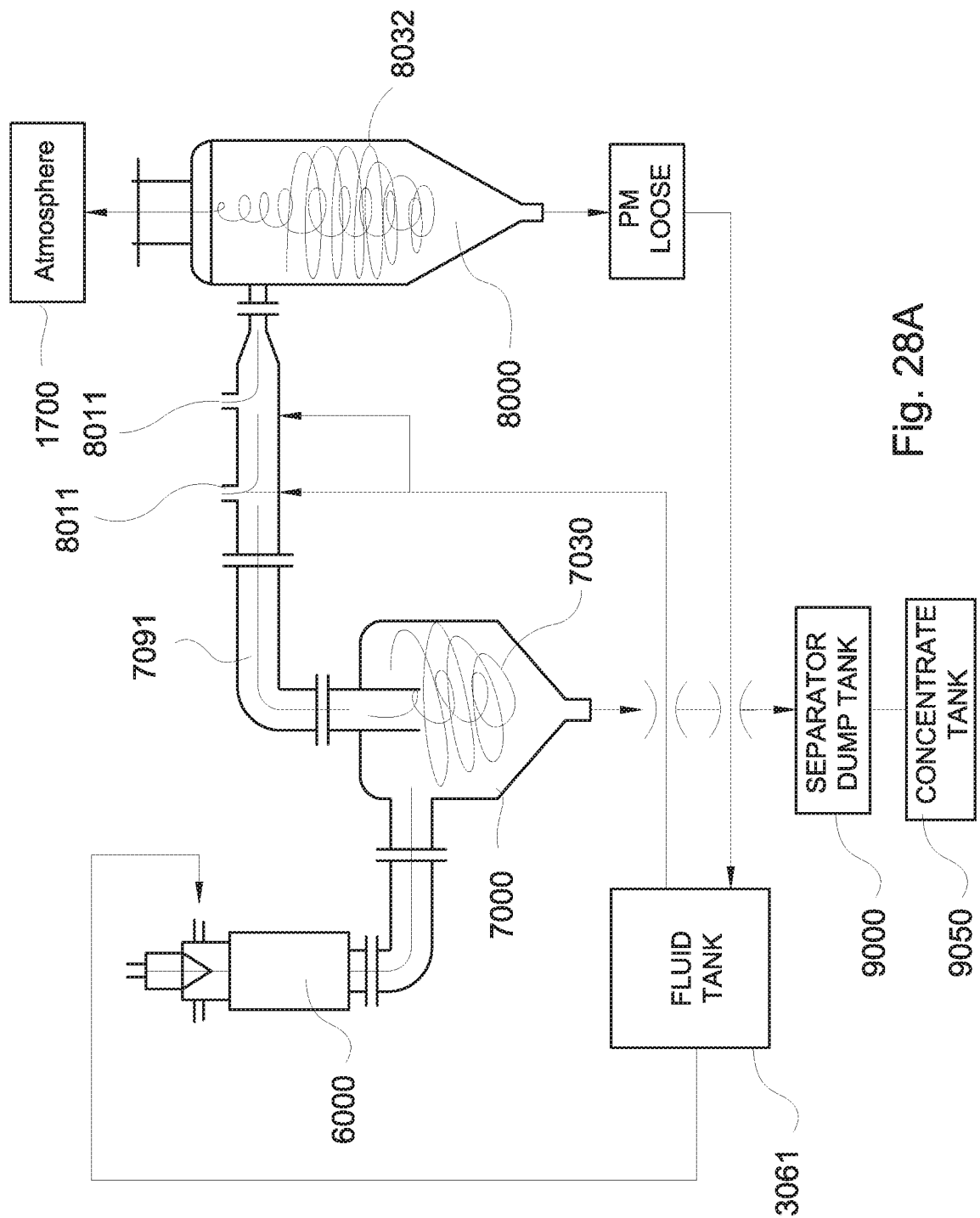
FIG. 28A is a diagram of cyclone (FIG. 13A) to PM wash chamber/scrubber (FIGS. 16 and 20) operations.
Figure 28B:
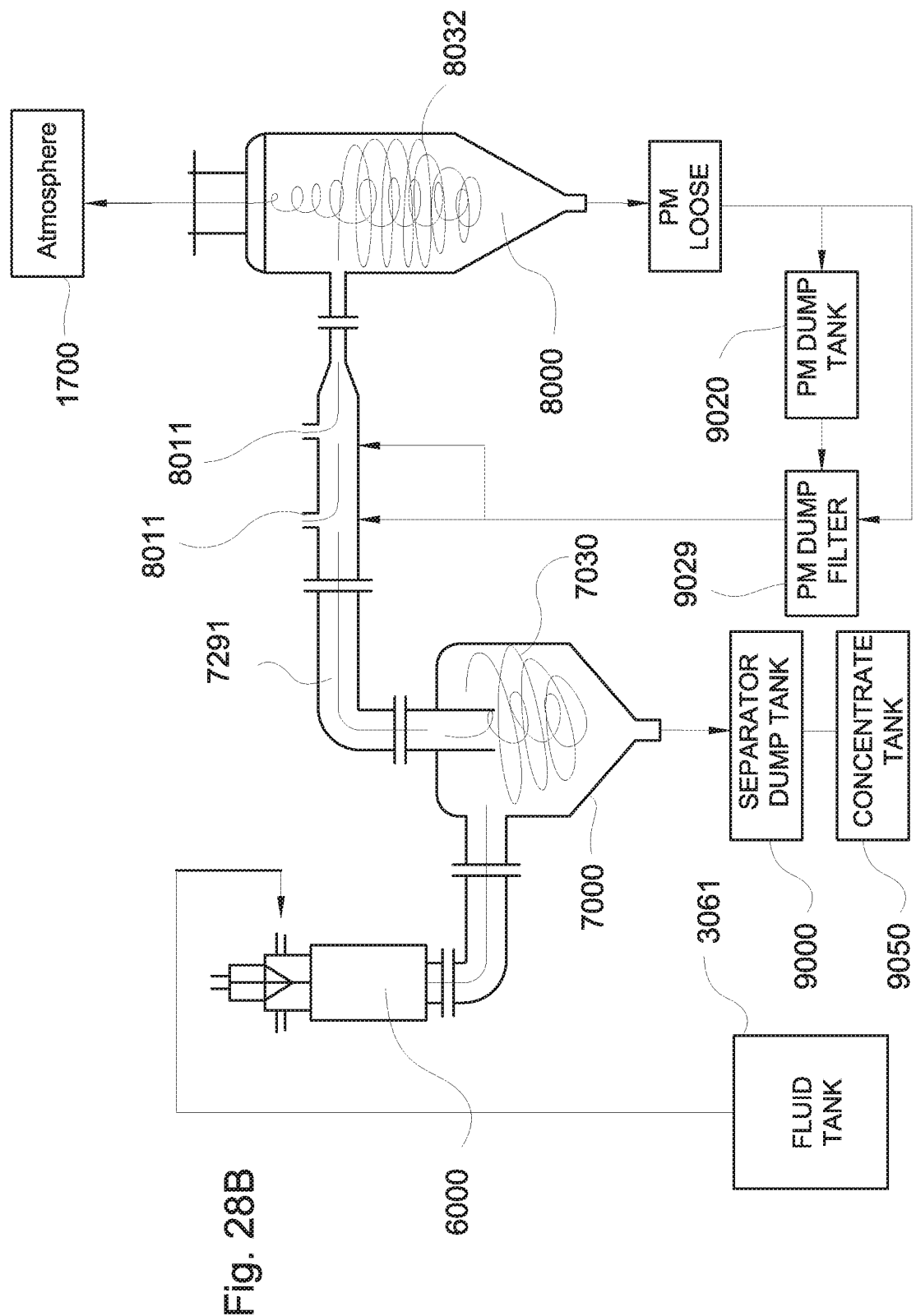
FIG. 28B is a diagram of an alternate embodiment of cyclone (FIG. 14A) to PM wash chamber/scrubber (FIGS. 16 through 20) operations.
Figure 28C:
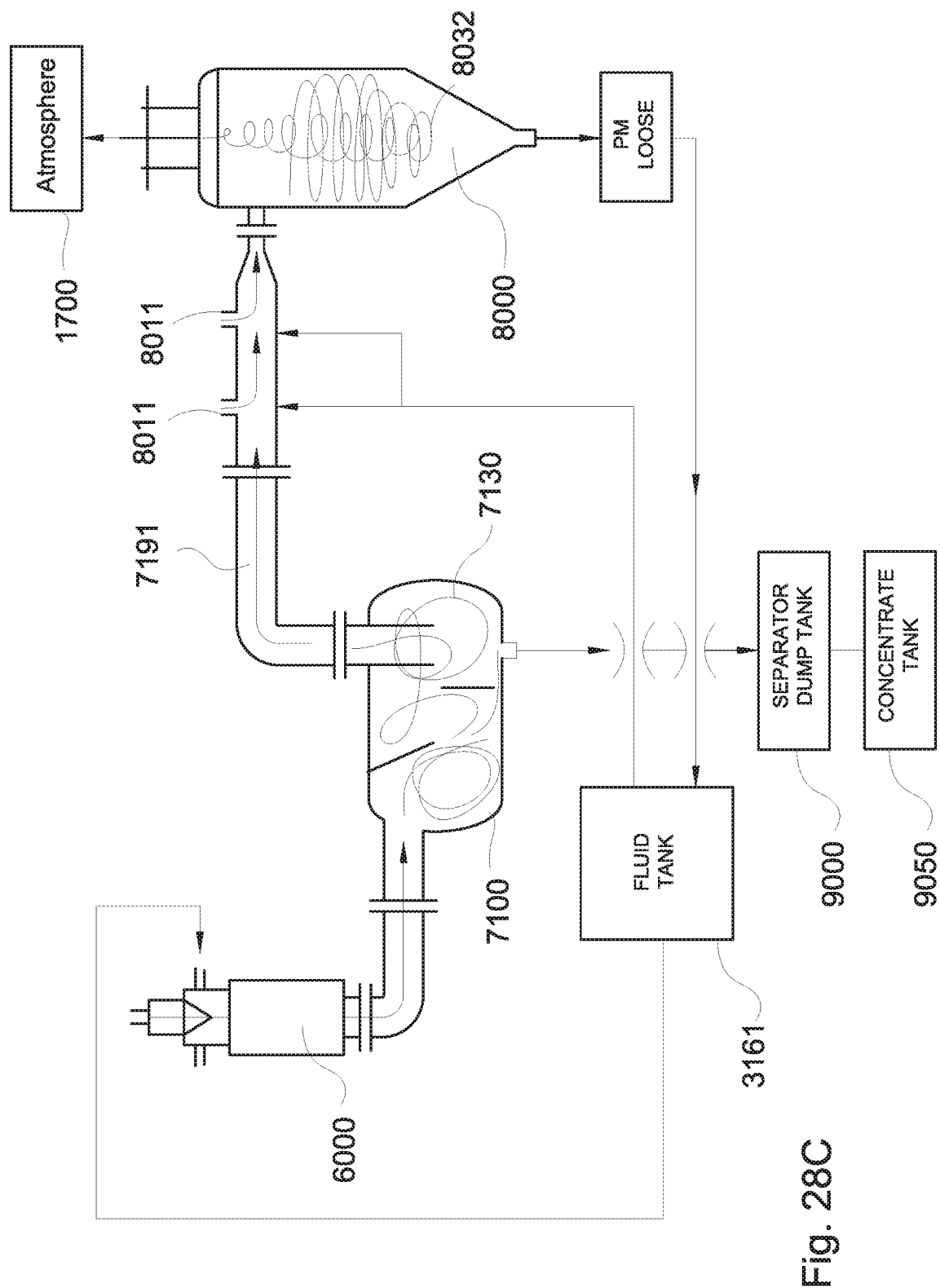
FIG. 28C is a diagram of vortex (FIGS. 15A and 15B) to PM wash chamber/scrubber (FIGS. 16 through 20) operations.

FIGS. 28A, 28B, and 28C exemplifies a general overview of alternate configurations of burner 6000 to separator (cyclone separator 7000 (FIGS. 28A and 28B) and vortex separator 7100 (FIG. 28C)) to PM wash chamber/scrubber 8000 operations, and the general directional flow of waste material through the system as it is processed.

When setting up the system initially, a suitable location should be identified for placement of the unit. The unit should be near on-site fluid tanks and electrical supply, and it should not impede site traffic. It should be accessible from all sides, and there should be enough room to connect a concentrate tank. If required by governing site regulations, it should have containment installed and it should be leveled. Connections may be made to a fuel gas supply, to fresh water and fluid supplies, and to electricity.

Electrical Setup

Figure 29:
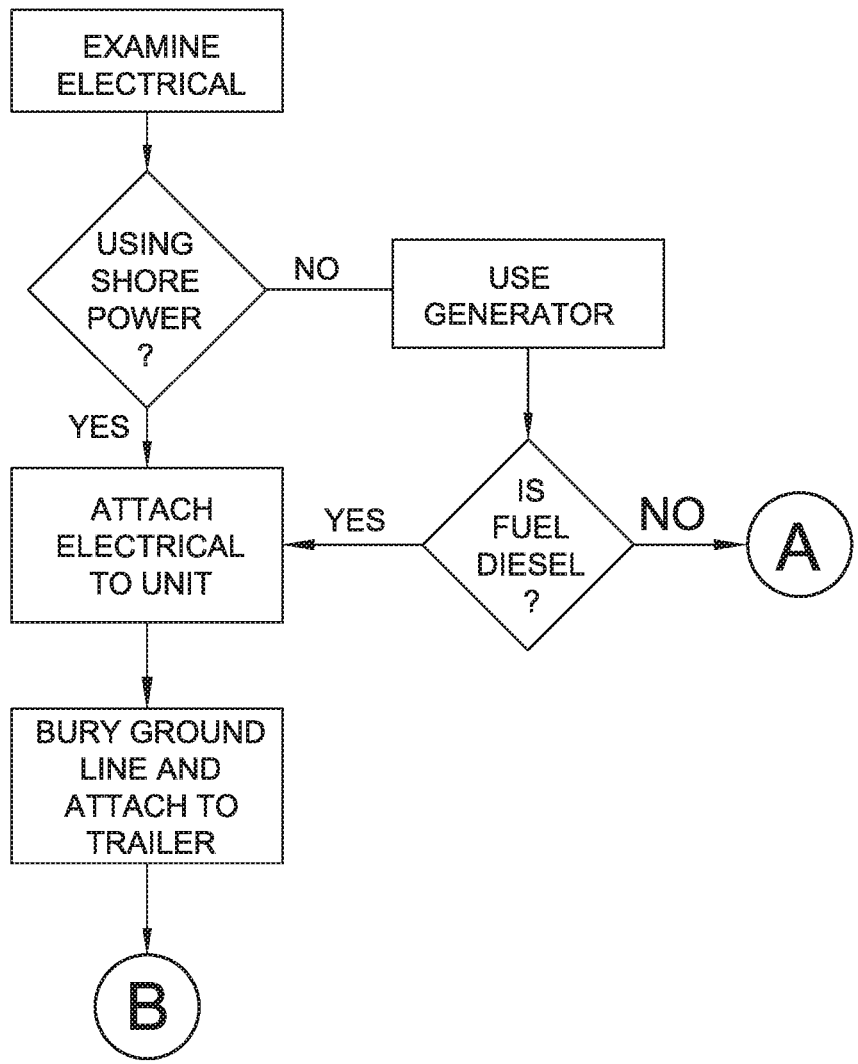
FIG. 29 is a flow chart of an electrical setup A.
Figure 30:
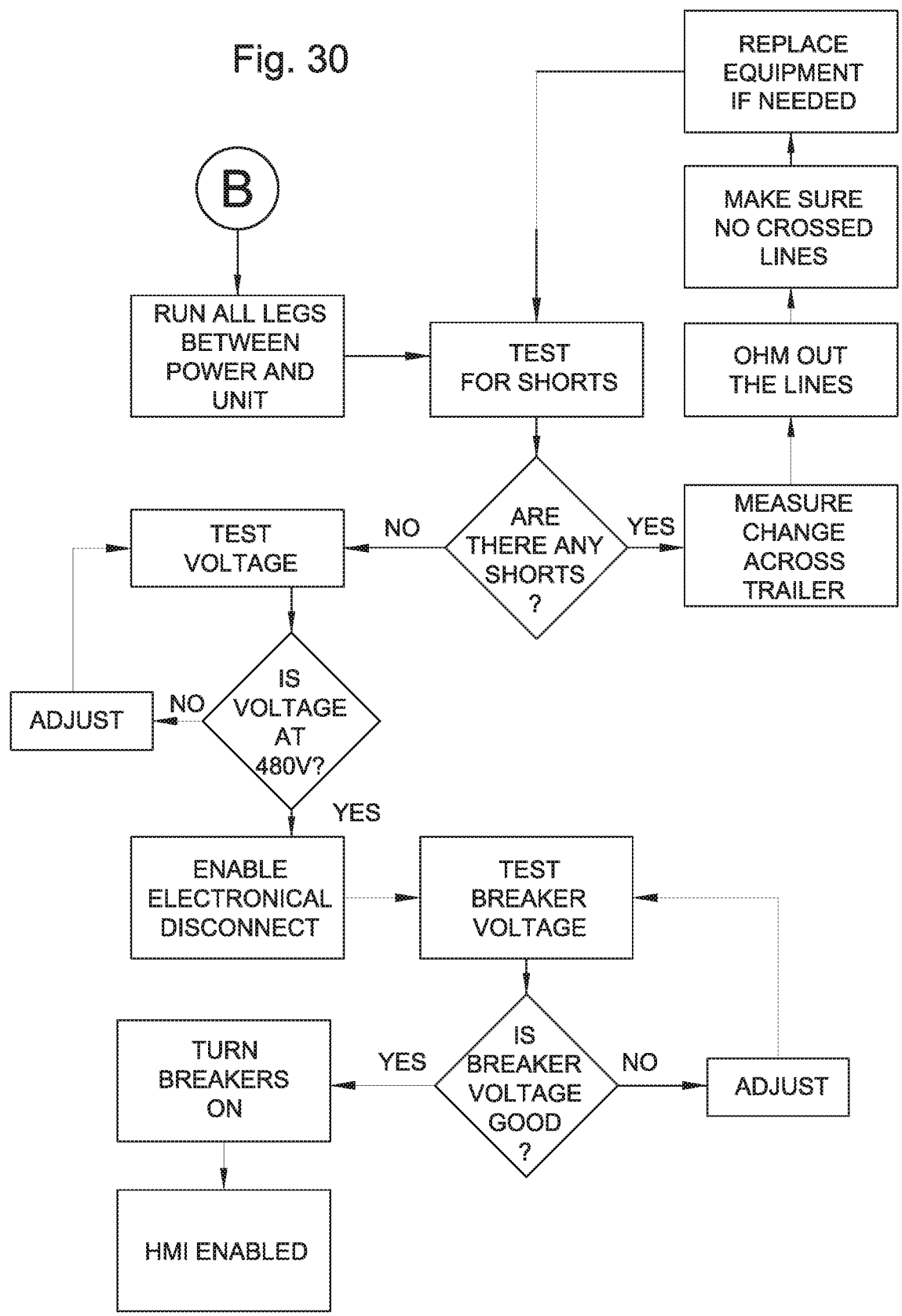
FIG. 30 is a flow chart of an electrical setup B.

FIGS. 29 and 30 exemplify a general overview of steps for establishing electricity to the system. A qualified or certified electrician should be employed according to governing site rules and as a safety precaution.

Connections to the L1, L2, L3, and ground hookups should be made from the power source to the electrical disconnect box on the unit. Preferably the 1, 2, and 3 legs on both sides of the wires should be labeled. An earth ground should be driven deep enough for a reading and connected to the trailer with an insulated wire 4 AWG or larger. The power should not be turned on at this point.

Verification that the electricity is in the off position should be performed at the disconnect box. Using an ohm tester, the three legs and ground should be tested for a signal between any one of them. A signal may indicate that there is a short between the electrical disconnect to the power source that should be corrected before proceeding. It is safe to continue when there is no signal from any of the lines to another line. Verification that all of the breakers in the control box are tripped (in the off position). Then it is safe to allow power through the lines to the electrical disconnect.

If shore power is employed, the power may be switched on. If a generator using natural gas is employed, the natural gas line should be tested and pressurized before proceeding. If a generator using diesel is employed, the generator maybe turned on. Once the power line is energized, a multimeter may be employed to check the voltage. If possible, the voltage coming from the power source should be adjusted as close to 480 V as possible.

With the line energized with the correct voltage, the electrical disconnect switch may be turned on. A multimeter may be employed to ensure that the trailer frame is not being energized. If it is apparent that the trailer is being energized, the electrical disconnect switch should be turned off and all grounding terminals, L1, L2, and L3, and wires from the electrical disconnect to the cabinet connections should be tested with an ohm meter. Wires or connections that are allowing a signal to pass should be repaired before proceeding. When there is no measurable charge on the trailer frame, it is safe to continue.

Breakers may be turned on sequentially while checking for a charge to the trailer frame. If a charge is discovered after powering a breaker, it should be turned off, tested, and repaired before continuing. When all breakers are turned on and the trailer frame has no charge, it is safe to continue. The unit now is powered up, and all pressure transducers should show a display on the HMI screen. This information is useful for monitoring fluid and gas connections.

Fuel Setup

Figure 31:
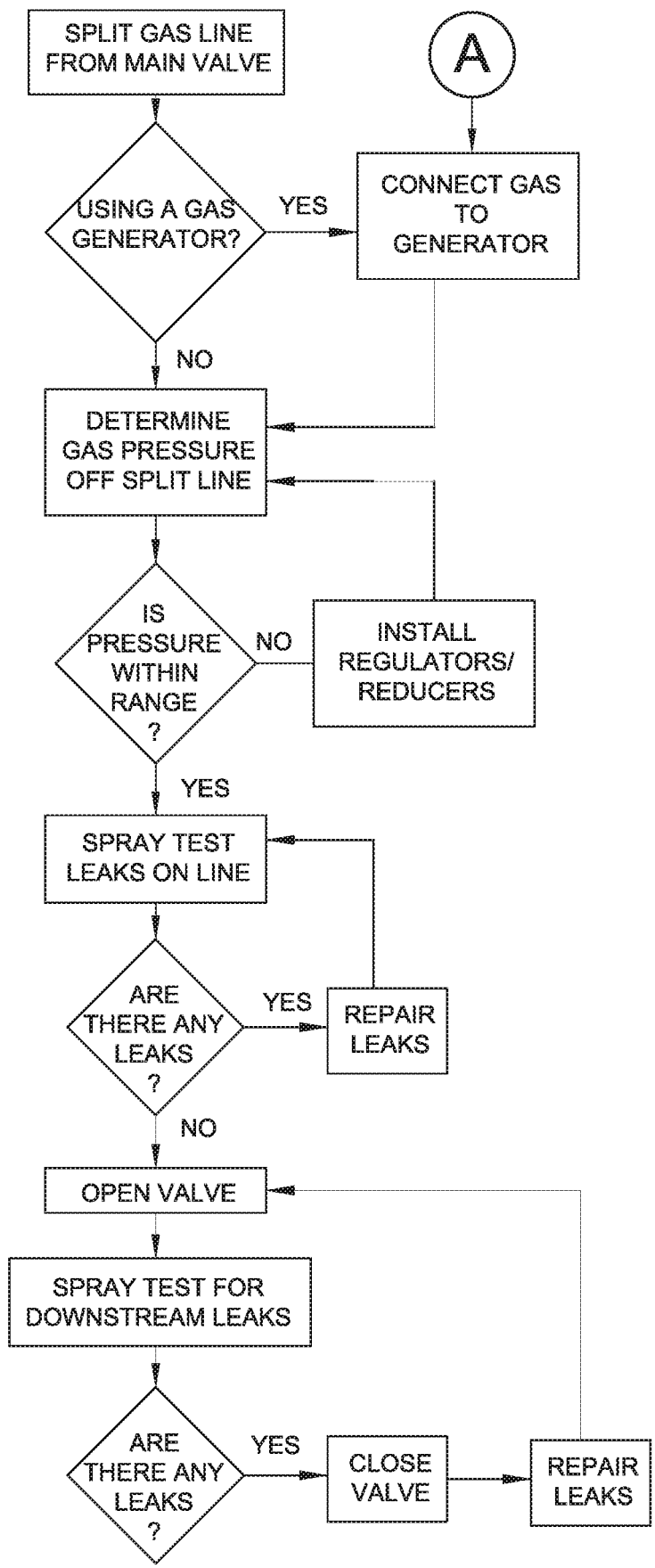
FIG. 31 is a flow chart of a gas setup.

FIG. 31 exemplifies a general overview of steps for setting up a fuel source to the system. The fuel gas line should be removed from heat sources and traffic areas, and it should display the signage and employ the safety precautions required by governing site rules. Connections should be made with pressure lines and fittings meeting specifications required by governing site rules. Connections may be made from the outlet gas line of the gas well separator or buyback gas, with a shut-in valve and optional gas meter, to the inlet of the gas train, for example via the gas manifold to gas train line. Fuel should not be flowing through the lines at this point in the setup.

If a natural gas generator is needed as a power source, a tee in the line with a shut-in valve may be useful. This placement should be performed by a qualified or certified individual under the governing site rules and as a safety precaution.

It is important to know the incoming pressure at the gas line connection. If the pressure is between 20 psig to 60 psig (138-414 kPa), no additional pressure reducers or regulators are needed. If the pressure is greater than 60 psig (414 kPa), one or more pressure reducers or regulators may be used to lower pressure in the line to a maximum of about 60 psig (138 kPa) without creating a pressure drop that may cause the line to freeze. For every 15 psig (103 kPa) in pressure drop, 1° F. (0.56° C.) in temperature will be lost.

With an appropriate number of pressure regulators installed in the line, and with all connections tightened from the gas line to the gas train, the shut-in valve attached to the natural gas line may be opened slowly and the pressures monitored and checked for leaks, for example, with a certified liquid that bubbles if a leak is present (e.g., SNOOP® gas leak detector, available from Swagelok Co. of Solon, Ohio) by spraying every connection and fitting while slowly pressurizing the line. If bubbles are observed, it is important to seal the connection so that are no leaks before proceeding.

Once all the connections have been tested and passed, and the pressure regulators are properly set so that pressure downstream of the pressure regulator(s) on the unit less than about 20 psig (138 kPa), the valve between the regulator(s) and gas well separator may be opened to fill the gas train up to the main gas valve. Pressure downstream of the pressure regulator(s) may be measured using a gauge attached to the gas well regulator and displayed on the HMI. All the connections should be checked with a leak detection composition to ensure no leaks developed from transportation and vibration to the location. If there are leaks, the valve should be closed and the leaking joints or fittings repaired before proceeding. Once all the connections and fittings have passed the leak test, the natural gas connection is complete.

Fluid Setup

Figure 32:
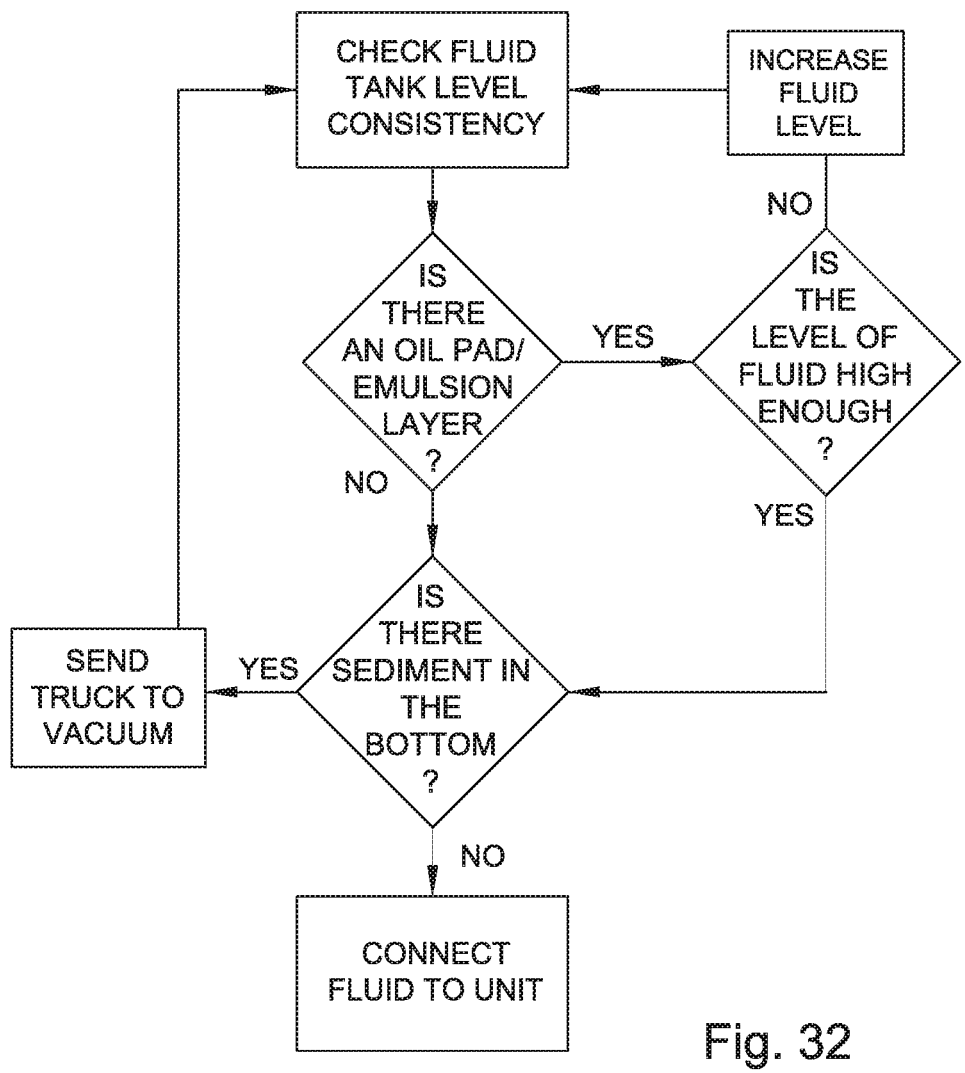
FIG. 32 is a flow chart of a fluid setup A.

Waste water: FIG. 32 exemplifies a general overview of steps for connecting waste water to the system. Connections should be made with hose and fittings meeting specifications required by governing site rules. Connections may be made from the fluid tank to the water train, with an optional flow control valve and a shut-in valve. It is important to keep all connections within a containment to catch possible leaks. Leaks may be detected by visual inspection. A leak could cause an adverse environmental event (i.e., a "spill") that could result in difficult or costly remediation. The waste water line should be removed from heat sources and traffic areas, and it should display the signage and employ the safety precautions required by governing site rules. Fluid should not be flowing through the line at this point in the setup.

A qualified or certified individual should be employed according to governing site rules and as a safety precaution. First, it is important to take note of the conditions in the fluid tank. A determination should be made as to the fluid level in the tank and whether there is an "oil pad" or emulsion layer on top of the waste water level. If an emulsion layer or oil pad is drawn into the system, a shutdown may occur. Most tanks employ an ultrasonic meter. The only fluid flowing to the unit should be waste water with as few solids as possible.

Using the regulating valve between the connection to the tank and the shut-in valve and the water line to which it is connected allows for controlled operation of fluid flowing to the unit, e.g., when optimal tank level conditions are met as dictated by pre-set open and close points related to the waste water level in the tank. All connections should be inspected to ensure that the fluid line running from the tank to the fluid connection on the unit is as secure as possible.

Once the line is checked and the tank level is in operating range, the regulating valve may be opened slowly. This allows some waste water to begin flowing through the hose. Because the line should not have leaks, and it was previously filled with air, the air should compress and need venting. This can be accomplished by accessing the HMI and opening the automated waste water valve, and then cracking open the pump drain valve to allow air to escape downstream of the pump. Flow of a few gallons of fluid through the line should remove the majority of the air from the line. When venting is complete, turn the automated valve for the waste water to the closed position. If the level of the tank is lower than the level of the pump on site, waste water will not be capable of crossing the valve, in which case priming the system with fresh water may be useful to create a vacuum in the line until all of the air is removed from the waste water line.

Fresh water may be used for priming the pump and flushing out the system. The fresh water tub may be filled before delivery of the unit or after instillation. An external pump or a hose with supplied pressure may be used to transfer fresh water to the tub. Preferably the water is potable. If potable water is not available, an additive may be mixed with the water so as to inhibit bacterial growth in stagnant water.

All fittings and seals from the tank to the pump should be tightened and checked for leaks. Fittings may have been loosened for freeze protection or become loose during transport. To prime the system, the valve connected to the fresh water tank should be opened. With the control box powered up, the HMI may be accessed and automated fresh water valve may be opened. Air may be expelled from the system by opening the drain valve downstream of the flow monitor. Vigilance for leaks should be exercised and leaks discovered should be fixed. Once the majority of the air has been expelled and water is starting to flow out, close the drain valve downstream of the flow monitor.

Priming the fluid pump: With the electrical, waste water, and fresh water connections completed, pump may be primed and the system filled/flushed. The fresh water automated valve should be open and the waste water should be closed. This may be controlled via an HMI. Preferably, the valve position of both valves should be visually inspected as well. Then the breaker for the fluid pump VFD may be turned on to provide power. The VFD for the fluid pump motor may then be set to about 70% capacity to allow for making adjustments due to pressure drops or increases (for example, if the filter acquires build-up), although it is not yet turning.

With the fluid pump motor speed settings programmed and fresh water supply valves upstream of the pump open, the first control valve downstream of the pump and the fine filter disconnect valve may be opened fully. All the valves through which the fresh water flows from the fresh water tank to the burner to the concentrate tank should be open. Preferably, a double check of the lines, valves, and settings should be performed.

The pump may be turned on using the HMI. The system should be monitored to confirm constant pressure of the fluid line downstream of the pump, to confirm constant flow rate from the flow monitor, and to detect the sound of pump cavitation (indicating trapped air or leaks). If these key important indicators have not stabilized after about 10 seconds, the pump should be turned off, and all valves and connections checked. Drain lines may be opened to release residual trapped air.

When the pump is on and the system is operating properly, a verification that fresh water is flowing out of the concentrate outlet should be conducted. With fresh water flowing through the system at a constant rate, the fluid train may be switched to flow waste water. All valves and fittings between the fluid tank and the system again should be checked to ensure that all valves are open and may flow waste water freely to the automated fluid valve without the presence of leaks. With the fluid pump running fresh water, the HMI may be employed to switch to waste water by activating the automated fluid valve. This action should simultaneously close the automated fresh water valve and open the automated fluid valve. An inspection and priming exercise similar to that performed for fresh water should be employed while waste water is the fluid supply.

Unless the fluid tank level is considerably higher in elevation than the pump level, likely there will be air trapped in the system. Because of this, the pressures may drop and the flow rate may become unstable. This may be addressed by switching between fresh water and waste water until the unit is stabilized for both fluid streams. Once the water stream is stable for both fluid streams, the system is primed and the HMI may be employed to turn on the fresh water automated valve and to turn the pump off.

Air Setup

Figure 33:
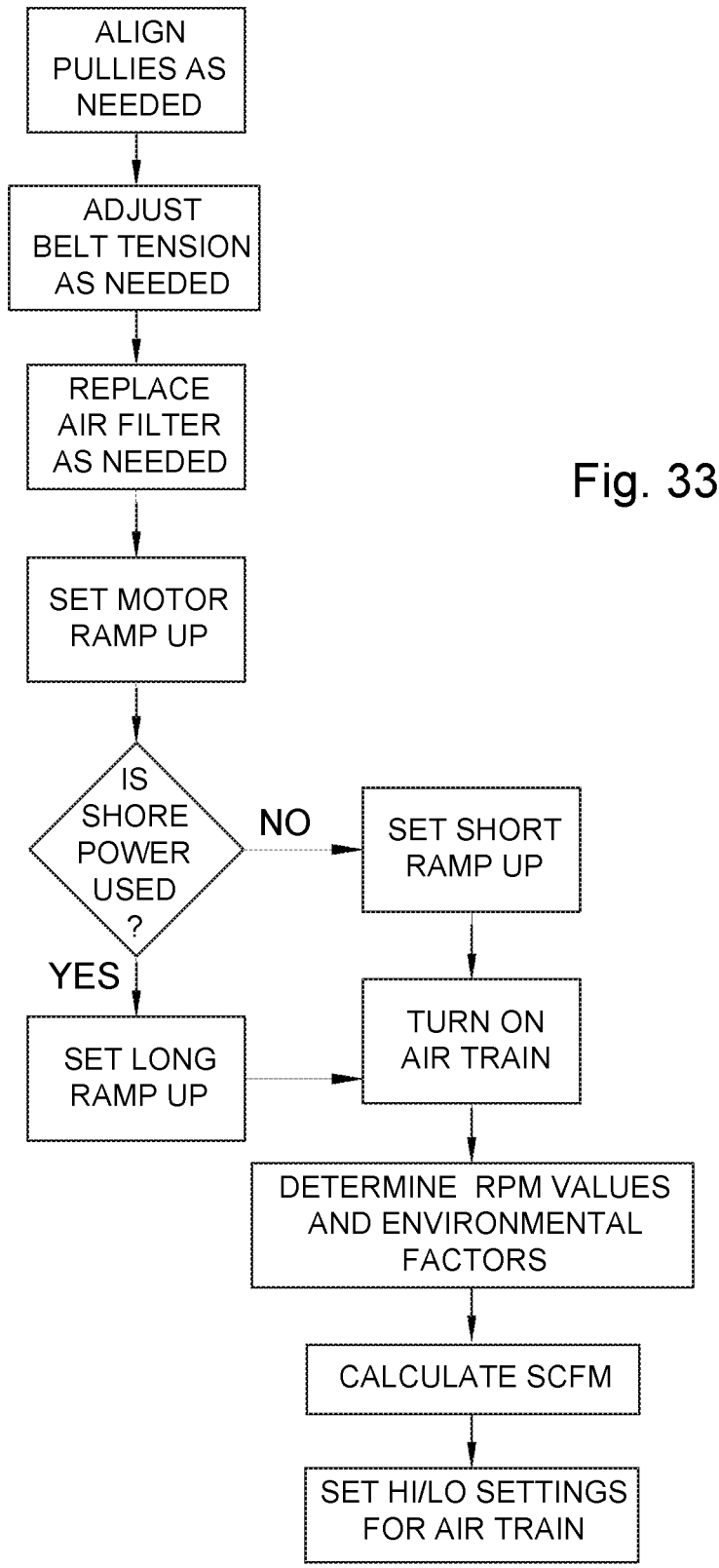
FIG. 33 is a flow chart of an air setup/configuration.

FIG. 33 exemplifies a general overview of steps for connecting an air supply to the system. An alignment inspection and any adjustment of the pulleys on the positive displacement blower should be performed before turning on the blower. Once the pulleys are parallel and aligned, the belt tension should be checked. Total tension is determined by the motor and blower manufacturing specifications. For example, for a total tension of 100 lbs. (445 N) across four belts, each belt would have about 25 lbs. (111 N) of tension after any tightening or loosening. Alignment should be re-checked if tension adjustment is performed. Also before turning on the blower, the air filter should be replaced if it is not clean and free from debris.

Electric motor ramp-up settings may depend on the power source that is used. If shore power is available, the ramp-up speed of the electric motor should be set to the longest time possible (e.g., about 60 seconds) for prolonging longevity of the motor. If a generator is being used, the motor controller should be set for the fastest ramp-up possible because of the electrical surge needed to start the motor and the ability of a generator to handle short surges only. The ramp-up is defined by the amount of time needed to get the motor from start to full speed.

The blower may be turned on using the HMI. When the motor is at full speed, the speed of the blower may be determined using an optical RPM counter. The speed and pertinent environmental conditions (temperature, humidity, elevation, outlet pressure, and barometric pressure) are used with the blower manufacturer's charts to determine the air flow throughput of the positive displacement motor used in the calculations described above.

Gas Train Setup

Once the gas line connection has been completed and the pressure is in the appropriate range, the gas train pressures and valves may be set according to the values derived from the air flow rate using the techniques disclosed above. Note that the previous pressure test stopped at the main gas valve. All fittings and valves downstream of the main gas valve should be checked for leaks. Until gas is flowing through the system past the main gas valve, it is not possible to check for leaks. An $H_2S$ monitor may be useful for personnel safety, and a tri-gas monitor is preferred. The number/size of orifice holes and the pressure needed to deliver the correct quantity of the type of fuel used may be determined according to the above-disclosed method.

An illustration uses the values derived in the CONFIGURATION section above, where there were 7 holes in the gas pipe, the type of fuel gas is propane and the full flow rate of fuel gas (Cd) was calculated at 28.35 SCFM (803 l/m). Also from the calculation above, the pressure H was 26.75 feet of water column (80 kPa). If Op is set at exactly three times Mp, then Op would be H×4/3, because H is defined as the difference between Op and Mp. In that case, Op=35.67 feet, which converts to 15.46 psig (107 kPa). That value of Op is the pressure that the pressure gauge or pressure transducer on the gas orifice needs to register in order to deliver 11.6 psig (80 kPa) of pressure drop (H) over 7 orifice holes into the mixing chamber.

To perform the task of controlling fuel gas pressure, the air blower should be turned on and running. The action of adjusting the gas may release flammable gas through the system. Therefore, the blower should be running, the pilot should be turned off, the heat exchanger should be turned off, and the spark igniter should be disconnected. Using the HMI, the blower may be turned on and allowed to reach full running speed. With the air running, the main gas relay may be manually activated and the gas valve opened and adjusted until the desired pressure registers on the pressure gauge or pressure transducer. Once the desired pressure is achieved, the main gas relay should be closed and air from the blower should be allowed to purge the system of fuel (in this case, propane gas) past the burn chamber. Purging may be completed in about 30 seconds. The set point on the pressure gauge should be re-checked while performing a leak test. If the pressure changes, it should be re-set, and the foregoing steps repeated until the results are stable, including a system purge flammable gas (by running the blower for at least about 30 seconds). The automated gas valve is used to set the correct pressure according to the formulae. The value of Q (rate of gas flow through gas orifice, such as in SCFM) may have different values for system low and system high if the system is set to change gas flow settings relative to the amount of incoming air as per the techniques described above.

Fluid Train Setup

The system, having been primed with fresh and waste water fluid streams, can be set up for the Ts flows identified above. In addition, where the system has one or more "system low" operational point or points (as also discussed elsewhere above), one or more of the Ts flows can correspond to that flow rate. For example, if Ts is set at one third of Tw, then a "system low" operational point might be set at two thirds of Tw, allowing the system to run at one third during start-up, two thirds during "system low" operation, and Tw at "system high" operation.

To set one or more fluid flow rates, the pump may be turned on from the HMI. The relay that controls the first solenoid that allows fluid to pass may be manually activated to open the solenoid. Once the solenoid is open, the first valve may be accessed and the flow setting adjusted to the ramp-up flow rate by using the HMI readout or by the reading from the flow sensor. Because the flow sensor is a totalizer for all fluid flow, the second stage flow rate (e.g., in GPM) through the second valve is added to the first stage flow rate (and the third stage flow rate is added to the flow rates of stages one and two). The relay that controls the second solenoid that allows fluid to pass may be manually activated to open the solenoid. Once the solenoid is open, the second valve may be accessed and the flow setting adjusted to the low-flow rate by using the HMI readout or by the reading from the flow sensor. The relay that controls the third solenoid that allows fluid to pass may be manually activated to open the solenoid. Once the solenoid is open, the third valve may be accessed and the flow setting adjusted to the high flow rate by using the HMI readout or by the reading from the flow sensor. Flow settings may be calculated based for the "system low" setting.

Burner Activation

Once the electrical, the air train, the fuel gas train, and the fluid train are set up, the system may be started to activate the burner to run in automatic mode. In automatic mode, the control system is in charge of monitoring pressures, flow rates, temperatures, and safety parameters.

The system should be purged to be ready for automatic mode. The power to all electronics should be turned on and the controller allowed to boot up. The fresh water automated valve should be activated to the open position from the HMI. The water pump may be turned on from the HMI by setting the water pump VFD to the same settings that were used while setting up the water train. The HMI may have a "purge" button for the fluid train. Purging allows fresh water to run through the system. When fluid begins to exit through the concentrate dump, the system is purged, and this verifies that the burn chamber is ready to receive fluid.

The air blower should be turned on and allowed to get up to speed. With the air blower running, the main gas valve relay should be manually activated and opened for about 10 seconds, and then shut off. Wait for one minute (with the blower running) to clear fuel gases from the system past the main gas valve.

The ignition spark plug relay may be manually activated then the pilot gas turned on. The HMI may verify whether the pilot is lit. If the pilot is not lit, the air valve on the pilot light may be adjusted until there is an ignition and a sustained flame. This may be visually confirmed from the sight glass by the pilot assembly on the burner. Once a steady flame is established, the ignition spark plug may be turned off. If the pilot flame stays lit, as verified by the sight glass or by the indicator on the HMI, the pilot is set and the relay to the pilot gas may be turned off. An inspection should be conducted to verify that all manual relays are off.

Figure 34:
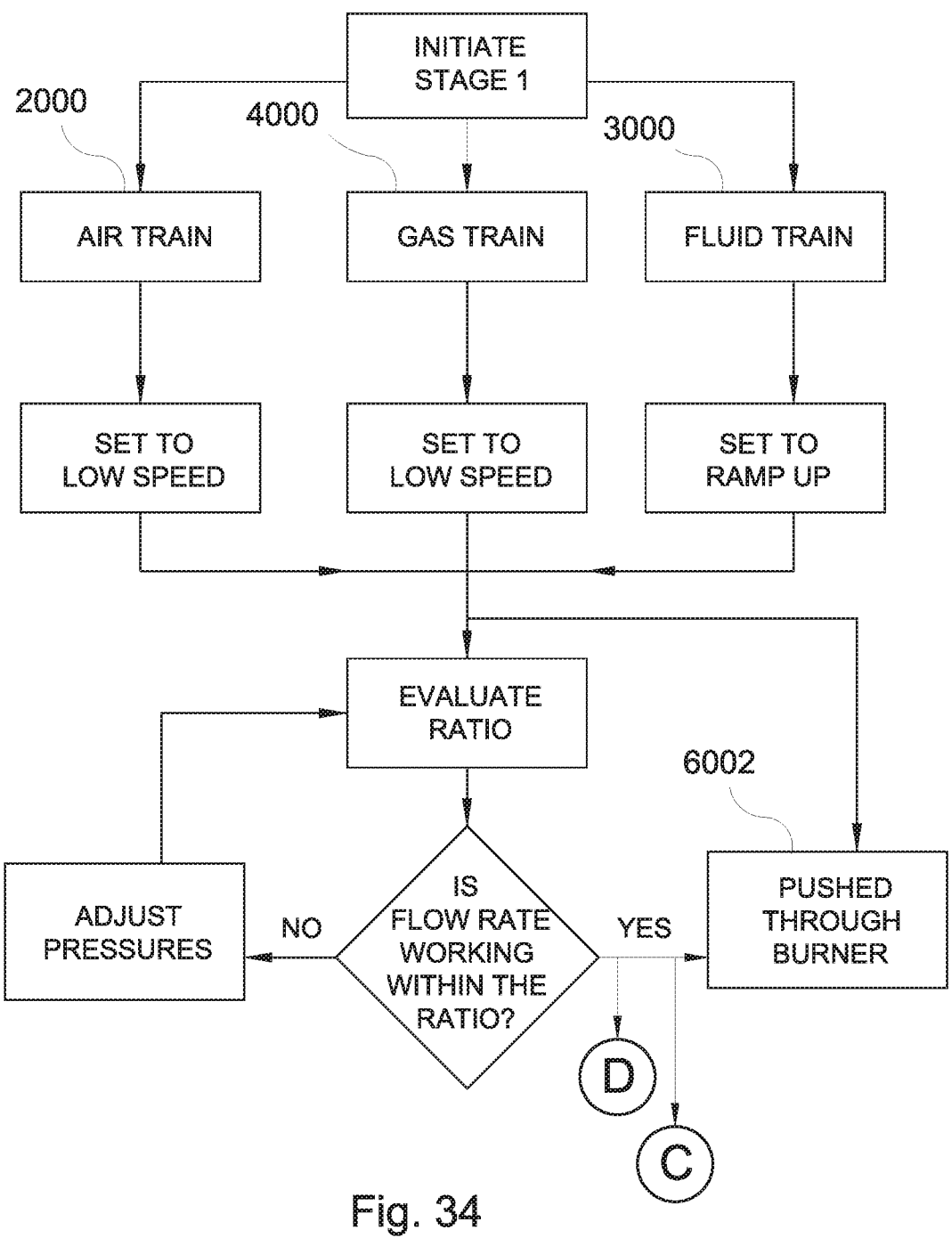
FIG. 34 is a flow chart of an initiate system stage 1.
Figure 35:
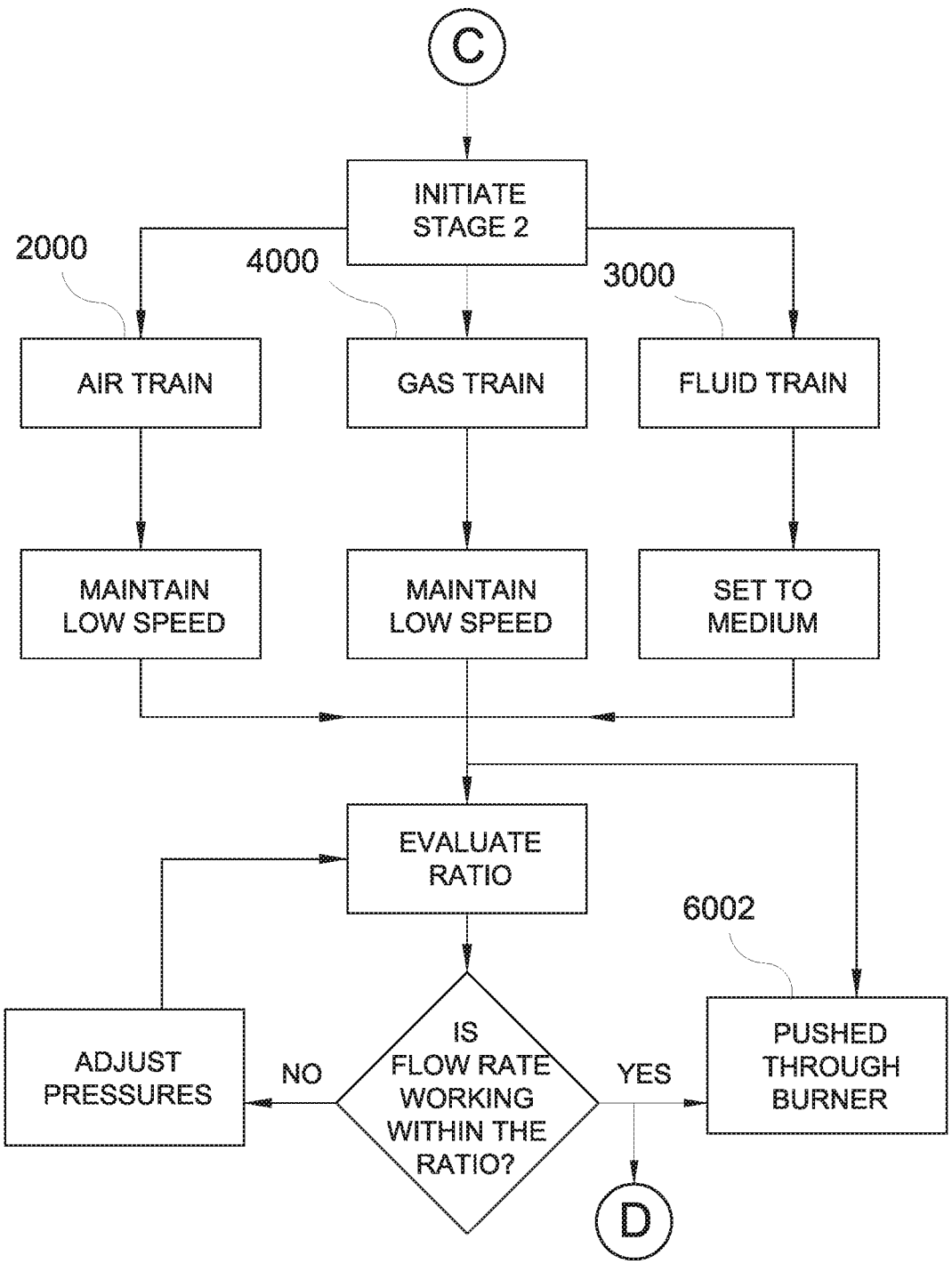
FIG. 35 is a flow chart of an initiate system stage 2.
Figure 36:
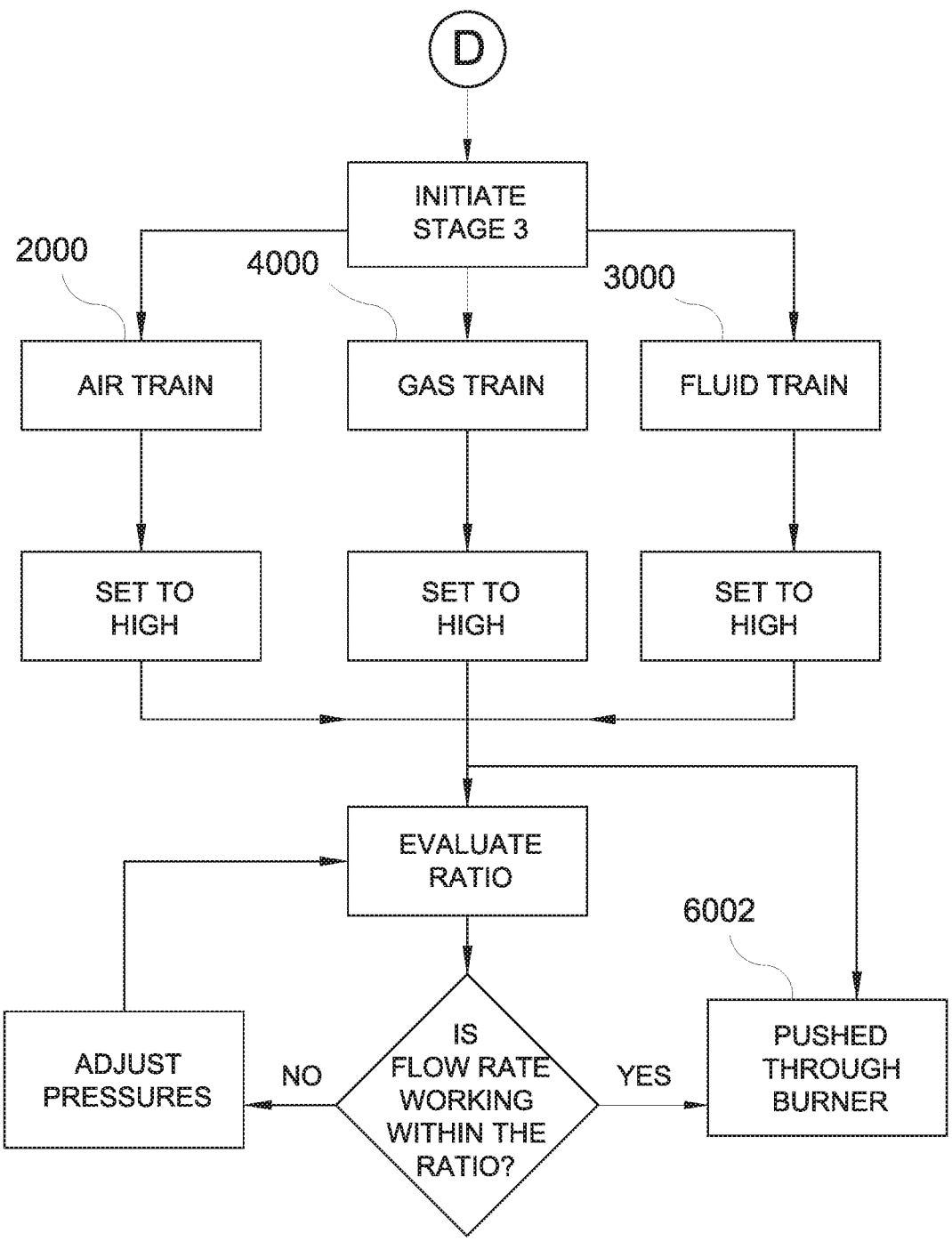
FIG. 36 is a flow chart of an initiate system stage 3.

With the blower still running or turned on using blower on/off icon 5551, burner on/off switch 5559 on the HMI may be activated to allow the system to start up. When the flame sensor detects that the pilot light is on, the burner management system allows the fuel to flow, and fuel and fresh water may be delivered to the burner as exemplified in FIG. 34 (Stage 1). The air train and gas train operate at low flow, and the fluid train operates at ramp-up flow Ts. Once process temperature is reached, for example, about 300° F. (149° C.), Stage 2 may be initiated as exemplified in FIG. 35. The air, gas, and fluid trains operate at low flow. When the system is stable, for example, having constant air and fuel flow, and within the correct temperature range, Stage 3 may be initiated, as exemplified in FIG. 36. The air, gas, and fluid trains operate at high flow. When the system is up and running and making steam for about thirty seconds, the fresh water fluid may be switched to waste water using the HMI.

After the system begins processing waste water, it should be allowed to each a steady state where temperatures are stable, as indicated on the burner thermocouple and on the exhaust thermocouple. This may take about 10 to 20 minutes. When waste water is delivered to the burn chamber, some solids remaining after filtration may be combusted. Vapor and concentrate continue to move through the system to the separator.

After the system has stabilized, processing and efficiency tests may be performed. Given that the waste water may have hydrocarbons in the fluid stream, the unit may run rich on fuel, depending on the amount of hydrocarbons present in the stream. A carbon monoxide measurement tool may be employed to check the levels on the stack of the PM scrubber. If they are elevated, the gas valve pressure may be adjusted, such as in steps of about 0.25 psig (1.7 kPa), with measurements taken at each level. If the temperature in the burner rises, one or more downward adjustments on pressure may be performed. At least about five minutes should elapse between adjustments for allowing the system to return to a steady state. Decreasing temperatures is a sign that the air to gas mixture is now lean. If this happens, the gas pressure at the orifice may be adjusted up one step. The carbon monoxide levels should be acceptable at this point.

Figure 37:
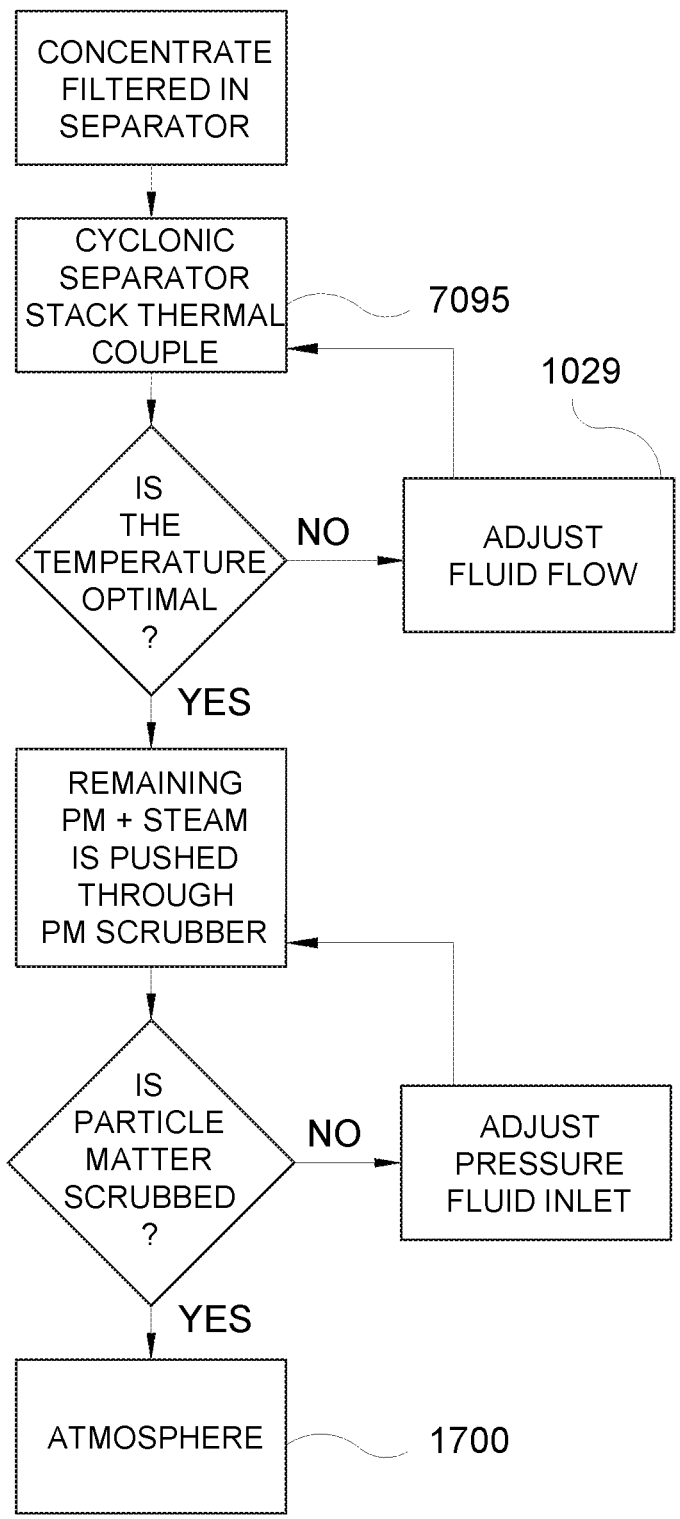
FIG. 37 is a flow chart of a separator and PM system flow.

As illustrated in the example shown in FIG. 37, the fluid flow may be adjusted so that the unit is condensing the concentrate as much as possible while still allowing it to flow out of the concentrate separator. The heat of the concentrate allows the fluid to be beyond saturation, and this causes an increase in viscosity. As explained above, if the flow is too slow, it may plug the system and cause a shutdown. A change in fluid flow changes the amount of heat absorbed by the fluid, thus changing the percentage of fluid evaporating and causing the change in viscosity. If the viscosity is too low, an adjustment on the high fluid valve, such as in the amount of about 0.25 GPM (about 1 L/m) downward, may help. The system should be allowed to stabilize for about 5 minutes between adjustments, after which viscosity may again be assessed. If the concentrate stops flowing, the fluid flow should be increased immediately to prevent harm to the system. Once the flow rate is set, the temperature should be noted. An increase in temperature is a warning sign that the concentrate is becoming too thick to flow out of the vessel properly. Efficiency of the system may be tested on product being released to atmosphere, e.g., by a qualified emissions testing company. It is possible to achieve total efficiency whereby product released to atmosphere is within environmental allowances or even up to 100% steam vapor.

EXAMPLES

Order and Timing of Sequence

Starting up the system and maintaining a burn proved problematic or impossible for reasons then unknown. Through many months of experimentation, it was discovered that several factors played a part, and the solution to the problem relied on addressing three overlapping factors in the timing and sequence of start-up events.

Multiple gas pressure drops resulted in an inconsistent delivery flow rate of gas that resulted in inability to start the system or automatic shut-down of the system shortly after start. If the fluid pressure was too high, the fluid would spray rather than cascade in the burner. If the fluid pressure was too low, however, there was not enough flow rate of fluid to prevent the burner from overheating. Depending on the type of fluid pump employed, it was discovered that water pressure of about 20 psig to about 50 psig (138-345 kPa), and more preferably, fluid pressure of about 30 psig to about 40 psig (207-276 kPa) is preferred to deliver the correct fluid flow rate. Providing too much fuel made the burn too rich, resulting in a cooler burn and poor emissions. Providing too little fuel prevented start-up or would not allow the system to sustain a burn.

One factor discovered in addressing the problem related to reducing turbulence in the gas pressure. Although making that change provided some improvement, it did not solve the problem entirely. A second factor discovered in addressing the problem related to finding the correct range of fluid pressure. Addressing the combination of gas pressure and fluid pressure increased positive results, but it did not solve the problem entirely. Another factor discovered in addressing the problem related to timing and sequence of events at start-up. If the fluid cascade was started too late after the burn was initiated, the burner would overheat. However, starting the cascade of fluid earlier did not solve the problem. It was hypothesized that, if the fluid started cascading into the burner before burn, it cooled down the burn chamber too much. As a result, the fluid delivery ramp-up was developed to address the dual issues of timing and flow rate of fluid delivery. Nearly simultaneously to opening the main gas valve, the first water ramp up should be initiated. The resultant timing and sequence of start-up events that provides reliable start-up and sustained burn were developed as follows:

1. Main sequencing: The burner controller defines conditions to be satisfied to allow pilot system startup. If the conditions are not met, the system will shut down until they are met. The burner control manager controls the main gas valve.

a. The blower should be running and within a pressure range of 4-6 psig (28-41 kPa). The pressure should be capable of pushing combustion throughout entire system, taking into consideration the flow rate expansion created by the burner and additional components that may be adding back pressure.

b. Fluid pressure should be within a range of 35-60 psig (241-414 kPa). This range is variable, depending on the size and length of lines. The fluid pressure should be capable of maintaining fluid flow and delivering the amount of fluid specified by the formula.

c. The gas/fuel pressure should be in the range of about 20 psig to about 30 psig (138-207 kPa) upstream from the main gas valve, from the separator through the pressure regulator. This range is variable based on the number and size of the gas orifice holes, the amount of pressure drops, and the fuel flow rate calculated as indicated above.

2. Pilot Ignition Sequence a. The spark ignitor turns on for at least about 4-6 seconds but should be turned off prior to ignition.

b. The pilot gas/fuel turns on simultaneously with the spark ignitor but does not turn off. Main sequencing 1a is occurring. If sustained burn is accomplished, then the pilot gas/fuel turns off.

c. The flame sensor assesses whether there is a flame (sustained burn) at about three seconds after the spark igniter turns off, and creates a latch that stays connected so long as there is a flame. If there the flame is lost or there is no sustained burn, the main gas valve closes and the system re-starts.

3. Ignition of Flame a. So long as the flame eye identifies a pilot flame, the main gas valve opens to ignite the main flame.

b. At about one half second after the main gas valve opens (nearly simultaneously), the first stage solenoid of the fluid train opens and allows the formulated ramp up flow rate of fluid to cascade into the burn chamber. Times greater than about a half second have been found to allow the burner to get too hot and could damage the system.

c. When the burner temperature reaches about 220° F. (105° C.), the low or high fluid solenoid opens to deliver the formulated flow rate of fluid to the burner. This temperature is variable based on the fluid's ability to absorb heat, e.g., its salt content. However, sequencing should not occur over 350° F. (177° C.) so as to avoid damage to the system.

d. The burner temperature should be in range of 190-230° F. (88-110° C.). This range is variable based on fluid composition. The fluid should be concentrated but capable of flowing.

Delivery of Propane Fuel Gas

When propane was used as fuel gas for the system, the requisite high flow rate of propane gas caused the propane to be pulled through the lines partially as liquid, as propane could not change phase from liquid to gas fast enough at the rate it was pulled. This caused the system to start but then stop.

A secondary separator was connected in series via a hose to create more flow rate and more residence time for the propane to change phase from liquid to gas. Not only did this double the run time for the entire process, but also the phase change still was not efficient enough to eliminate liquid propane from entering the system.

The hoses delivering the propane were enlarged from 0.5" to 2" (1.3-5.1 cm) to create more flow rate. In this case, the phase change still was inefficient and the lines developed external ice and froze up.

A portable heater was setup on the propane tanks to assist in phase change from liquid to gas. However the heater could not generate enough heat and the lines again developed external ice and froze up.

A propane vaporizer was installed after the propane tank and before the gas inlet. The vaporizer was essentially two vertical vessels in series, each having an external burner beneath it, into which the propane was delivered. The vessels were configured to minimize the forward advancement of liquid and to allow vapor to pass. The extra heat provided by the vaporizer was effective for effecting phase change from liquid to gas and delivering propane gas to the system.

Delivery of Well Head Gas

Use of well head gas rather than pure gas (e.g., methane) created instability in the burn because heavy hydrocarbons (HCs) in the gas would remain in liquid form, resulting in hydrocarbons that could not be oxidized fully, causing elevated emissions beyond desired limits. Additionally, the composition of well head gas varied from site to site and even at a single site.

The flow rate of natural gas and air was increased to address this problem. This pushed the flame out of the burn chamber and into the line leading to the separator.

To promote the mixture of air and gas over a shorter distance, additional holes were introduced in the gas orifice and several different configurations. This brought the flame up too high, which in turn led to overheating the top of the burner.

An adjustable gas orifice was installed to compensate for changes in well head gas quality.

An adjustable pressure regulator may be used to compensate for changes in well head gas quality.

Gas Orifice Configuration

The gas orifice originally was configured with eight 3/16" holes (4.8 mm). Consistent start-up was not attainable. Experiments were performed on quantity, size, and arrangement of the holes and with gas pressure in a wide scope of combinations of these factors. No consistent start-ups were achieved.

Gas pressure gauges were place at each area that could experience pressure changes during start-up and while running. It was discovered that a pressure change occurred upon ignition and introduction of the fluid that evaporates. This pressure change placed the fuel to air ratio beyond the stoichiometric value that would be able to support combustion. Consultation with experts in the field confirmed that this should not happen because the pressure of the gas delivered is so high that it should be unaffected.

To reduce the effect of the fuel flow rate delivery, it was theorized that the change in pressure delivery suggested multiple points of entry. This was achieved by using smaller orifice holes and determining the size and quantity of gas orifice holes to deliver a flow rate of fuel and the correct stoichiometric ratio with a minimum three times multiple of the recommended pressure, as indicated above. This solved the problem.

Separation of Concentrate from Steam/Flue Gas

Flue gas is exhaust from combustion. In this process, steam and flue gas always reside together. As the goal was to create steam that could be introduced safely to the environment, it was decided to find a way to separate concentrated liquid waste from the steam/flue gas.

A 6" (15.2 cm) T pipe was attached vertically to the burner so that processed waste product could be released at a 90° angle to allow the steam/flue gas to rise through the top opening and the heavier liquid concentrate to drain through the bottom opening. When large quantities of liquid concentrate were produced, however, the liquid could not be expelled downward at an adequate rate and the liquid concentrate spouted upward. This was determined to be an issue with velocity.

A 24"×72" (61×183 cm) (outer diameter) vertical separator having a blast plate and two baffles in a chevron vane pack was employed. The configuration of the chevron vane pack caused a flow pattern that slammed the waste product against the inner walls of the separator causing moisture to fall out. Because the waste fluid was dense, the combination of gravity and lower velocity was expected to maintain it in the vessel while allowing the vapor to escape. However, this separator did not separate the phases well enough, inhibited functionality to 5-10 minutes, and importantly, created unwanted back pressure due to the change in flow rate from a 6" (15.2 cm) line leading to the separator, leading to a 6" (15.2 cm) nozzle. This disruption in the back pressure made it impossible to sustain a complete burn.

The blast plate was removed to reduce back pressure. This provided 5 minutes more run-time, but that was not nearly enough.

The head of the separator was removed to relieve the pressure on the 6" (15.2 cm) nozzle attached to it, and to expose the entire outer diameter of the vessel to free flow. Longer run times were achieved, but the pressure in the burn chamber was still inconsistent and the turbulence placed stress on the sensitive burner. Also, the liquid traveled up to the vane pack and eventually clogged it, causing failure.

To address issues with pressure and velocity, a large, 60" (1.5 m) (outer diameter)×10' (3 m) horizontal vortex separator having specially arranged baffles and a 36" (91 cm) outer diameter vertical exhaust stack was developed. The first baffle was arranged at a 105° angle relative to the entry of the waste product, while the second baffle was arranged at a 90° angle relative to entry of the waste product. The arrangement of the baffles created a vortex to centrifugal flow, allowing the waste product to collide with the inner walls of the separator many times, forcing the moisture to separate from the vapor more effectively. At the end of the separator opposite entry of waste product, the vertical stack prevented most of the liquid from entering. What liquid did enter the stack was forced back downward by the aid of gravitational forces, as the velocity was kept below 18 ft/s (5.5 m/s), which is less than the 27 ft/s (8.2 m/s) terminal velocity of liquid concentrate 250 microns in diameter. The liquid did not have enough velocity to travel the full distance of the stack.

Choice of Blower

Running a 60 h.p. (44.7 KW) positive displacement blower yielded air movement of 1000 SCFM (28.3 Kl/m) at 12 psig (83 kPa), but energy consumption was too high.

The same amount of air could be moved using a 20 h.p. (14.9 KW) centrifugal motor and less pressure. However, centrifugal blowers are sensitive to back pressure. Use of this type of motor caused major fluctuation in pressure due to the back pressure created on ignition. This resulted in a dramatic change in air flow rate, which disrupted the stoichiometric ratio needed to maintain a sustained burn. There was not enough power to push back when the burner ignited (1000 SCFM (28.3 Kl/m) at 3.5 psig (24 kPa)).

A 40 h.p. (29.8 KW) positive displacement blower was employed, which lowered the back pressure from 12 psig (83 kPa) to 6-8 psig (41-55 kPa), yet was still capable of producing 1000 SCFM (28.3 Kl/m) of air using less energy to do so.

Re-configuration of Burner Unit for Use with Centrifugal Blower

The compression zone (the area between the air orifice and the mixing chamber) is a lower pressure zone affected during startup when back pressure is created. Constructing the smallest possible compression zone reduces the effect of back pressure and allows employment of a 20 h.p. (14.9 KW) centrifugal motor yielding 1000 SCFM (28.3 Kl/m) at 3.0-3.5 psig (21-24 kPa).

Reduction of Back Pressure on the Burner

Back pressure created more stress on the burn chamber and an inconsistent, less efficient flame. The problem area was determined to be the area from separator stack to the burner. The free-flowing area in the larger vortex separator, which produced better separation, also resulted in smoother flow and reduced turbulence, factors which can aid in reduction of back pressure. However, stack design made it difficult for the vapor to exit, which itself created a build-up of pressure. In designs incorporating a PM scrubber, the additional unit also created an abundance of pressure.

A cyclone style separator was employed to create even smoother flow dynamics, thus resulting in a decrease in back pressure. Therefore, the results indicated that smoother flow dynamics could reduce back pressure, even in designs that incorporated a PM scrubber.

Addressing Emissions Problems Caused by Use of Field Gas

The system employed a hydrocarbon (HC) gravity diverter filter to remove liquid HC (wet gas) remaining in the fuel after having been delivered to the system from the gas well separator. Heavy HCs were still being introduced into the burn chamber and therefore salts and CO were being emitted.

Gas flow was adjusted downward, however this was unsuccessful in addressing the problem because this created an inefficient burn and liquid HCs could pass through the flame.

A HC scrubber filter with mesh was added and a heat exchanger. It was found that the smaller 12" (30 cm) gravity diverter filter operated first in sequence better, because higher velocity allowed better separation. The larger 16" (41 cm) scrubber filter worked better second in sequence by allowing HCs to build up and drop. Employment of a heat exchanger (250-450° F., 121-232° C.) vaporizes and burns remaining liquid HCs.

Air Orifice Configuration

The compression area of the burner changed depending on the distance between the air orifice and the mixing chamber. The flow rate and pressure were adjusted by the blower speed and size of the air orifice. The change in pressure between downstream and upstream was very dramatic and multiples different. The greater the multiple, the greater was the consistency affected by a positive displacement blower.

To create more constant flow, the length of the distance from mixing chamber to air orifice needed to be increased. The greater this distance, the larger the size of the compression area that led to an out of range stoichiometric ratio. Therefore, it was determined that placement of the air orifice was better closer to the mixing chamber, sacrificing consistency for a smaller compression area.

Minimizing Fuel Pressure Change

The desired pressure in the gas orifice was 9 psig (62 kPa). Pressure drops caused fluctuation between 6-12 psig (41-83 kPa), therefore, there was a need to stop these fluctuations. This was addressed in addition to configuration of the air orifice in the previous example.

Measurement of pressure had been taken at the gas regulator (before the main gas valve). Measurements were taken at the gas orifice to provide a truer value, taking into consideration the pressure drop from the last gauge/regulator to the gas orifice.

The pressure regulator was moved behind the gravity diverter filter and the hydrocarbon scrubber filter to control the pressure inside the gas train and the pressure drop after the main gas valve so that the pressure was more consistent downstream of the main gas valve to the air orifice. The separator's flow rate was used to decrease fluctuation.

Three elements created pressure drops: the main gas valve, the high/low gas valves for fine tuning the pressure, and the heat exchanger. The high gas valve was set at a particular value, but the low gas valve could be controlled manually or remotely.

The pressure gauge for the gas orifice was relocated in a position between the heat exchanger and the gas orifice to address inconsistent readings associated with all of the pressure drops.

The manufacture recommended 10 psig (69 kPa) pressure for the gas train regulator. To determine to what extent each of the heat exchanger and main valve affected the pressure, they were bypassed sequentially and measurements were taken. The gas orifice holes were modified by making them smaller and decreasing their number to build pressure to at least double the pressure (e.g., 25 psig (172 kPa)) on the gas train to push a larger flow rate of gas having a smoother flow. This provided consistent delivery of gas and resulted in a consistent burn. Fluctuation of the pressure decreased from ±4 to ±0.25 psig (±28 kPa to ±1.7 kPa).

Field Test Results

The apparatus and process were employed to process 363,000 gallons (1.374 ML) of produced waste water at an extraction site. When running on system high, about 10 GPM (28.85 L/m) of fluid was evaporated with a flow rate of 11.5 GPM (43.5 L/m). When running on low, about 7 GPM (26.5 L/m) was evaporated with a flow rate of about 8 GPM (30.3 L/m). The excess (about 15%) is the condensate used to transport waste out of the vessel.

Controls used were as follows:

Gas—An automated variable v-ball gas valve was used for low, and a v-notch needle valve was used for high.

Fluid (staged)—Three needle valves set for low and high in the range of 3-5 GPM (11-19 L/m).

Air—A bypass and open magnetron valve for low, and a closed magnetron valve for high.

Temperatures vary depending on TDS and salinity. The apparatus was run on low at 8 GPM (30.3 L/m) with an 85-90% efficiency, running burner temperatures of 192-194° F. (89-90° C.), vapor temperatures of 196-198° F. (91-92° C.), and fluid waste temperatures of 186-190° F. (86-88° C.). The burner temperature is the average of the exhaust and fluid waste temperatures.

On high expansion of gas, fluid and air produced about 5600 SCFM (158.6 Kl/m) entering the separator through a 5" (12.7 cm) flange and nozzle at about 570 ft/sec (174 m/s), and exits the stack at an average of about 18 ft/sec (5.5 m/s).

The apparatus runs consistently and efficiently for extended periods of time.

Environmental Testing

Emissions standards for this technology do not exist yet, and they will be developed by AbTech Industries of Scottsdale, Ariz., an emissions company, and the EPA.

Test A. A test was conducted confidentially on Oct. 12, 2016, by contractor Alliance Source Testing of North Little Rock, Ark. at a well extraction in Lindsay, Okla. The configuration of the system employed a large vortex separator and stack. Testing methodology was conducted under a modified version of U.S. EPA Reference Test Methods 5/26A for particulate matter and included runs performed under two conditions. The filter(s) were either oven-dried or desiccated per the method until a final weight was obtained. The liquid fractions were extracted as needed, evaporated, and cooled until a final weight was obtained. These fractions were summed together to provide the total particulate matter (PM) collected. The results for runs performed under each condition indicated a PM concentration of 1.7 and 0.96 grain/ft$^3$ (3.9 and 2.2 g/m$^3$), and an emission rate of 10.9 and 6.3 lb/hr (4.9 and 2.9 kg/h). The results of this test showed higher than desired PM emissions.

Test B. Another test was conducted confidentially on Dec. 11-13, 2017, by contractor Metco Environmental of Carrollton, Tex. at a well extraction in Bridgeport, Tex. The configuration of the system employed a large vortex separator and incorporated a PM washer/scrubber (Model 100 from Hydro-Sonic Systems of Wylie, Tex.). Testing methodology was conducted according to EPA Methods 1, 2, 3A, 4, and 5; and Part 51 Appendix M, Method 202 for PM and included runs performed under six conditions. The results for runs performed under each condition indicated a PM concentration of 0.1608, 0.2039, 0.1313, 0.1690, 0.2685, 0.2953 grain/ft$^3$ (0.368, 0.467, 0.300, 0.387, 0.614, 0.676 g/m$^3$), and an emission rate of 1.25, 1.51, 0.82, 1.03, 1.8, and 1.85 lb/hr (0.57, 0.68, 0.37, 0.47, 0.82, and 0.84 kg/h). Although reduction of PM was significantly improved with the addition of the PM washer/scrubber, the results indicated that a larger model PM washer/scrubber would improve emissions further.

There has been provided in accordance with the present disclosure, apparatus and processes for water treatment suitable for employing on-site such as a producing oil or gas well, which utilize novel direct-convection evaporation techniques and equipment to decrease the volume of waste requiring disposal significantly, while producing steam pure enough to be released into the atmosphere, and solid or near-solid waste having significantly reduced volume and correspondingly fewer issues relating to transport and disposal.

The invention claimed is:

1. An evaporation apparatus comprising:
   a. a substantially enclosed burner unit comprising:
      i. an upper mixing chamber comprising a fuel inlet and an air inlet, said mixing chamber feeding an intermediary flame chamber comprising a pilot assembly, said flame chamber feeding a lower burn chamber comprising an outlet and an annulus around its perimeter, said annulus comprising an inner wall having at its top an opening to said burn chamber;
      ii. a fluid chamber situated externally around a lower portion of said mixing chamber and said flame chamber, said fluid chamber having a fluid inlet and a fluid outlet, said fluid outlet leading to said annulus;
   b. an air train connecting to said air inlet and to said pilot assembly;
   c. a gas train connecting to said fuel inlet and to said pilot assembly; and
   d. a metered fluid train connecting to said fluid chamber, said metered fluid train configured to control the flow rate of fluid through said fluid inlet and to said fluid chamber.

2. The evaporation apparatus of claim 1 wherein the mixing chamber fuel inlet comprises a gas orifice pipe having a plurality of holes.

3. The evaporation apparatus of claim 1 wherein the air train is configured to deliver variable flow rates of air to the mixing chamber.

4. The evaporation apparatus of claim 1 wherein the gas train further comprises a heat exchanger upstream from the burner unit.

5. The evaporation apparatus of claim 1 wherein the gas train is configured to deliver variable flow rates of fuel to the mixing chamber.

6. The evaporation apparatus of claim 1 wherein the burner unit is configured to operate using well head gas as fuel flowing through the fuel inlet.

7. The evaporation apparatus of claim 1 wherein the metered fluid train further comprises at least one filter upstream from the burner unit.

8. The evaporation apparatus of claim 1 wherein the fluid is waste fluid.

9. The evaporation apparatus of claim 1 wherein the fluid is produced water.

10. The evaporation apparatus of claim 1 further comprising a separator downstream from the burner unit.

11. The evaporation apparatus of claim 10 wherein the separator is a horizontal vortex separator.

12. The evaporation unit of claim 10 further comprising a particulate matter scrubber downstream from the separator.

13. The evaporation apparatus of claim 12 further comprising a washing chamber of the particulate matter scrubber and a chemical reagent line coupled to the particulate matter scrubber at a location upstream from the washing chamber.

14. The evaporation apparatus of claim 1 further comprising a separator unit coupled to an outlet from the burner unit, the separator unit comprising:
   a. a substantially enclosed cylindrical body having a front, a back, and a continuous wall therebetween, said continuous wall having a top and a bottom;
   b. a horizontal inlet at an upper position in said front;
   c. a vapor outlet comprising an elongated stack extending upward from said top near said back;
   d. a concentrate outlet extending downward from said bottom near said back; and
   e. a plurality of baffles extending inward from the inner side of said continuous wall so as to create a series of adjoining chambers, said baffles angled so as to create a vortex flow pattern therebetween.

15. The evaporation apparatus of claim 14 wherein the plurality of baffles comprises a front baffle extending from the top of the continuous wall at an angle relative to the inlet of about 100° to about 110°.

16. The evaporation apparatus of claim 15 wherein the plurality of baffles comprises a second baffle downstream of the front baffle, the second baffle extending from the continuous wall at about 90° relative to the bottom.

17. The evaporation apparatus of claim 14 wherein the separator unit comprises two baffles and three adjoining chambers.

18. The evaporation apparatus of claim 14 wherein the plurality of baffles are further configured to result in a cyclonic flow pattern in chambers adjacent to the front and adjacent to the back.

* * * * *

UNITED STATES PATENT AND TRADEMARK OFFICE
CERTIFICATE OF CORRECTION

PATENT NO. : 11,124,430 B2
APPLICATION NO. : 16/517432
DATED : September 21, 2021
INVENTOR(S) : Lolling et al.

Page 1 of 1

It is certified that error appears in the above-identified patent and that said Letters Patent is hereby corrected as shown below:

In the Claims

At Column 54, Line 24 (Claim 12): change "unit" to --apparatus--

Signed and Sealed this
First Day of March, 2022

Drew Hirshfeld
*Performing the Functions and Duties of the
Under Secretary of Commerce for Intellectual Property and
Director of the United States Patent and Trademark Office*